US010915300B2

(12) United States Patent
Blumenfeld et al.

(10) Patent No.: US 10,915,300 B2
(45) Date of Patent: *Feb. 9, 2021

(54) EDITING A DATABASE DURING PREVIEW OF A VIRTUAL WEB PAGE

(71) Applicant: Wix.com Ltd., Tel Aviv (IL)

(72) Inventors: Uval A. Blumenfeld, Raanana (IL); Amit Kaufman, Tel Aviv (IL); Shay Weiner, Tel Aviv (IL); Yoav Abrahami, Tel Aviv (IL)

(73) Assignee: Wix.com Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/044,383

(22) Filed: Jul. 24, 2018

(65) Prior Publication Data

US 2019/0026296 A1 Jan. 24, 2019

Related U.S. Application Data

(60) Provisional application No. 62/536,403, filed on Jul. 24, 2017, provisional application No. 62/702,278, filed on Jul. 23, 2018.

(51) Int. Cl.
*G06F 17/00* (2019.01)
*G06F 8/34* (2018.01)
(Continued)

(52) U.S. Cl.
CPC .............. *G06F 8/34* (2013.01); *G06F 3/0486* (2013.01); *G06F 8/33* (2013.01); *G06F 9/44526* (2013.01);
(Continued)

(58) Field of Classification Search
CPC ........ G06F 8/34; G06F 16/955; G06F 16/958; G06F 16/9558; G06F 16/972; G06F 16/951; G06F 16/252; G06F 3/0486; G06F 8/33; G06F 9/44526; G06F 17/212; G06F 17/2247; G06F 17/248; G06F 40/186; G06F 40/106; G06F 40/14; G06F 21/128;
(Continued)

(56) References Cited

U.S. PATENT DOCUMENTS 7,240,077 B1 * 7/2007 Edelman ............... G06F 16/958
2006/0248442 A1 * 11/2006 Rosenstein ............. G06F 17/24
715/205

(Continued)

*Primary Examiner* — Jason T Edwards
(74) *Attorney, Agent, or Firm* — Finnegan, Henderson, Farabow, Garrett & Dunner, LLP

(57) ABSTRACT

Disclosed embodiments relate to updating a back-end database containing data sets that populate a plurality of web pages of a website. Operations include receiving via a user interface, a plurality of data elements; storing groups of at least one data element in a database; generating a plurality of virtual web pages, wherein each virtual web page is a preview of a corresponding actual web page before the corresponding actual web page goes live; displaying each group of at least one data element in a separate one of the plurality of virtual web pages; displaying an editing tool to permit a user to edit a virtual web page from the plurality of virtual web pages; translating the edits to the virtual web page into updates for the database; storing the updates in the database; and enabling a display on the corresponding actual web page with the updates.

25 Claims, 49 Drawing Sheets

(51) Int. Cl.

| | | |
|---|---|---|
| H04L 29/08 | (2006.01) | |
| G06F 16/951 | (2019.01) | |
| G06F 16/958 | (2019.01) | |
| G06F 40/14 | (2020.01) | |
| G06F 40/106 | (2020.01) | |
| G06F 40/186 | (2020.01) | |
| G06F 16/955 | (2019.01) | |
| G06F 3/0486 | (2013.01) | |
| G06F 8/33 | (2018.01) | |
| G06F 16/25 | (2019.01) | |
| G06F 9/445 | (2018.01) | |
| G06F 21/12 | (2013.01) | |
| G06F 21/53 | (2013.01) | |

(52) U.S. Cl.
CPC .......... *G06F 16/252* (2019.01); *G06F 16/951* (2019.01); *G06F 16/955* (2019.01); *G06F 16/958* (2019.01); *G06F 16/9558* (2019.01); *G06F 16/972* (2019.01); *G06F 21/128* (2013.01); *G06F 21/53* (2013.01); *G06F 40/106* (2020.01); *G06F 40/14* (2020.01); *G06F 40/186* (2020.01); *H04L 67/02* (2013.01); *H04L 67/22* (2013.01); *H04L 67/327* (2013.01)

(58) Field of Classification Search
CPC ......... G06F 21/53; H04L 67/02; H04L 67/22; H04L 67/327
USPC ....................................................... 715/234
See application file for complete search history.

(56) References Cited

U.S. PATENT DOCUMENTS

| | | | |
|---|---|---|---|
| 2008/0071929 A1* | 3/2008 | Motte | H04L 67/20 709/246 |
| 2008/0201452 A1* | 8/2008 | Athas | H04L 29/12594 709/219 |
| 2013/0219263 A1 | 8/2013 | Abrahami | |
| 2014/0245257 A1* | 8/2014 | Kusmer | G06F 8/34 717/113 |
| 2015/0058339 A1 | 2/2015 | Nijjer et al. | |
| 2015/0227533 A1 | 8/2015 | Goldstein et al. | |
| 2016/0093083 A1* | 3/2016 | Chen | G06T 11/60 |

* cited by examiner

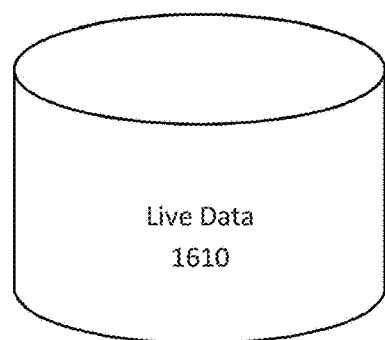
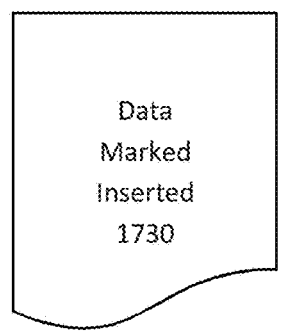
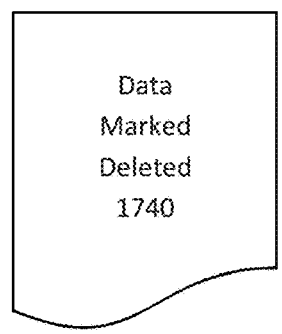
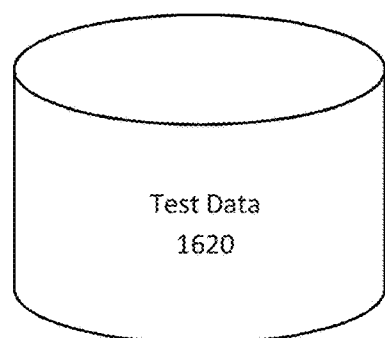
FIG. 18

Step 1

| Live Data 1610 | | | | Data Marked Inserted 1730 | | | | Data Marked Deleted 1740 | | |
|---|---|---|---|---|---|---|---|---|---|---|
| A | B | C | | A | B | C | | A | B | C |
| 1 | q | a | | 3 | zz | d | | 2 | w | s |
| 2 | w | s | | 5 | r | zz | | 3 | e | d |
| 3 | e | d | | 7 | w | w | | 5 | t | g |
| 4 | r | f | | | | | | | | |
| 5 | t | g | | | | | | | | |
| 6 | y | h | | | | | | | | |

2510

Step 2

| Live Data 1610 | | | | Data Marked Inserted 1730 | | | | Data Marked Deleted 1740 | | |
|---|---|---|---|---|---|---|---|---|---|---|
| A | B | C | | A | B | C | | A | B | C |
| 3 | e | d | | 5 | r | zz | | 3 | e | d |
| 1 | q | a | | 7 | w | w | | 5 | t | g |
| 4 | r | f | | 3 | zz | d | | 2 | w | s |
| 5 | t | g | | | | | | | | |
| 2 | w | s | | | | | | | | |
| 6 | y | h | | | | | | | | |

2520 (left), 2530 (right)

| Live Data 1610 | | | | Data Marked Inserted 1730 | | | | Data Marked Deleted 1740 | | |
|---|---|---|---|---|---|---|---|---|---|---|
| A | B | C | | A | B | C | | A | B | C |
| 3 | e | d | | | | | | 3 | e | d |
| 1 | q | a | | | | | | | | |
| 4 | r | f | | | | | | | | |
| | | | | 5 | r | zz | | | | |
| 5 | t | g | | | | | | 5 | t | g |
| 2 | w | s | | | | | | 2 | w | s |
| | | | | 7 | w | w | | | | |
| 6 | y | h | | 3 | zz | d | | | | |

2540, 2550, 2560

| Test Data 1720 | | |
|---|---|---|
| A | B | C |
| 1 | q | a |
| 4 | r | f |
| 5 | r | zz |
| 7 | w | w |
| 6 | y | h |
| 3 | zz | d |

Wix

Site Structure
- Pages
  - HOME
  - ACADEMICS
  - EVENTS
  - EXHIBITIONS
  - NEWS
  - All Courses
  - ONLINE COURSES
  - Courses Pages (Data)
    - Courses (Title)
- Public
- Backend
- Database
  - Application Data
  - Courses
  - Events
  - Exhibitions
  - News
  - NewsEvents
  - Programs
  - semester

4202

Pages: Courses

Site   Tools   Help   Upgrade

4204

4520

What You'll Learn
- Basic typographic terminology as well as the ability to distinguish differences between typefaces and identify parts of letterforms
- The way typefaces express connotative meaning through their association with different time periods, aesthetics and ideas.
- How to set type for optimal legibility and clear hierarchy, and design and evaluate page layouts and control typographic aesthetics.
- How to survey and analyze possibilities for type treatments by looking at examples of expressive and unconventional typography.

Entry Requirements

Students who wish to enroll in this program must be simultaneously enrolled in the Intro to Design Studies and Drawing/Imaging programs.

APPLY NOW →

EDITING A DATABASE DURING PREVIEW OF A VIRTUAL WEB PAGE

CROSS-REFERENCE TO RELATED APPLICATIONS

This application claims priority to U.S. Provisional Application No. 62/536,403, filed on Jul. 24, 2017, and U.S. Provisional Application No. 62/702,278, filed on Jul. 23, 2018, the entirety of which are both hereby incorporated by reference.

This application is also generally related to, and incorporates by reference in their entirety, the following applications: U.S. application Ser. No. 13/596,146, filed on Aug. 28, 2012; U.S. application Ser. No. 13/771,119, filed on Feb. 20, 2013; U.S. application Ser. No. 13/779,798, filed on Feb. 28, 2013; U.S. application Ser. No. 13/786,488, filed on Mar. 6, 2013; U.S. application Ser. No. 13/959,759, filed on Aug. 6, 2013; U.S. application Ser. No. 15/339,984, filed on Nov. 1, 2016; U.S. application Ser. No. 14/053,614, filed on Oct. 15, 2013; U.S. application Ser. No. 15/233,987, filed on Aug. 11, 2016; U.S. application Ser. No. 14/176,166, filed on Feb. 10, 2014; U.S. application Ser. No. 14/207,761, filed on Mar. 13, 2014; U.S. application Ser. No. 14/483,981, filed on Sep. 11, 2014; U.S. application Ser. No. 14/559,943, filed on Dec. 4, 2014; U.S. application Ser. No. 14/619,903, filed on Feb. 11, 2015; U.S. application Ser. No. 15/706,789, filed on Sep. 18, 2017; U.S. application Ser. No. 14/207,930, filed on Mar. 13, 2014; U.S. application Ser. No. 15/657,156, filed on Jul. 23, 2017; U.S. application Ser. No. 14/699,828, filed on Apr. 29, 2015; U.S. application Ser. No. 15/653,568, filed on Jul. 19, 2017; U.S. application Ser. No. 14/926,007, filed on Oct. 29, 2015; U.S. application Ser. No. 14/619,145, filed on Feb. 11, 2015; U.S. application Ser. No. 15/708,160, filed on Sep. 19, 2017; U.S. application Ser. No. 15/168,295, filed on May 31, 2016; U.S. application Ser. No. 15/175,272, filed on Jun. 7, 2016; U.S. application Ser. No. 15/224,616, filed on Jul. 31, 2016; U.S. application Ser. No. 15/292,172, filed on Oct. 13, 2016, U.S. application Ser. No. 15/224,579, filed on Jul. 31, 2016; U.S. application Ser. No. 16/000,907, filed on Jun. 6, 2018; U.S. application Ser. No. 15/607,586, filed on May 29, 2017; U.S. application Ser. No. 15/661,342, filed on Jul. 27, 2017; U.S. application Ser. No. 15/850,151, filed on Dec. 21, 2017; U.S. application Ser. No. 16/002,356, filed on Jun. 7, 2018; U.S. Provisional Application No. 62/591,297, filed on Nov. 28, 2017; U.S. Provisional Application No. 62/624,824, filed on Feb. 1, 2018; U.S. Provisional Application No. 62/626,093, filed on Feb. 4, 2018; and U.S. Provisional Application No. 62/647,736, filed on Feb. 25, 2018.

BACKGROUND

This disclosure relates to website building systems for building indexable websites and web applications which integrate custom backend functionality running on a system fully managed by a third-party. For example, embodiments include developing custom backend functionality which may be executed in stateless server environment (such as containers, serverless code, or virtual machines) when a programmable event associated with a frontend component or system activity is triggered without the user of the system having to become involved in managing the client-server interaction.

Further, this disclosure relates to hosting and managing load of a website by providing on-demand run instances of the website or individual webpages instantaneously. The instances may in some embodiments be spun up as virtual machines, containers, or serverless code elements. More specifically, this disclosure relates to systems and methods for monitoring the load and activity of hosted websites in order to automatically add and remove instances serving websites hosted on the system without significant delay in responding to a request to serve a website. Further, hosted websites may be comprised of a combination of generic and website-specific code.

Still further, the disclosure relates to visualizing and testing websites with real-time access to data generated in a production environment for and by the end user of the website and the data linked to the website. More specifically, this disclosure relates to providing access to data usually seen by an end user of a website for testing the functionality and experience of a website by a developer or designer of the website.

Further, this disclosure relates to editing a database during preview of a virtual webpage. For example, users may store groups of data elements (e.g., text, graphics, videos, etc.) in a database, and one or more virtual webpages may be generated to display a preview of the webpages. During the display of the virtual webpages, users may be permitted to edit the virtual webpage, and their edits may be translated into updates for the database. Further, during a live view of an actual webpage corresponding to the virtual webpage, the updates to the database may be reflected in the displayed live view.

Website building systems, as disclosed herein, are used to allow people with limited software development experience and/or limited resources to develop and host a customized website. Conventional website development systems, on the other hand, offer a template frontend UI with no or limited backend control through calls to external services or embedded code snippets calling server-side code, thus limiting the system to webpages with no or minimal options for data manipulation or other custom functionality. Other systems expect to be fully involved in setting up client-server interactions in order to access full backend control.

Conventional website development systems lack the capability to create layouts of webpages to be populated with data to create multiple dynamic pages which can be indexed. Further, conventional systems lack the capability to integrate software-based routers for webpages, which may allow webpages to contain different content or function differently depending on how a user reached the webpages or interacts with them. Conventional systems also lack the capability to monitor the interaction of a user of the website and show resultant outputs based on prior registered functionality associated with those interactions.

Conventional managed website hosting systems are used to serve requests to a website either using dedicated servers, which cost significant money and resources to maintain ready and operational, or using a cold start of new instances when a new website is requested or the load of a particular website goes beyond a certain threshold of delay in responding to a request. Such a process of cold starting new instances of a website or webpages entails substantial processing delay and consequential latency in the user experience.

Conventional website development systems are also limited in terms of their ability to permit users to dynamically edit previews of pages. Such systems are also unable to receive edits to a previewed page, and translate those edits into updates to a database on which all or portions of the page are based. As a result, using such conventional systems involves more user action, more bandwidth, and more cumbersome operations.

Website testing systems, as disclosed herein, may be set up to create a realistic experience of using the website by an end user without disrupting the end user experience. Conventional website testing systems, however, provide a limited preview interface to review the site in a way an end user would experience the website, but they do not have a way to provide real-time access to data generated on the website being tested. Conventional systems also lack the ability to add new data and delete data generated for the site without impacting the end user experience.

Conventional website hosting systems are also vulnerable to plugins (e.g., software that may be integrated into the frontend or backend a website) that contain malicious code (e.g., malware). When such code is uploaded by one website owner or user, it may spread through the website hosting system to affect websites of other owners or users. Conventional website hosting systems lack the capability to isolate uploaded plugins and prevent them from infecting other websites that are commonly hosted by the system.

Accordingly, there is a need for technological solutions for new website development systems to manage backend functionality, to provide the freedom to have more customization of the website, and without involving a user in server setup, provisioning, or server-client interactions. There is further a need to provide technological tools to users for building customized websites, including with customized coding capabilities, without requiring users to code entire websites from scratch.

Further, there is a need for technological solutions for a new on-demand system to handle requests to websites without significant delay. Such technological solutions should utilize virtual computing resources, such as virtual machines, containers, serverless code, etc. Further, such solutions should allow for highly customized websites, including both common features across many pages or sites, as well as features unique to particular pages or sites.

Still further, there is also a need for technological solutions for a new website testing system with real-time data access to what is available in production.

In addition, there is a need for technological solutions for isolating uploaded plugins, and preventing them from infecting co-hosted websites. Such techniques should be capable of isolating both frontend and backend plugins, while still allowing such plugins to be uploaded and utilized by website owners and users.

SUMMARY

Certain embodiments of the present disclosure relate to a system for building a website. The system may include an online website building system configured to permit website builders to add backend functionality to a centrally hosted website, the centrally hosted website including one or more webpages indexable by a search engine. The online system may allow for the editing and the dynamic preview of pages to use a common online database, which designers and users may access simultaneously. The system may comprise an online database configured to store a library of website building elements for configuring a frontend of an indexable webpage, as well as at least one processor configured to perform certain operations. Operations may include transmitting first instructions to a remote web browser of a user, the first instructions permitting the user to remotely access the stored library via a unified interface displayable by the remote web browser, and to permit the user to utilize a selection of the building elements for constructing the frontend of the indexable webpage, wherein the unified interface provides the user access to both the building elements and customized backend functionality associated with the indexable webpage; enabling, via the unified interface displayable by the remote web browser, the user to configure a programmable event for activating user-editable code providing customized backend functionality associated with the indexable webpage; receiving, via the unified interface, user edits to the user-editable code for implementing the customized backend functionality associated with the programmable event; storing the edited user-editable code in a code storage system in communication with the online database; and in response to a trigger associated with the programmable event, executing the edited user-editable code for implementing the customized backend functionality.

In some embodiments, the system includes the execution of the edited user-editable code for implementing the customized backend functionality based on a hook that causes the execution of the edited user-editable code.

Further, in some embodiments, the hook is a web hook, a data hook, or a data-binding router hook.

Still further, in some embodiments, the at least one processor is further configured to automatically generate, based on rules stored in the online database, skeleton code associated with a website building element selected by the user, and to transmit the skeleton code to the remote web browser to enable the skeleton code.

Additionally, in some embodiments, the system includes a function associated with the website building element selected by the user and a snippet of code associated with the function as part of the automatically generated skeleton code.

Moreover, in some embodiments, the system includes a unified interface displayable by a remote web browser which in turn includes a frontend website editing window and a customized backend editing window.

Further, in some embodiments, the system includes a trigger for data activity involving a particular data set that is associated with the customized backend functionality.

Still further, in some embodiments, the system includes a trigger for an update entered on the indexable webpage.

Additionally, in some embodiments, the system includes a trigger for a page transition on the indexable webpage.

Moreover, in some embodiments, the system includes a trigger for a defined interaction between the user and the indexable webpage.

Further, in some embodiments, the at least one processor is further configured to execute the edited user-editable code to implement a plurality of customized backend functionalities in response to the trigger associated with the programmable event.

Still further in accordance with some embodiments, the at least one processor is further configured to execute the edited user-editable code to implement a customized backend functionality in response to a plurality of triggers associated with a plurality of programmable events.

Additionally, in accordance with some embodiments, the system includes a code storage system configured to store code for a software-based router that handles incoming client requests to the indexable webpage.

Moreover, in some embodiments, the system includes a storage system which is both an online database and code storage system.

Certain embodiments relate to a computer-implemented method for building a website using customized backend functionality. The method may include maintaining an online database configured to store a library of website building elements for configuring a frontend of an indexable web page; transmitting first instructions to a remote web browser of a user, the first instructions permitting the user to remotely access the stored library via a unified interface displayable by the remote web browser, and to permit the user to utilize a selection of the building elements for constructing the frontend of the indexable webpage, wherein the unified interface provides the user access to both the building elements and customized backend functionality associated with the indexable webpage; receiving, via the unified interface displayable by the remote web browser, specifications from user to configure a programmable event for activating user-editable code providing customized backend functionality associated with the indexable webpage; receiving, via the unified interface, user edits to the user-editable code for implementing the customized backend functionality associated with the programmable event; storing the edited user-editable code a code storage system in communication with in the online database; and in response to a trigger associated with the programmable event, executing the edited user-editable code for implementing the customized backend functionality.

Moreover, in some embodiments, the method includes obtaining data external to the online database and external to the remote web browser for using in the executing of the edited user-editable code for implementing the customized backend functionality in response to the trigger.

Further, in accordance with some embodiments, the method includes providing to the user access to at least some portions of the user-editable code for editing in the form of selectable segments of code.

Still further, in accordance with some embodiments, the method includes execution of the edited user-editable code for implementing the customized backend functionality based on a hook that causes the execution of the edited user-editable code.

Additionally, in accordance with some embodiments, the method includes a hook which is either a webhook, or a data hook, or a data-binding router hook.

Moreover, in accordance with some embodiments, the method includes generation of skeleton code associated with a website building element selected by the user by at least one processor based on rules stored in the online database and transmission of the skeleton code to the remote web browser to enable the skeleton code.

Further, in accordance with some embodiments, the automatically generated skeleton code includes a function associated with a building element selected by the user and a snippet of code associated with the function.

Further, in some embodiments, the method includes providing a unified interface displayable by a remote web browser which includes a frontend website editing window and a customized backend editing window.

Still further, in some embodiments, the method includes a trigger for data activity involving a particular data set that is associated with the customized backend functionality.

Additionally, in some embodiments, the method includes a trigger for an update entered on the indexable webpage.

Moreover, in some embodiments, the method includes a trigger for defined interaction between the user and the indexable webpage.

Certain embodiments relate to a system for on-demand assignment of a webserver execution instance for a website server. The system may include at least a first memory location storing generic website server code for hosting a plurality of websites, and at least a second memory location storing, in a segregated manner from the first memory location, website specific code unique to each of the plurality of websites. The system may further include at least one processor configured to perform operations including to control a plurality of web-server execution instances, at least some of the instances running website specific code unique to at least one of the plurality of websites, and at least others of the web-server execution instances running the generic website server code devoid of the specific unique code for any one website; receive a request to access a specific website, the specific website having been built on a platform including the generic website server code; determine whether the specific website is already hosted by one of the plurality of web-server execution instances; and when it is determined that the requested specific website is not already hosted by one of the plurality of web-server execution instances: direct the request to a first one of the plurality of web-server execution instances running the generic website server code; inject into the first one of the plurality of web-server execution instances running the generic website server code, additional website specific code unique to the requested website from the at least one second memory location; and respond to the request, via the first one of the plurality of web-server execution instances, through a combination of both the generic website server code and the injected website specific code unique to the requested website.

In some embodiments, the system may include a plurality of web-server execution instances which in turn may include one or more containers, virtual machines, or physical machine processes.

Further, in some embodiments, the request is an HTTP request and the system includes an operation to respond to the request that is performed before the request times out.

Still further, in some embodiments, the system includes an operation to respond to the request that is performed within 100 ms of receiving the request.

Additionally, in some embodiments, the system includes a proxy server to handle HTTP requests, including the operations to receive and determine.

Moreover, in some embodiments, the operation to determine further includes querying a web-server execution instance manager as to whether the specific website is already hosted by one of the plurality of web-server execution instances.

Further, in some embodiments, the operation to determine further includes forwarding the request to a web-server execution instance manager and if the request fails, determining therefrom that the requested specific website is not currently hosted by one of the plurality of web-server execution instances.

Still further, in some embodiments, the operation to determine includes determining, based on a state table, that the specific website is already hosted by one of the plurality of web-server execution instances.

Additionally, in some embodiments, the system includes a state table maintained at a proxy server and identifies a list of websites already hosted by one of the plurality of web-server execution instances.

Moreover, in some embodiments, the system includes operations to update the state table to remove an inactive website from the list based on a predetermined period of inactivity of requests associated with the inactive website.

Further, in some embodiments, the additional website specific code unique to the requested website includes backend code unique to the requested website.

Still further, in some embodiments, the additional website specific code unique to the requested website includes code associated with a plugin referenced by the requested website.

Additionally, in some embodiments, the operations further comprise monitoring a set of web-server execution instances not already hosting a specific website, and when the size of the set of web-server execution instances is less than a threshold, instructing a web-server execution instance manager to spin up additional web-server execution instances.

Moreover, in some embodiments, the operations further comprise monitoring a set of web-server execution instances not already hosting a specific website, and when the size of the set of web-server execution instances is greater than a threshold, instructing a web-server execution instance manager to shut down at least one web-server execution instance.

Certain embodiments of the present disclosure relate to a computer-implemented method for on-demand assignment of a web-server execution instance for a website server. The method may include storing, in a first memory location, generic website server code for hosting a plurality of websites; storing, in a second memory location that is segregated from the first memory location, website specific code unique to each of the plurality of websites; controlling a plurality of web-server execution instances, at least some of the instances running website specific code unique to at least one of the plurality of websites, and at least others of the web-server execution instances running the generic website server code devoid of the specific unique code for any one website; receiving a request to access a specific website, the specific website having been built on a platform including the generic website server code; determining whether the specific website is already hosted by one of the plurality of web-server execution instances; and when it is determined that the requested specific website is not already hosted by one of the plurality of web-server execution instances: directing the request to a first one of the plurality of web-server execution instances running the generic website server code; injecting into the first one of the plurality of web-server execution instances running the generic website server code, additional website specific code unique to the requested website from the at least one second memory location; and responding to the request, via the first one of the plurality of web-server execution instances, through a combination of both the generic website server code and the injected website specific code unique to the requested website.

In accordance with some embodiments, the plurality of web-server execution instances may include one or more of containers, virtual machines, or physical machine process.

Further, in accordance with some embodiments, the request is an HTTP request and the method includes the Step of responding to the request before the request times out.

Still further, in accordance with some embodiments, the method includes the Step of responding to the request being performed within 100 ms of receiving the request.

Certain embodiments of the present disclosure relate to a system for on-demand assignment of a web-server execution instance for a website server. The system may comprise at least one memory device storing generic website server code for hosting a plurality of websites and website specific code unique to each of the plurality of websites; and at least one processor configured to perform operations. The operations may include to control a plurality of web-server execution instances, at least some of the instances running website specific code unique to at least one of the plurality of websites, and at least others of the web-server execution instances running the generic website server code devoid of the specific unique code for any one website, receive a request to access a specific website, the specific website having been built on a platform including the generic website server code; determine whether the specific website is already hosted by one of the plurality of web-server execution instances; when it is determined that the requested specific website is not already hosted by one of the plurality of web-server execution instances: direct the request to a first one of the plurality of web-server execution instances running the generic website server code, the request prompting the first one of the plurality of web-server execution instances running the generic website server code to obtain additional website specific code unique to the requested website from the at least one memory device; and respond to the request, via the first one of the plurality of web-server execution instances, through a combination of both the generic website server code and the injected website specific code unique to the requested website.

In accordance with some embodiments, the first one of the plurality of web-server execution instances running the generic website server code is configured to obtain the additional website specific code unique to the requested website from the at least one memory device based at least on an identifier of the requested website included in the request.

Certain embodiments relate to a system for simultaneously running live data of a website in a website deployment environment while also running test data of the website in a non-public website test environment. The system may include at least one common database storing both the live data of the website and the test data of the website, wherein the test data is associated in the at least one common database with the live data; and at least one processor configured to perform operations. Operations may perform functions including to access the live data stored in the at least one common database; use the accessed live data to render the website in the website deployment environment; receive a request to perform testing on the website while the website is live in the website deployment environment; access, in the at least one common database, a set of the test data responsive to the request, the set of test data including one or more test data elements corresponding to respective live data elements, wherein the set of test data is not accessible in the website deployment environment; and while the website is operating in the website deployment environment, test the website in parallel in the non-public website test environment such that both the set of test data and the live data are used simultaneously by the website in the non-public website test environment.

In accordance with some embodiments, the test data is associated with the live data using markers configured to cause, during the testing, specific test data elements to replace specific live data elements.

Further, in accordance with some embodiments, the markers are configured to be deleted following the testing.

Additionally, in accordance with some embodiments, the markers are indicative of instructions to ignore specific live data during the testing.

Moreover, in accordance with some embodiments, the system is a website hosting environment for hosting a plurality of websites generated by a plurality of users.

Further, in accordance with some embodiments, at least one common database is a centralized online database configured to store live data associated with the plurality of websites generated by the plurality of users.

Still further, in accordance with some embodiments, the test data includes newly added data not previously associated with the live data of the website.

Additionally, in accordance with some embodiments, the test data is hidden from the website deployment environment.

Moreover, in accordance with some embodiments, the system includes test data responsive to a request to add data in the non-public website test environment.

Further, in accordance with some embodiments, the test data is created in an area of the at least one common database hidden from the website deployment environment.

Still further, in accordance with some embodiments, the system includes test data elements corresponding to the respective live data elements include data elements indicative of a requested alteration performed on a duplicate of the respective live data elements.

Additionally, in accordance with some embodiments, the system includes determination of corresponding test data elements for the live data elements requested to be altered, and when corresponding respective test data elements exist, performing the requested alteration on the corresponding respective test data elements.

Moreover, in accordance with some embodiments, the system performs the receipt of a query initiated in the non-public website test environment, responding to the query with one or more of the live data elements when the one or more live data elements are not associated with corresponding respective test data elements, and responding to the query with one or more of the test data elements when the one or more live data elements are associated with corresponding respective test data elements.

Further, in accordance with some embodiments, the at least one processor is further configured to merge the test data into the live data, thereby replacing one or more of the live data elements with respective corresponding test data elements.

Certain embodiments of the present disclosure relate to a computer-implemented method for simultaneously running live data of a website in a website deployment environment while also running test data of the website in a non-public website test environment. The method may include storing both the live data of the website and the test data of the website, wherein the test data is associated in the at least one common database with the live data; accessing the live data stored in the at least one common database; using the accessed live data to render the website in the website deployment environment; receiving a request to perform testing on the website while the website is live in the website deployment environment; accessing, in the at least one common database, a set of the test data responsive to the request, the set of test data including one or more test data elements corresponding to respective live data elements, wherein the set of test data is not accessible in the website deployment environment; and while the website is operating in the website deployment environment, testing the website in parallel in the non-public website test environment such that both the set of test data and the live data are used simultaneously by the website in the non-public website test environment.

In accordance with some embodiments, the method may include associating the test data with the live data using markers configured to cause, during the testing, specific test data elements to replace specific live data elements.

Further, in accordance with some embodiments, the markers are configured to be deleted following the testing.

Still further, in accordance with some embodiments, the markers are indicative of an instruction to ignore the specific corresponding live data during the testing.

Additionally, in accordance with some embodiments, the method is performed by a server configured to provide a website hosting environment for hosting a plurality of websites generated by a plurality of users.

Moreover, in accordance with some embodiments, the test data is created in an area of the at least one common database hidden from the website deployment environment.

Certain embodiments of the present disclosure relate to a computer-based system for simultaneously running test data of a visual application system in a non-public test environment while also running live data of the visual application system in a deployment environment, the computer-based system comprising: at least one common database storing both the live data of the visual application system and the test data of the visual application system, wherein the test data is associated in the at least one common database with the live data; and at least one processor configured to: access the live data of the visual application system stored in the at least one common database; use the accessed live data of the visual application system in the deployment environment; receive a request to perform testing on the visual application system while the visual application system is live in the deployment environment; access, in the at least one common database, a set of the test data responsive to the request, the set of test data including one or more test data elements corresponding to respective live data elements, wherein the set of test data is not accessible in the deployment environment; and while the visual application system is live in the deployment environment, test the visual application system in parallel in the non-public test environment such that both the set of test data and the live data are used simultaneously by the visual application system in the non-public test environment.

Further, in accordance with some embodiments, the computer-based system is at least one of a website development system and a source code development system.

Certain embodiments of the present disclosure include a computer readable medium containing instructions that, when executed by at least one processor, cause the at least one processor to perform certain instructions for updating a backend database containing data sets that populate a plurality of web pages of a website. The instructions may perform operations to receive via a user interface, a plurality of data elements, the data elements organized into one or more groups of at least one data element, each group for display on a separate web page of a website; store the groups of at least one data element in a database; generate a plurality of virtual web pages, wherein each virtual web page is a preview of a corresponding actual web page before the corresponding actual web page goes live, wherein each of the corresponding actual web pages is not designed with functionality for updating the database; display each group of at least one data element in a separate one of the plurality of virtual web pages; display an editing tool to permit a user to edit a virtual web page from the plurality of virtual web pages; translate the edits to the virtual web page into updates for the database; store the updates in the database; and enable, during a live view of a corresponding actual web page associated with the virtual web page, a display of the corresponding actual web page with the updates made to the virtual web page during the preview.

In addition, in some embodiments each of the plurality of virtual web pages is displayable within a frame associated with an editor interface of the user interface.

In further embodiments, the operations display of a user-selectable feature enabling the user to navigate through the plurality of virtual web pages to individually and dynamically display each of the plurality of virtual web pages.

In additional embodiments, the operations display of a user-selectable feature enabling the user to select a particular virtual web page from the plurality of virtual web pages based on an identifier of the particular virtual web page.

In further embodiments, the identifier of the particular virtual web page is based on a data element associated with the particular virtual web page.

Further, according to some embodiments, the operations include associating a unique URL with each of the plurality of virtual web pages.

In additional embodiments, each of the plurality of virtual web pages is generated based on a sitemap referencing the unique URL of each of the plurality of virtual web pages.

According to some embodiments, the editing tool is configured to receive edits to the stored groups of at least one data element in the database.

Further, in some embodiments the editing tool is configured to receive edits to attributes of the plurality of virtual web pages.

In additional embodiments, the editing tool is configured to receive edits to code that is used to generate the plurality of virtual web pages.

In further embodiments, the editing tool is configured to display a plurality of segments of skeleton code representing actual code used to generate the plurality of virtual web pages, and receive edits to the skeleton code that are translated into edits to the actual code.

Further, in some embodiments the data elements are received via the user interface from an external source.

In additional embodiments, the operations further comprise accessing a software-based router associated with the plurality of virtual web pages, and configuring the software-based router to generate a different version of each of the plurality of virtual web pages based on one or more segments of a received URL.

In some embodiments, a subset of each group of at least one data element are organized by a repeater function, the repeater function generating one or more displayed instances of the subset of each group of at least one data element.

Further, additional embodiments include a live view of the corresponding actual web page that includes the one or more instances.

Also disclosed herein are computer-implemented methods for updating a backend database containing data sets that populate a plurality of web pages of a website. The method may comprise receiving via a user interface, a plurality of data elements, the data elements organized into one or more groups of at least one data element, each group for display on a separate web page of a website; storing the groups of at least one data element in a database; generating a plurality of virtual web pages, wherein each virtual web page is a preview of a corresponding actual web page before the corresponding actual web page goes live, wherein each of the corresponding actual web pages is not designed with functionality for updating the database; displaying each group of at least one data element in a separate one of the plurality of virtual web pages; displaying an editing tool to permit a user to edit a virtual web page from the plurality of virtual web pages; translating the edits to the virtual web page into updates for the database; storing the updates in the database; and enabling, during a live view of a corresponding actual web page associated with the virtual web page, a display of the corresponding actual web page with the updates made to the virtual web page during the preview.

In some embodiments, each of the plurality of virtual web pages is displayable within a frame associated with an editor interface of the user interface.

Further, in some embodiments the method further comprises displaying a user-selectable feature enabling the user to navigate through the plurality of virtual web pages to individually and dynamically display each of the plurality of virtual web pages.

In additional embodiments, the method further comprises displaying a user-selectable feature enabling the user to select a particular virtual web page from the plurality of virtual web pages based on an identifier of the particular virtual web page.

In further embodiments, the identifier of the particular virtual web page is based on a data element associated with the particular virtual web page.

Further, in some embodiments the method further comprises associating a unique URL with each of the plurality of virtual web pages.

In additional embodiments, each of the plurality of virtual web pages is generated based on a sitemap referencing the unique URL of each of the plurality of virtual web pages.

Further, in some embodiments, the editing tool is configured to receive edits to the stored groups of at least one data element in the database.

According to additional embodiments, the editing tool is configured to receive edits to attributes of the plurality of virtual web pages.

In further embodiments, the editing tool is configured to receive edits to code that is used to generate the plurality of virtual web pages.

Still further, in some embodiments the editing tool is configured to display a plurality of segments of skeleton code representing actual code used to generate the plurality of virtual web pages, and receive edits to the skeleton code that are translated into edits to the actual code.

In additional embodiments, the data elements are received via the user interface from an external source.

Additional disclosed embodiments relate to a system for enabling dynamic edits to web pages to update a backend database containing data sets that populate web pages. The system may include an online database configured to store a plurality of data elements for display on a plurality of web pages, the data elements organized into one or more groups of at least one data element, each group for display on a separate web page of a website, each separate web page lacking functionality for updating the online database; and at least one processor configured to perform operations. The operations may provide instructions remotely to a browser to provide an interface displaying an editable version of a first web page generated based on a group of at least one data element, the interface permitting a user to edit the at least one data element; translate edits received via the interface on the editable version of the first web page into updates for the online database; store the updates in the online database; and enable, during a live view of the first web page, a display on the first web page with the updates made to the editable version to the first web page.

Further embodiments include an operation to generate a plurality of separate editable versions of web pages, wherein each separate editable version of a web page is displayable within a frame associated with an editor interface of the interface.

Certain embodiments of the present disclosure relate to a system for previewing dynamic web pages via an online editor interface. The system may include an online database configured to: store a plurality of data elements for display on a plurality of web pages; and store first instructions for enabling organization of the data elements into a plurality of groups, each of the plurality of groups including at least one data element and being associated with at least one discrete web page, and each of the plurality of groups further being capable of being utilized by at least one of frontend code executable by a browser and backend code executable by a backend server remote from the browser to configure a plurality of scrollable virtual web pages; and at least one processor configured to: provide second instructions remotely to the browser to display an interface for enabling an user associated with the browser to add data elements to the database, to associate each added data element with at least one of the plurality of groups, and to modify the at least one of frontend code and backend code; execute third instructions to generate, based on the user's added data elements, association of added data elements with the at least one of the plurality of groups, and modification of the at least one of frontend code and backend code, the plurality of scrollable virtual web pages; wherein the plurality of scrollable virtual web pages are configured to be independently generated by the at least one processor and independently edited by the user; and provide fourth instructions remotely to the browser to display a preview interface configured to display the plurality of scrollable virtual web pages prior to generation of corresponding final web pages, the preview interface enabling the user to selectively scroll through the plurality of scrollable virtual web pages based on each of the plurality of groups of at least one data element and visualize how the groups of at least one data element will appear on a corresponding final web page before the corresponding final web page goes live.

In accordance with some embodiments, the system may provide additional instructions remotely to the browser to display the online editor interface to enable the user to drag and drop into a webpage template a selection of at least one building element for associating the at least one website building element with one of the data elements for constructing a front end of the corresponding final webpage.

Further, in accordance with some embodiments, the system includes a webpage template that is a dynamic webpage template configured to include adjustable data components for rendering the corresponding final webpage associated with each of the plurality of groups.

Still further, in accordance with some embodiments, the system may include a preview interface configured to be displayed at the browser within a frame associated with the online editor interface.

Additionally, in accordance with some embodiments, the system may include a plurality of scrollable virtual webpages displayable within a frame associated with the online editor interface.

Moreover, in accordance with some embodiments, the system may include a preview interface which may include a user-selectable feature enabling the user to scroll through the plurality of scrollable virtual webpages.

Further, in accordance with some embodiments, the system includes a preview interface which may include a user-selectable feature enabling the user to select a particular virtual webpage for display based on an identifier of the respective virtual webpage.

Still further, in accordance with some embodiments, the system may include identifiers for respective virtual webpages based on a data element stored in the database.

Additionally, in accordance with some embodiments, the system may associate a unique URL with each of the plurality of groups Moreover, in accordance with some embodiments, the system includes a plurality of scrollable virtual webpages may be generated based on a sitemap referencing each webpage's unique URL.

Further, in accordance with some embodiments, the system includes database which may include a centralized online database configured to store data associated with a plurality of user-generated websites of a plurality of remote users.

Still further, in accordance with some embodiments, the at least one discrete webpage is indexable by a search engine.

Additionally, in accordance with some embodiments, the system may include at least one of frontend code and backend code configured to perform a function of a software-based router.

Moreover, in accordance with some embodiment, the software-based router may be capable of configuring the at least one discrete webpage in a plurality of different ways based on a plurality of different possible URL segments provided by the user.

Further, in accordance with some embodiments, the system may include at least one of frontend code and backend code associated with the at least one discrete webpage.

Still further, the system may include at least one of frontend code and backend code associated with a specific software-based router.

Additionally, the plurality of groups may be associated with at least one of a website comprising a plurality of discrete webpages and an associated group of websites.

Moreover, in accordance with some embodiments, the system may include a subset of the plurality of data elements organized by a repeater function, the repeater function generating one or more displayed instances of the subset of the plurality of data elements.

Further, in accordance with some embodiments, the one or more instances may be part of the preview interface configured to display the plurality of scrollable virtual webpages.

Certain embodiments of the present disclosure relate to a computer-implemented method for previewing dynamic web pages via an online editor interface. The method may include storing a plurality of data elements for display on a plurality of webpages; and storing first instructions for enabling organization of the data elements into a plurality of groups, each of the plurality of groups including at least one data element and being associated with at least one discrete webpage, and each of the plurality of groups further being capable of being utilized by at least one of frontend code executable by a browser and backend code executable by a backend server remote from the browser to configure a plurality of scrollable virtual webpages; providing second instructions remotely to the browser to display an interface for enabling a user associated with the browser to add data elements to the database, to associate each added data element with at least one of the plurality of groups, and to modify the at least one of frontend code and backend code; executing third instructions to generate, based on the user's added data elements, association of added data elements with the at least one of the plurality of groups, and modification of the at least one of frontend code and backend code, the plurality of scrollable virtual webpages; wherein the plurality of scrollable virtual webpages are configured to be independently generated by the at least one processor and independently edited by the user; and providing fourth instructions remotely to the browser to display a preview interface configured to display the plurality of scrollable virtual webpages prior to generation of corresponding final webpages, the preview interface enabling the user to selectively scroll through the plurality of scrollable virtual webpages based on each of the plurality of groups of at least one data element and visualize how the groups of at least one data element will appear on a corresponding final webpage before the corresponding final webpage goes live.

In accordance with some embodiments, the method includes providing additional instructions remotely to the browser to display the online editor interface to enable the user to drag and drop into a webpage template a selection of at least one building element for associating the at least one website building element with one of the data elements for constructing a front end of a webpage.

Further, in accordance with some embodiments, the webpage template is a dynamic webpage template configured to include adjustable data components for rendering the corresponding final webpage associated with each of the plurality of groups.

Still further, in accordance with some embodiments, the preview interface is configured to be displayed at the browser within a frame associated with the online editor interface.

Certain embodiments of the present disclosure relate to a system for navigating between dynamic webpages, the system comprising an online database storing a plurality of data elements for display on a plurality of dynamic web pages. The database may also store first instructions for enabling organization of the data elements into a plurality of groups, each of the plurality of groups including at least one data element and being associated with at least one of the plurality of dynamic webpages, and each of the plurality of groups further being capable of being utilized by at least one of frontend code executable by a browser and backend code executable by a backend server remote from the browser to configure the plurality of dynamic web pages; wherein each of the plurality of dynamic webpages is configured to be independently generated and independently edited. The system may also include at least one processor configured to: provide second instructions remotely to the browser to display a navigation interface as part of the at least one of the plurality of dynamic webpages, the navigation interface configured to enable a user to selectively navigate through each of the plurality of dynamic webpages automatically generated based on each of the plurality of groups of at least one data element, wherein the navigation interface is not a native element of the plurality of dynamic webpages.

Further, in accordance with some embodiments, the system may perform at least one of searching the plurality of dynamic webpages may be navigating by selecting a dynamic webpage via a displayed feature, scrolling sequentially through the plurality of webpages, and going directly to a next, prior, first, last, bookmarked or other specific webpage.

Still further, in accordance with some embodiments, the dynamic webpages have a determined order based on a sitemap.

Additionally, in accordance with some embodiments, the system may include a navigation interface configured to be displayed at the browser within a frame dissociated from other aspects of the plurality of dynamic webpages.

Certain embodiments of the present disclosure relate to a system for hosting website implemented in a server environment. The system may include at least one hosting server configured to co-host a plurality of websites generated by a plurality of users, the hosting server including hosted common editing tools accessible to the plurality of users to enable each of the plurality of users to selectively alter specific websites generated by each of the plurality of users, the hosting server further being configured to prevent at least some of the plurality of users from altering co-hosted specific websites generated by others of the plurality of users; at least one processor configured to generate an interface, for display by at least one subset of the plurality of users, for enabling the at least one subset of the plurality of users to upload to the hosting server plugin code associated with plugins for the co-hosted specific websites generated by the at least one subset of the plurality of users, the plugin code for at least one specific plugin including at least one of: front-end plugin functionality code executable by a client; or back-end plugin functionality code executable at a plugin server; memory for storing the user-uploaded plugin code associated with the at least one specific plugin, such that the stored user-uploaded plugin code is centrally hosted in a common domain with the co-hosted specific websites generated by the plurality of users, wherein a single instance of the at least one specific plugin is shared by a plurality of the co-hosted specific websites; and wherein for each of the plurality of the co-hosted specific websites that share the at least one uploaded plugin, the at least one processor is further configured to securely enable, using an isolation mechanism, at least one of: execution of the front-end plugin functionality code at the client; or execution of the back-end plugin functionality code at the plugin server; wherein, based on the isolation mechanism, any malicious code contained in the at least one uploaded plugin is prevented from affecting others of the plurality of the co-hosted specific websites on the hosting server.

In accordance with some embodiments, plugin server and the hosting server included in the system are the same server.

Further, in accordance with some embodiments, the system may include an isolation mechanism which enables execution of the back-end plugin functionality code at the plugin server, which is separate from the hosting server.

Still further, in accordance with some embodiments, the system may include an isolation mechanism which enables execution of the back-end plugin functionality code at a virtual machine.

Additionally, in accordance with some embodiments, the system may include an isolation mechanism which enables execution of the back-end plugin functionality code at a docker container.

Moreover, in accordance with some embodiments, the system may include an isolation mechanism which enables execution of the back-end plugin functionality code through an isolated process at the plugin server.

Further, in accordance with some embodiments, the system the system may include an isolation mechanism includes which in execution of the front-end plugin functionality code in a secure subregion of a co-hosted specific website.

Still further, in accordance with some embodiments, the system may establish a secure communications channel for controlling communications between the subregion of the co-hosted specific website and other subregions of the co-hosted specific website.

Additionally, in accordance with some embodiments, the system may include a secure communications channel which is configured for restricting access of the at least one uploaded plugin to other aspects of the co-hosted specific website.

Moreover, in accordance with some embodiments, the system may include a secure communications channel which is created using an application programming interface configurable to limit interaction between the at least one uploaded plugin and the co-hosted specific website.

Further, in accordance with some embodiments, the system may include an isolation mechanism which enables execution of the front-end plugin functionality code through an iframe at a browser of the client, wherein the iframe is configured to function as a secure sandbox for the execution of the front-end plugin functionality code.

Still further, in accordance with some embodiments, the system may associate the front-end plugin functionality code executable by the client with separate web page subregions of a co-hosted specific website.

Additionally, in accordance with some embodiments, the system may associate two or more trusted plugins with a co-hosted specific website.

Moreover, in accordance with some embodiments, the system may enable the at least one uploaded plugin to communicate with and control at least one component of the co-hosted specific web page in which its front-end plugin functionality code executes.

Further, in accordance with some embodiments, the system may co-host the plurality of the co-hosted specific websites on a shared platform accessible to the plurality of users.

Still further, in accordance with some embodiments, the system may include at least one uploaded plugin which is isolated from cookies associated with a web page of a co-hosted specific website.

Certain embodiments of the present disclosure relate to a computer-implemented method for hosting websites implemented in a server environment, The method may include co-hosting, on a hosting server, a plurality of websites generated by a plurality of users; making available to the plurality of users common editing tools to enable each of the plurality of users to selectively alter specific websites generated by each of the plurality of users; preventing at least some of the plurality of users from altering co-hosted specific websites generated by others of the plurality of users; generating an interface, for display by at least one subset of the plurality of users, for enabling the at least one subset of the plurality of users to upload to the hosting server plugin code associated with plugins for the co-hosted specific websites generated by the at least one subset of the plurality of users, the plugin code for at least one specific plugin including at least one of: front-end plugin functionality code executable by a client; or back-end plugin functionality code executable at a plugin server; storing the user-uploaded plugin code associated with the at least one specific plugin, such that the stored user-uploaded plugin code is centrally hosted in a common domain with the co-hosted specific websites generated by the plurality of users, wherein a single instance of the at least one specific plugin is shared by a plurality of the co-hosted specific websites; and for each of the plurality of the co-hosted specific websites that share the at least one uploaded plugin, securely enabling, using an isolation mechanism, at least one of: execution of the front-end plugin functionality code at the client; or execution of the back-end plugin functionality code at the plugin server; wherein, based on the isolation mechanism, any malicious code contained in the at least one uploaded plugin is prevented from affecting others of the plurality of the co-hosted specific websites on the hosting server.

In accordance with some embodiments, the method may include at least one uploaded plugin which is isolated from cookies associated with a web page of a co-hosted specific website.

Further, in accordance with some embodiments, plugin server and the hosting server are the same server.

Still further, in accordance with some embodiments, the method may include isolation mechanism which enables execution of the back-end plugin functionality code at the plugin server, which is separate from the hosting server.

Additionally, in accordance with some embodiments, the method may include isolation mechanism which enables execution of the back-end plugin functionality code at a virtual machine.

Moreover, in accordance with some embodiments, the method may include isolation mechanism which enables execution of the back-end plugin functionality code at a docker container.

Further, in accordance with some embodiments, the method may include isolation mechanism which enables execution of the back-end plugin functionality code through an isolated process at the plugin server.

Still Further, in accordance with some embodiments, the method may include front-end plugin functionality code executable by the client and which is configured to generate a user interface in an iframe of a browser.

It is to be understood that the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 18 depicts generation of test data used in a test environment for testing websites, according to some embodiments of the present disclosure.

FIG. 25 illustrates an overlay process to generate the results of querying test data, according to some embodiments of the present disclosure.

FIG. 44 is an example user interface for editing a webpage and entries in a database collection, according to some embodiments of the present disclosure.

FIG. 45 is an example user interface for editing a webpage and displaying output from a database collection, according to some embodiments of the present disclosure.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

Systems and methods consistent with the present disclosure are directed to website building systems, including customized frontend and backend functionality. In some embodiments, the website building systems may include options for user configuration of backend functionality development capabilities.

Figure 1:
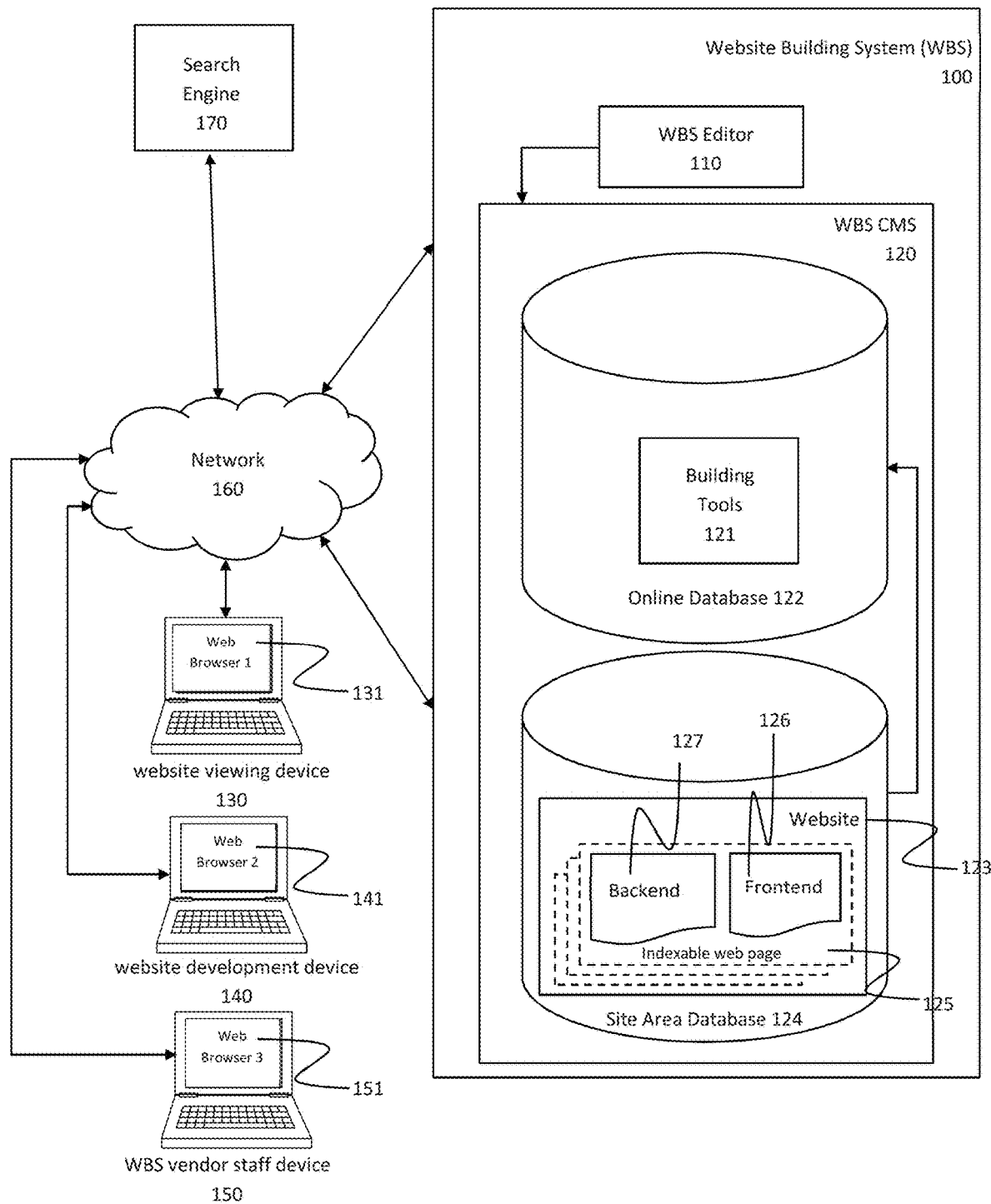
FIG. 1 depicts an exemplary online website building system interacting with other systems and components, according to some embodiments of the present disclosure.

FIG. 1 depicts an exemplary system interacting with other components and users over a network, according to some embodiments of the present disclosure. As shown in FIG. 1, Website Building System (WBS) 100 includes WBS editor 110, which may be a tool to create and edit websites. WBS 100 may also include a WBS content management system (CMS) 120, which may be a repository of widgets and other tools used in building websites, databases or similar data-storing structures, code or data which represents built or in-development websites, and the data created, updated, and viewed using the built or in-development websites (such as, for example, the inventory of an e-shop underlying an e-commerce web site).

WBS Editor 110 may be an editor to build and edit websites. The editor may allow web sites and web site pages to be built starting with a blank canvas or based on pre-developed sites, site sections or pages (jointly known as templates) which may be stored in WBS CMS 120. WBS editor 110 may define the visual layout and other attributes of the pages of a website being built. The templates may define the web pages belonging to the website being built and their initial content. WBS editor 110 may also includes a UI section to determine the arrangement of the site by defining the navigation between various pages. WBS Editor 110 defines layout of a page by allowing users to place components on web pages the way they would prefer the actual web pages to appear.

In some embodiments, as discussed further below, WBS 100 may host websites and individual pages through virtual machines, container instances, or serverless code. These techniques may improve load times and reduce latency for the user. For example, in a situation where a website has integrated backend or frontend code that must execute, or includes site-specific components, such code and components may be loaded into stateless server execution instances the first time such instances are associated with a request made by a browser (e.g., Web Browser 131) for a given site. Such stateless server instances could then be reused for further browser requests involving the same site. It further offers the benefit of allowing WBS 100 to use its server resources based on the actual requests being served, which is vastly more efficient then using dedicated web serve execution instances (such as servers, VMs or containers) and infrastructure.

Building Tools 121 may include widgets, which are components laid out on the pages being edited by the WBS Editor. In some embodiments, widgets may include apps that are developed by the user building the web page, other users, the WBS vendor itself or third-party application providers. Apps may come from repositories such as the WIX APP MARKET. Examples of widgets include simple widgets (such as text fields, shape etc.) or complex widgets (such as calendars, form generators, image editing, video editing, visitor counting, social media incorporation, etc.)

WBS CMS 120 may store both components for building websites and websites that have been built. In some embodiments, the components and websites are maintained in separate CMS systems. As shown in FIG. 1, the Building Tools 121 stored in WBS CMS 120, which includes widgets and other tools which aid in the easy building of a website.

Building Tools 121 are the building blocks of a website which ease the process of constructing and including content in a website. Building Tools 121 may include both component tools or widgets, as discussed above, such as tabs, search bar, buttons, gallery, slide decks etc., as well as operational tools such as alignment tools. Building Tools 121 may include both simple widgets (e.g., Buttons, Text Fields, etc.) and complex widgets (e.g., gallery, calendar widgets, etc.) and are configured to perform advanced functions. Building Tools 121 may be represented as an abstraction of the code representing the widgets and other tools. Building Tools 121 may include public default tools offered to all users of the system and private tools offered exclusively to a specific website or user. Private tools may include public tools that have been customized for the user or the website or new tools. Private tools may be created by the user of the system building the website or by third-party vendors. Building Tools 121 can be shared between multiple websites built by different groups of users and owned by different groups of users. Building Tools 121 can also be customized by editing code of the existing Building Tools 121 (e.g., updating a style sheet of a button to create a new style sheet for a new button). Custom building tools can be stored along with the original Building tools 121 in the System Area Database 122.

WBS editor 110 provides remote access to Building Tools 121 stored in System Area Database 122 of WBS CMS 120. An instance of a selected widget of Building Tools 121 may be created when a user places a widget on the pages being edited by WBS Editor 110. An instance of a widget selected from Building Tools 121 may be created by a reference to the widget in the page. An instance of a widget selected from Building Tools 121 may also be created by copying the code which represents the selected widget to the web page of the website being built.

WBS Editor 110 is software which is typically hosted on a server, while some or all of its elements may be loaded for execution on to user's website viewing device 130 (or its Web Browser 131). In some embodiments, WBS Editor 110 might share System Area Database 122 with Building Tools 121, or might share a common server. Nevertheless, in other embodiments, WBS Editor 110 and System Area Database 122 are separately hosted.

Site Area Database 124 stores the websites built using the WBS Editor 110. As shown, Website 123 is a website being built using WBS Editor 110 and stored in Site Area Database 124. Website 123 stored in Site Area Database 124 may include text representing code and data that can be accessed, updated, and viewed using Website Development Device 140. Website 123 may include one or more webpages including Indexable Web Page 125. In some embodiments, for example, one or more Indexable Web Pages 125 all share the same common domain (e.g., http://www.my-site.com), sub-domain (e.g., http://my-site.wix.com/) or URL prefix (e.g., http://www.wix.com/wixsites/my-site/). Indexable Web Page 125 may include Frontend 126 and Backend 127. Indexable Web Page 125 might include a special file or code, including or referencing Frontend 126 and Backend 127, or may be just a name for the collection Frontend 126 and Backend 127, as indicated by a dashed line. Frontend 126 may be composed of widgets and other UI elements, which may be instances of Building Tools 121, including instance-specific information (such as position, size, and attribute values); Such instance-specific information may also include containment information (i.e., which components are contained inside which containers). Frontend 126 may also include code elements such code segments to be executed in the Frontend 126 (possibly affecting the widgets during run-time). Frontend 126 may be further composed of other elements, such as page metadata, titles, etc.

Frontend 126 includes instances of Building Tools 121 placed on the Indexable Web Page 125 of Website 123 built using WBS Editor 110, such as those that are always visible to a user, are visible by default, or are visible at least some of the time. Backend 127 represents the functionality which may be activated when a user interacts with the Frontend 126 or through non-interaction events such as an incoming communication to Website 123, a time-based trigger, or a change to database connected to Website 123. Backend 127 may be seen only some of the time or may never be seen by the user of Website Development Device 140 and WBS Vendor Staff Device 150. Frontend 126 and Backend 127 may be stored in the Site Area Database 124 as code or structured data (e.g., XML, JSON, JSON-LD, etc.). The code can be stored in either in textual format or compiled object code. The code representing Frontend 126 and Backend 127 might be in same programming language or structured data format. In some embodiments, the code representing Backend 127 and code which is part of FE 126 is converted to a different programming language prior to saving to the Site Area Database 124.

In some embodiments, Website 123 code and data might share a database or might have separate databases. In some embodiments, the code representing Frontend 126 and Backend 127 may be stored in the Site Area Database 124 as plain text in a database table. In other embodiments, the code might be stored as file objects and might store a location of the file in Site Area Database 124. In some embodiments, the code is stored in a single location in a column of Site Area Database 124 or a file. In some embodiments the code might be divided between multiple files.

In some embodiments, Indexable Web Page 125 may be a dynamic web page and the Frontend 126 may be a template and not the actual webpage. As discussed further below, a dynamic webpage may be a web page configured to change in its appearance or content based on customized backend functionality. Examples of customized backend functionality, as discussed further below, include updating of data shown the webpage, resizing or altering images on the web page, triggering rendering of video content on the webpage, and more. In some embodiments, Frontend 126 of dynamic webpages may be a template bound directly to data from a database table to update the content and appearance of various dynamic web pages.

In some embodiments, WBS 100 may include greater or fewer of the components shown in FIG. 1. For example, the databases 122 and 124 might be a single database or separate databases. The databases might be distributed set of databases. Both databases 122 and 124 can be relational database, object-oriented databases, data language file repositories (for languages such as XML or JSON) or No SQL databases. Further, databases 122 and 124 may be maintained in an on-premises network (e.g., local area network, with access to the internet), in a cloud-based network (e.g., public or private cloud architecture), or a hybrid of an on-premises and cloud-based network.

As shown in FIG. 1, Website 123 stored in a Site Area Database 124 in WBS CMS 120 can be accessed by Website Viewing Device 130 (e.g., desktop computer, tablet, laptop, smartphone, etc.) via Web Browser 131. A user (not pictured) of Website Viewing Device 130 may request access to Website 123 via Network 160 (e.g., the internet, including intermediary networks between Website Viewing Device 130 and WBS 100). The Web Browser 131 (e.g., APPLE SAFARI, GOOGLE CHROME, MOZILLA FIREFOX, MICROSOFT EXPLORER, etc.) of Web Viewing Device 130 may be used to view the Website 123 and the data created and edited using the Website 123. Website Development Device 140 may be used to build Website 123 using WBS Editor 110. Web Browser 141 on Website Development Device 140 may be used to make a request to access the WBS Editor 110 to build Website 123. The WBS Vendor Staff Device 150 may be used to provide customer support for a user (not pictured) of Website Development Device 140 when building and maintaining Website 123. The WBS Vendor Staff Device 150 can also be used by third-party vendors to create and customize Building Tools 121. The WBS Vendor Staff Device 150 can also be used to configure WBS 100 itself—for example for managing the site designer and the user accounts, for managing of the site or page templates described above (creating new ones or editing existing ones) or for managing the various elements comprising WBS 100.

In some embodiments, Website Viewing Device 130, Website Development Device 140, and WBS Vendor Staff Device 150 can be physically different devices. In other embodiments, they can be different views accessed from same device using different credentials and/or different roles. In some embodiments, the web browser 131, 141, and 151 can be same browser or different browsers on the same or different devices or different tabs on the same browser.

The Website Viewing Device 130, Website Development Device 140, and WBS Vendor Staff Device 150 may access Website 123 via Network 160. In some embodiments, the Website Viewing Device 130, Website Development Device 140, and WBS Vendor Staff Device 150 might be a mobile device, laptop, desktop computer, tablet, etc.

As shown in FIG. 1, Search Engine 170 (e.g., GOOGLE, YAHOO, BING, etc.) may access Indexable Web Page 125 of Website 123 stored in Site Area Database 124 via Network 160, with or without also interacting with WBS 100. Search Engine 170 may index Indexable Web Page 125 of Website 123 for easy discovery and thereby increase the number of users using Website Viewing Device 130 to view the Website 123. In some embodiments. Building Tools 121 further allow users to optimize Website 123 for indexing and searching through Search Engine 170. For example, Building Tools 121 may allow users to choose text that appears in headers of a particular Indexable Web Page 125, in certain locations on Indexable Web Page 125, or that is associated (e.g., as metadata) with Indexable Web Page 125.

Figure 2:
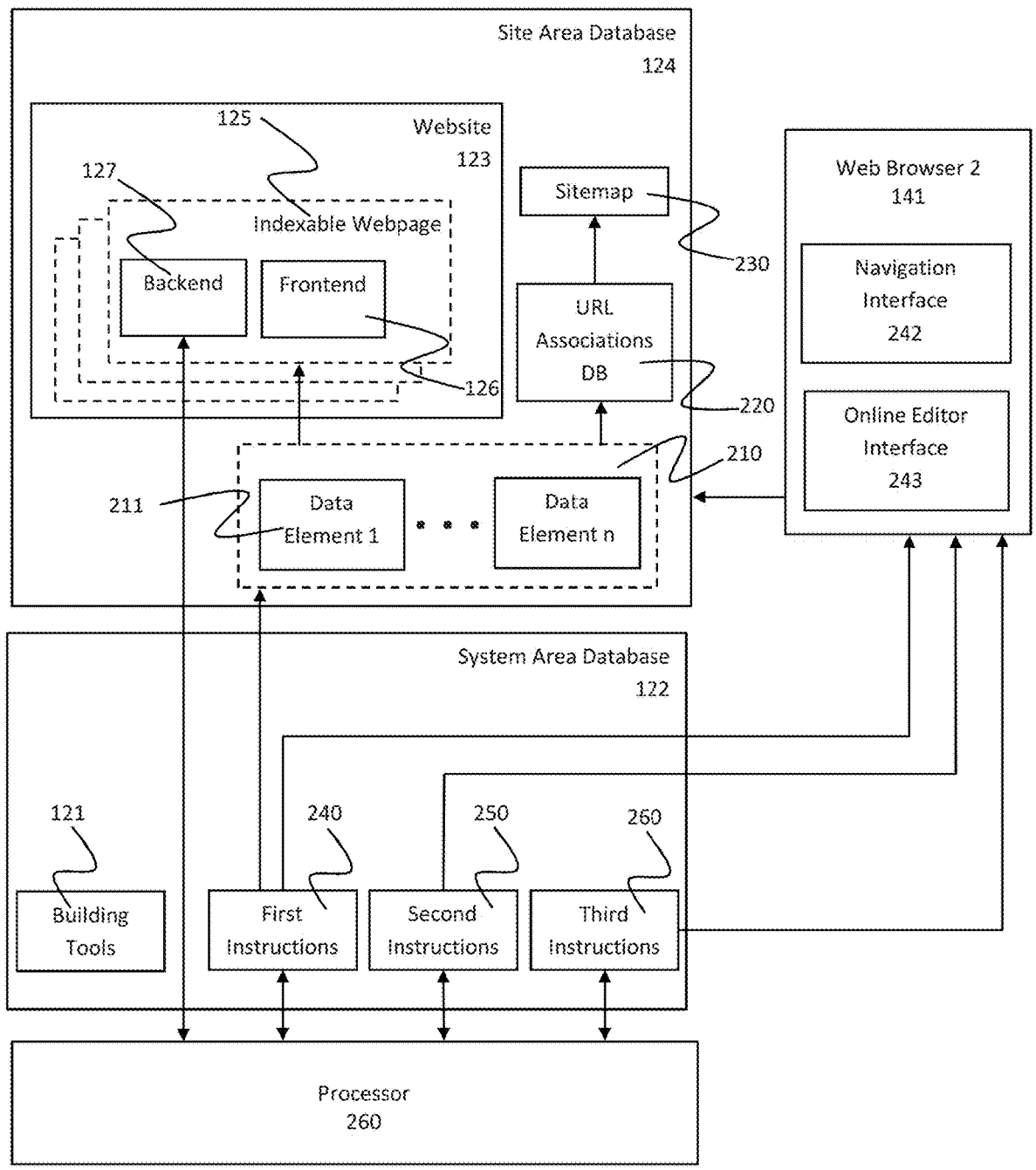
FIG. 2 depicts an exemplary online website building system, according to some embodiments of the present disclosure.

FIG. 2 depicts an exemplary structure for WBS 100, according to some embodiments of the present disclosure. As shown in FIG. 2, WBS 100 includes Site Area Database 124 including components for both building and hosting websites, as discussed above in connection with FIG. 1.

In some embodiments, Indexable Webpage 125 may be a dynamic or virtual webpage where Frontend 126 components might be populated with data from Data Group 210. Data Group 210 may be associated with more than one webpage. Data Group 210 may be composed of Data Elements including Data Element 211. Data Element 211 may be associated with one or more components of Building Tools 121 used in Frontend 126 of Indexable Webpage 125. As an example, Data Group 210 may be an employee database with each Data Element 211 being an employee record containing multiple data fields (such as name, age and department information). These multiple fields may be used to populate multiple visible components (display fields) in the Frontend 126 of Indexable Webpage 125. In some embodiments, Data Group 210 is stored in Site Area Database 124 as part of a table and Data Element 211 is a row in that table. A webpage associated with the Data Group 210 can be, for example, a dynamic webpage.

Data Elements 210 may be associated with URL Associations DB 220. When a user accesses Indexable Web Page 125 of Website 123 using Web Viewing Device 130 by typing a URL, the URL (or a segment thereof) may be matched against the URLs or URL segments stored in URL Associations DB 220 for referencing. Data groups may be associated with a URL or URL segment in URL Associations DB 220. A URL or URL segment in URL Associations DB 220 may help determine the data group to use in generating the virtual or dynamic webpage using the associated Indexable Web Page 125. In some embodiments, Indexable Webpage 125 is a template of a dynamic or virtual webpage and the actual webpage is generated using the data in Data Group 210 determined using a URL in URL Associations DB 220.

Data Elements 210 may be determined using a software-based router, which analyzes a URL (or URL segments) typed by a user or otherwise provided to access a Webpage 125 of Website 123 using Web Viewing Device 130. The analysis by the software-based router of the URL may result in a key to access Data Element 211 in Data Group 210. For example, with the URL http://mysite.wix.com/users/20, a software-based router may analyze the URL to determine that prefix "users" is associated with the data group and suffix "20" is the key resulting in looking up for data element in "users" associated data group which is identified by a key value "20." As described herein, a software-based router may be configured to analyze the suffix of a URL or a parameter within a URL to determine what version of a webpage, or what content in a webpage, to display. All of the above may apply to URL's which are not directly typed by the user, but are otherwise received by the system (e.g. URL's generated automatically by another page or page-associated code in the website). The system may also support multiple concurrently defined software routers, with the website building system 100 performing an initial analysis of a received URL to determine which of the defined software routers to use. Such analysis may make its determination based on the received URL, based on definitions included in URL Associations DB 220 or based on additional information or conditions (such as system environment conditions).

First Instructions 240 are a set of instructions accessed by Web Browser 141 and may be configurable through Processor 260. The First Instructions 240 help Web Browser 141 to remotely access a stored library of tools including Building Tools 121. The Online Editor Interface 243 may be the visual representation of the WBS Editor 110 software on Web Browser 141. Online Editor Interface 243 is used to create and edit Indexable Web Page 125's Frontend 126 layout implementation with the help of Building Tools 121 and associated Frontend 126 and Backend 127 code of Indexable Web Page 125. Similar to First Instructions 240, additional instructions (e.g., Second Instructions 250 and Third Instructions 260, among other instructions) may also be accessible to Processor 260 and Web Browser 141.

Web Browser 141 is used to build Website 123 by displaying Navigation Interface 242 to navigate among different parts of Website 123 and Online Editor Interface 213 to edit the accessed part of Website 123. Code representing WBS Editor 110 in WBS 100 may be transmitted to Web Browser 141 to display Navigation Interface 242 and Online Editor Interface 243.

Figure 3:
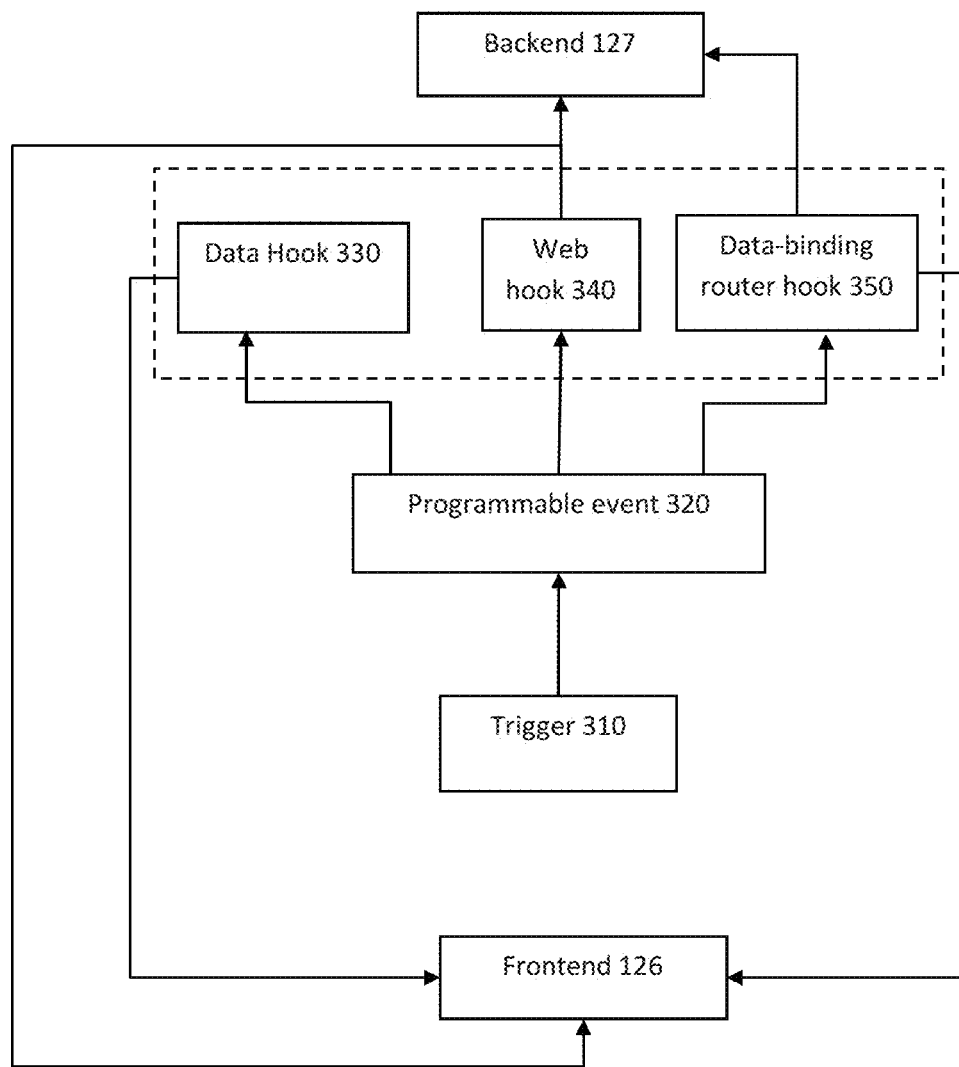
FIG. 3 illustrates a path to execution of backend code associated with a trigger, according to some embodiments of the present disclosure.

FIG. 3 illustrates a path to execution of backend code associated with a trigger, according to some embodiments of the present disclosure. As shown in FIG. 3, a Trigger 310 may result in execution of code associated with Backend 127. A Trigger 310 may occur, for example, when a user of a Web Viewing Device 130 interacting with Indexable Web Page 125 of Website 123 performs a specific action (e.g., a mouse or touchpad click, a selection, a hovering of a cursor, a reload request, entry of text, uploading of multimedia content, etc.). A Trigger 310 may also occur during a non-interaction event. For example, periodic time-based actions or database updates could result in a trigger and execution of Backend 127 and/or Frontend 127 code. Trigger 310 may be customizable and may take many different forms. Further, interactions which need to result in execution of code related to Backend 127 may be done through a Programmable Event 320. Programmable Event 320 passes control to Backend 127 for execution through a hook linking the Frontend 126 and Backend 127. The type of hook used for passing control between Programmable Event 320 and Backend 127 may be configurable and may also be dependent on the type of interaction or other type of event which caused Trigger 310. Programmable Event 320 utilizes one or more of Data Hook 330, Web Hook 340, or Data Binding Router Hook 350, among other possible types of hooks, to pass the control to Backend 127 to execute the code in it.

Data Hook 330 may be used to pass control from Programmable Event 320 to Backend 127 when any data update is entered by a user of Web Viewing Device 130 on Indexable Web Page 125 of Website 123 shown on Web Browser 131. For example, a form submission can be regarded as a data update and Data Hook 330 can be used to pass the control to Backend 127, which in some embodiments creates or updates a database entry. Similarly, as another example, posting text to a blog or social media interface may be a data update associated with Data Hook 330. Data Hook 330 may be also used to pass control to Backend 127 programmatically through an API call. For example, a periodic time-based action Trigger 310 may result in entries in a database older than a period to be deleted or marked inactive.

Web Hook 340 may be used to pass control from Programmable Event 320 to Backend 127 when a web module function is imported and called in the code which is part of Frontend 126. In some embodiments, for example, the code which is part of the Frontend 126 is called a frontend script and is executed when a user of web viewing device is interacting with the Frontend 126 components of the Indexable Web Page 125 of Website 123 displayed on Web Browser 123. For example, Web Hook 340 may be based on a user of Indexable Web Page 125 utilizing an app, making a purchase, subscribing to content on Indexable Web Page 125, etc.

Data Binding Router Hook 350 may be used to pass control from Programmable Event 320 to Backend 127 when a specific dynamic web page is requested by a user of Web Viewing Device 130 by navigating to a certain URL in Web Browser 131. One can navigate, for example, by entering an URL in the Web Browser 131 address bar, by clicking on a hyperlink on an Indexable Web Page 125 of Website 123 being viewed on Web Browser 131 or by performing an operation which automatically navigates to a predefined or programmatically generated URL. Data Binding Router Hook 350 helps determine the Data Group 210 and the Backend 127 code function to execute in order to apply the Data Element 211 of the determined Data Group 210 to the template of a web page defined in the function in Backend 127 code.

In some embodiments, Data Binding Router Hook 350 may function together with a software-based router. For example, if a user accessing Indexable Web Page 125 enters a URL for Indexable Web Page 125, a software-based router may determine what data to show on the Indexable Web Page 125 or even what specific webpage to show. A router may be associated with a prefix which may be the first part of a URL (or with another segment of the URL). For example, in the URL http://www.wix.com/label, "label" may be the prefix. Further, in the URL http://www.wix.com/label/sub-label, "sub-label" may be a suffix. Based on the particular segment (e.g., prefix, suffix, or value of a parameter) of the URL that is provided, the router may determine that content associated with either, or that a particular webpage associated with either, should be displayed. For example, the prefix may be associated with a router, while a suffix may be passed to the selected router to determine what page to access or what data to use in the page. Routers can also be used to generate complete virtual or dynamic pages based on selected data and a template. In this way, Indexable Web Page 125 of Website 123 can be made dynamic and customizable based on how users interact with it.

Data Binding Router Hook 350 may also function to pass control based on internal events following user interaction with Website 123 on Website Viewing Device 130. For example, Data Binding Router Hook 350 might be registered to execute a function prior to determining a routing to a page as described above to verify if a user has a permission to access the routed-to page. Data Hooks 330 might optionally run before or after Data Binding Router Hooks 350 for the same Trigger 310. For example, a Data Hook 330 might run after a query is run against database connected to Website 123 to filter out entries no longer active (e.g., a merchant store website might filter products no longer sold from database query search results). Thus, the system may support operating various combinations of hooks, and chaining of hooks to each other.

Figure 4:
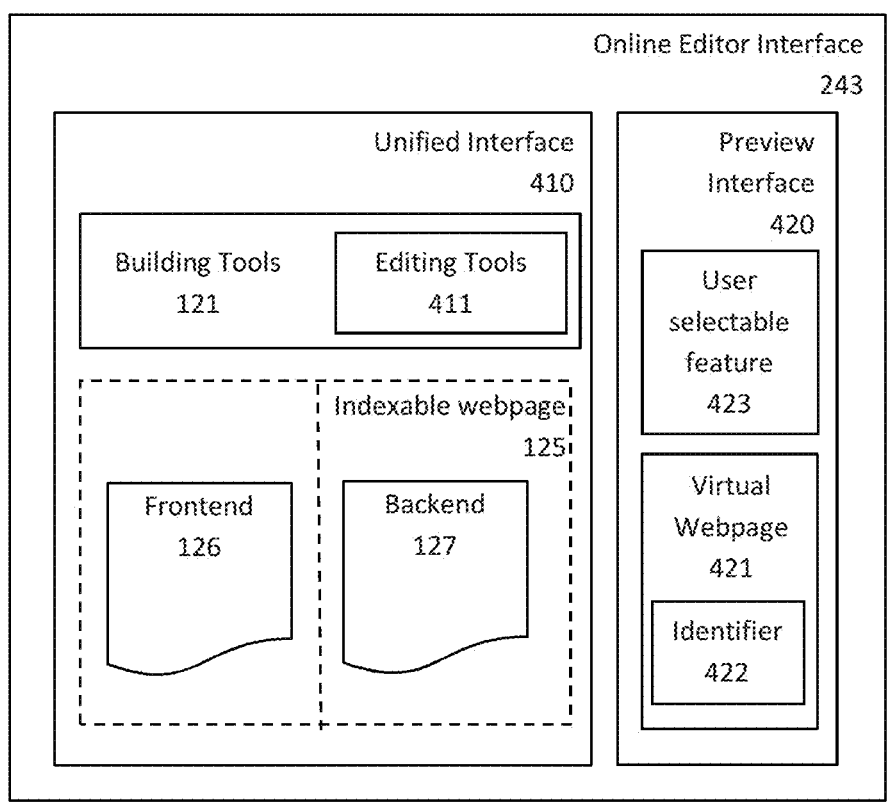
FIG. 4 depicts an exemplary online editor interface to update backend functionality, according to some embodiments of the present disclosure.

FIG. 4 is a block diagram showing an exemplary dynamic Web Page 125 in development mode being accessed on a Web Development Device 140 through Web Browser 141, according to some embodiments of the present disclosure. As shown in FIG. 4, Online Editor Interface 243 is composed of Unified Interface 410 and Preview Interface 420.

Unified Interface 410 may be used to develop or build Indexable Web Page 125 of a Website 123. Unified Interface 410 may provide access to the Building Tools 121, as discussed above. Building Tools 121 may include Editing Tools 411 to help edit Indexable Web Page 125 of Website 123. In some embodiments, the Unified Interface 410 might be a separate section visible on a Web Browser 141 during development. In other embodiments Unified Interface 410 might be a collective name for the various tools and user interface sections. In some embodiments, the Unified Interface 410 can be a separate section of a displayed webpage or a floating window or a frame. In some embodiments, components of the Unified Interface 410 might float around within a section of the Web Browser 141.

The Frontend 126 and Backend 127 might be shown or represented in an editing mode together or in separate windows. In some embodiments they might only be shown one at a time. Also, Backend 127 might not be specific to the Web Page 125 or Website 123 being displayed, and part or all of it may be shared between websites and developers of different websites. When a developer saves the Website 123, the frontend may be saved in the form of Frontend 126.

Preview Interface 420 helps users visualize the Website 123 being built by displaying Web Pages 125 as in the real world, i.e. as they would be shown in Web Browser 131 on Web Viewing Device 130 displaying the Virtual Webpage 421. Each Virtual Webpage 421 may be associated with a unique Identifier 422. In some embodiments the unique Identifier 422 is a URL or URL segment stored in the Site Area Database 124 along with other URLs 210. Other forms of Identifier 422 are possible as well.

Figure 5:
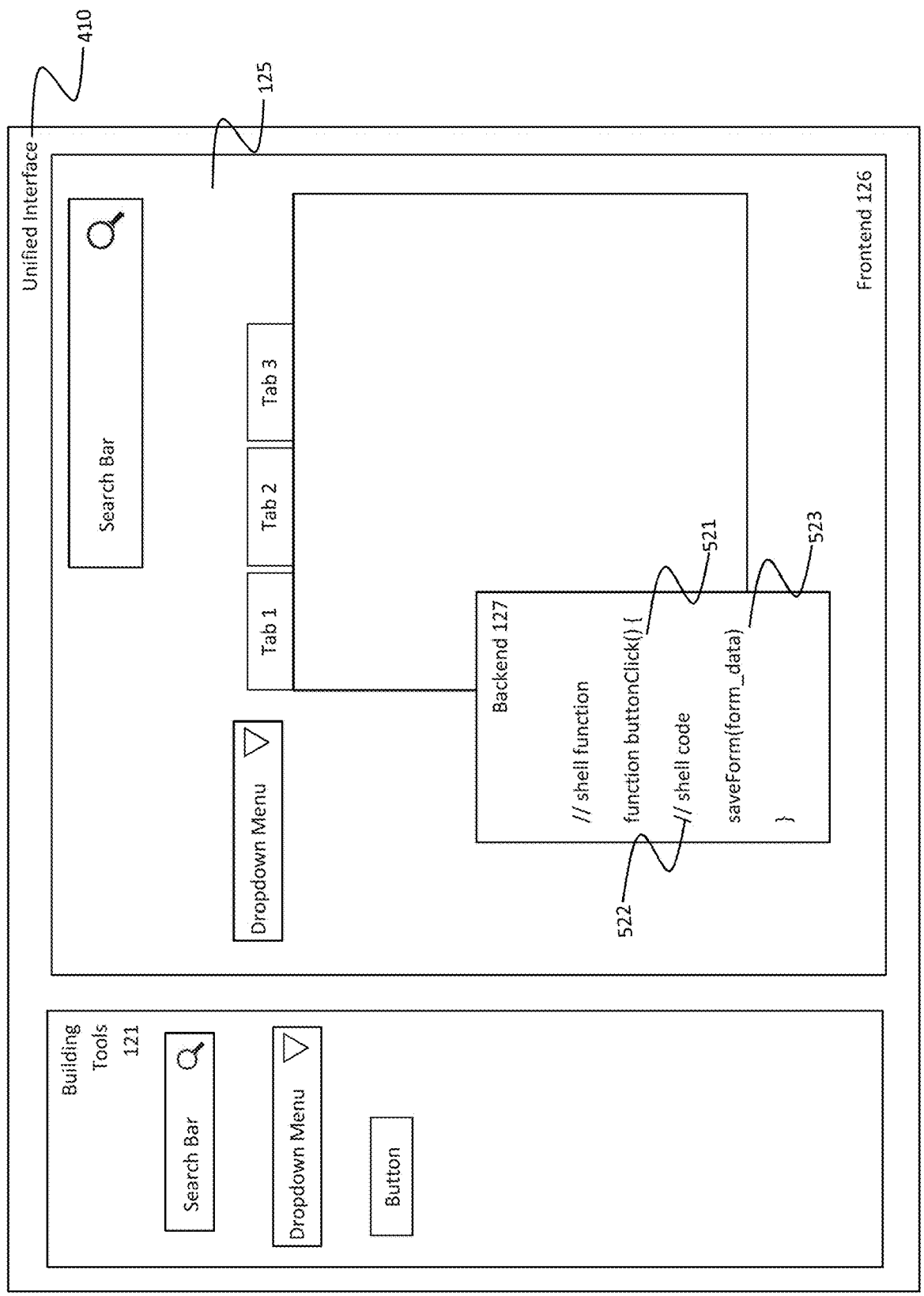
FIG. 5 is a block diagram showing an exemplary dynamic web page in development mode, according to some embodiments of the present disclosure.

FIG. 5 is a block diagram showing an exemplary dynamic or virtual webpage in development mode, according to some embodiments of the present disclosure. For example, as discussed above in connection with FIG. 4, the dynamic or virtual webpage may be Virtual Webpage 421.

As shown in FIG. 5, Unified Interface 410 displays Building Tools 121 and Indexable Web Page 125. In this exemplary illustration, Frontend 126 is shown using a WYSIWYG editor to edit visually the content of the page (e.g., text, graphics, widgets, etc.). In some embodiments, the Frontend 126 can be edited directly as code. In some embodiments, Building Tools 121 are a user interface section within the Unified Interface 410. In further embodiments, the Building Tools 121 can be accessed by menu items in Online Editor Interface 243. In some embodiment, particular website building tools selected from Building Tools 121 can be dragged and dropped in the Frontend 126 section of the Unified Interface 410. The Frontend 126 of the Indexable Web Page 125 shows the visual arrangement of Building Tools 121.

In some embodiments, Backend 127 is shown as a floating window within the Unified Interface 410. In other embodiments, Backend 127 could be a separate section similar to Frontend 126. Code representing Backend 127 might be hidden and not shown unless requested. In some embodiments, all the Backend 127 code is shown all the time, and in other embodiments only Backend 127 code associated with a single element from Building Tools 121 is shown.

WBS 100 may be configured to automatically to generate skeleton code on selecting an element from Building Tools 121 and placing the element in Frontend 126. The generated skeleton code shown in Backend 127 may include, for example, Shell Function 521 and Shell Code 522. Shell Function 521 and Shell Code 522 together represent a Programmable Event 320 in code executed by a Trigger 310. In some embodiments, as illustrated, buttonClick Shell Function 521 is code representing the event of clicking a button. The trigger of a button click results in a programmable event buttonClick.

Figure 6:
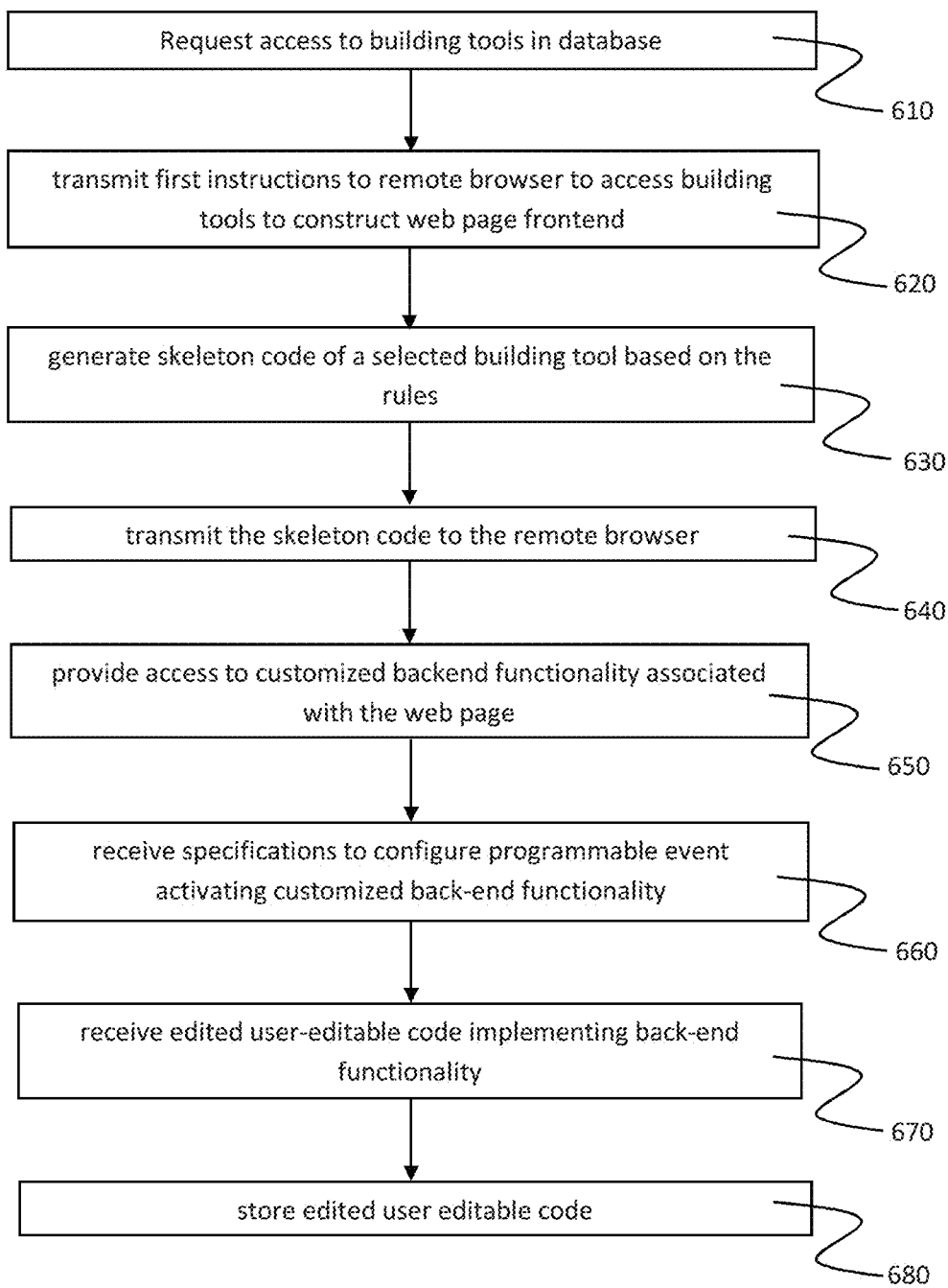
FIG. 6 is a flowchart illustrating a backend functionality development method, according to some embodiments of the present disclosure.

FIG. 6 is a flowchart illustrating Backend functionality 127 development Method 600, according to some embodiments of the present disclosure. In some embodiments, Method 600 may be performed by components of the WBS 100, as discussed above.

As shown in FIG. 6, in Step 610, WBS 100 receives a request to access Building Tools 121 in the Site Area Database 124 from a user of Web Development Device 140 when the user makes a request for Website 123 development via Web Browser 141. As discussed above, examples of Building Tools 121 include widgets, graphics, and other content.

In Step 620, WBS 100 transmits the First Instructions 240 on a request from Website Development Device 140 via the Web Browser 141. The request is received by the WBS 100 via the Network 160. The request is forwarded to website CMS 120. The website CMS 120 provides access to First Instructions 240 as requested by Processor 260 and are transmitted to the Website Browser 141. The First Instructions 230 provide access to the Building Tools 121 stored in Site Area Database 124 and which allow one to construct Web Page 125's Frontend 126 and Backend 127.

In Step 630, WBS 100, upon receiving a request from Website Development Device 140 over a Network 160 to use a tool within Building Tools 121, automatically generates skeleton code of a selected tool in Building Tools 121 based on the rules. For example, as discussed above in connection with FIG. 5, the skeleton code may be associated with an event, such as a mouse click, hovering, content selection, etc.

In Step 640, WBS 100 may transmit the skeleton code to the Website Development Device 140 to be shown on Web Browser 141.

In Step 650, WBS 100 may provide access to customized Backend functionality 127 associated with the Web Page 123 whose Frontend 126 is being edited or created. As discussed above, the Backend functionality 127 may take various different forms and may be configured to occur based on various defined events.

In Step 660, WBS 100 may receive specifications from a user of Website Development Device 140 through the Web Browser 141 to configure programmable Event 320 for activating customized Backend functionality 127.

In Step 670, WBS 100 may receive from the user of Website Development Device 140 through Web Browser 141 user-editable code implementing Backend functionality 127. The user may make edits to the code, such as by changing the functionality of the code, updating the code, etc.

In Step 680, WBS 100 may store the edited user editable code in Site Area Database 124 as received from Website Development Device 140 via the Network 160. The edited user editable code may then be ready for deployment to provide customized Backend 127 functionality for the Indexable Web Page 125.

Figure 7:
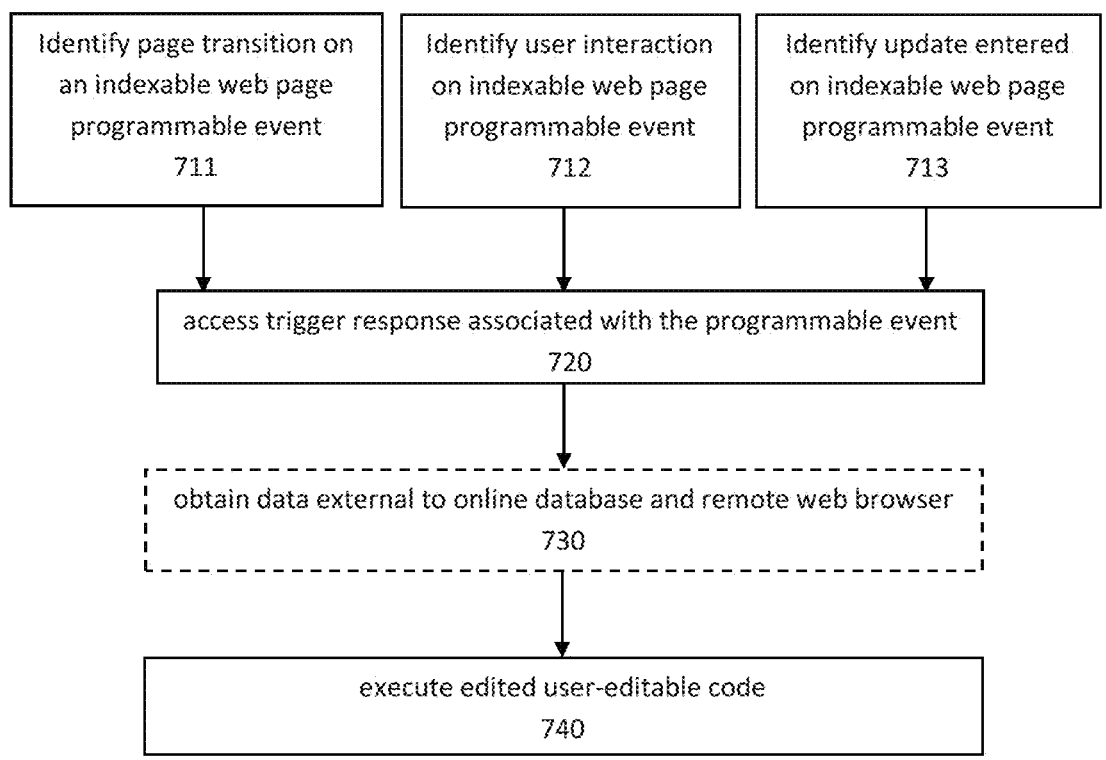
FIG. 7 is a flowchart illustrating a method to trigger backend code execution, according to some embodiments of the present disclosure.

FIG. 7 is a flowchart illustrating a Method 700 to trigger Backend 127 code execution, according to some embodiments of the present disclosure. Method 700 may be performed in conjunction with Method 600, as discussed above. Consistent with the above discussion, Method 700 may be performed in the system of WBS 100.

As shown in FIG. 7, a user of a Website Viewing Device 130 can Trigger 310 a Programmable Event 320 associated with the Backend 127 by either transitioning on an Indexable Web Page 125 as shown in Step 711, when a user of Website Viewing Device 130 interacts with the Indexable Web Page 125 as shown in Step 712, or when the user enters an update on an Indexable Web Page 125 and results in Trigger 310 as shown in Step 713. For example, Step 711 may involve a user clicking a nested hyperlink in Indexable Web Page 125 associated with another webpage part of the same Website 123. Similarly, Step 711 may involve a user clicking a "next" or "continue" hyperlink on Indexable Web Page 125 to view a subsequent related page. Step 712 may involve, for example, a user hovering a cursor over a graphic or text on Indexable Web Page 125, pausing for a predefined duration of time, clicking on an image or text on Indexable Web Page 125, etc. Step 713 may involve the user updating textual content on Indexable Web Page 125, uploading an image or video file to Indexable Web Page 125, filling out a form on Indexable Web Page 125, a period timer resulting in certain actions, a database update, etc.

In Step 720, WBS 100, upon receiving a notification of a Programmable Event 320, accesses Trigger 310 in response that is associated with the Programmable Event 320. As discussed above, the Programmable Event 320 may be based on various types of hooks, such as a Data Hook 330, Web Hook 340, Data-Binding Router Hook 350, or others. The hooks associated with the Programmable Event 320 may involve accessing data internal to a Website 123 (e.g., WixData) stored in Site Area Database 124.

In Step 730, WBS 100 may optionally obtain data external to online Site Area Database 124 and remote Web Browser 141 (e.g., from an external database, from another website, from a remote service, etc.). In some embodiments, such data may be used as part of the Programmable Event 320.

In Step 740, WBS 100 may request the Processor 260 to execute edited user-editable Backend 127 code. Accordingly, upon the Programmable Event 320, customized backend functionality may occur on the Indexable Web Page 125. As discussed above, this customized backend functionality may be defined in terms of its functionality, data source, and timing by input from the user. The user may be given guided control over the creation and editing of code (e.g., not having to code entire functions from scratch, but instead being given templates or samples of code) over each of these attributes of the customized backend functionality.

Systems and methods consistent with the present disclosure are also directed to on-demand website hosting systems, including functionality for hosting websites, serving websites to clients, monitoring website load, and responding to website load dynamics. In some embodiments, the on-demand executable instance may monitor website usage activity and automatically spin up or remove some or all execution instances. Further, as discussed below, webserver execution instances spun to serve websites or pages may include combinations of generic website code and site-specific or page-specific code, thus resulting in responsive and very efficient serving of highly tailored and individualized websites and pages.

In general, when users interact with websites, they may make a variety of HTTP requests. For example, an initial HTTP request may be made to load a webpage (which could, in some situations, trigger additional HTTP requests to load additional page elements, such as images or scripts). In addition, a user may make mid-session HTTP requests (e.g., selecting a value for a field, clicking a hyperlinked image, etc.). Further, a user may make a data-related HTTP request, such as through the submission of a form. In addition, a user may make a backend HTTP request, which could activate backend functionality (e.g., through backend code, as described herein).

In order to speed up the process of loading pages and handling HTTP requests, the system (e.g., WBS 100) may be configured to utilize rapid booting of docker containers or serverless code that are configured for a specific website or page. In some embodiments, as discussed herein, a pool of standby containers or other virtual computing resources may be provided with all relevant non-site-specific code but without any user-specific or site-specific code. The system may then listen on a live port for a request to a server for a specific web site. If there is a live container or other virtual computing resource associated with the specific website, the system may attach to it. Otherwise, the system can use a standby container from the pool and inject the requested site-specific content into it, or instruct it to load such content. Once the site-specific content for a given site is loaded, the container joins a pool of containers associated with the given site. As discussed herein, the injected site-level content may or may not include the actual site pages. Such site page information may be, for example, actual browser-ready page material (e.g., a collection of HTML, CSS and JavaScript code), underlying site definition data (e.g., using XML files or JSON expressions) which is converted into browser-ready material by client-side or server-side code (such as a WBS viewer module), or frontend or backend code (e.g. JavaScript code invoked by the page to run on the client, the server, or both).

Figure 8:
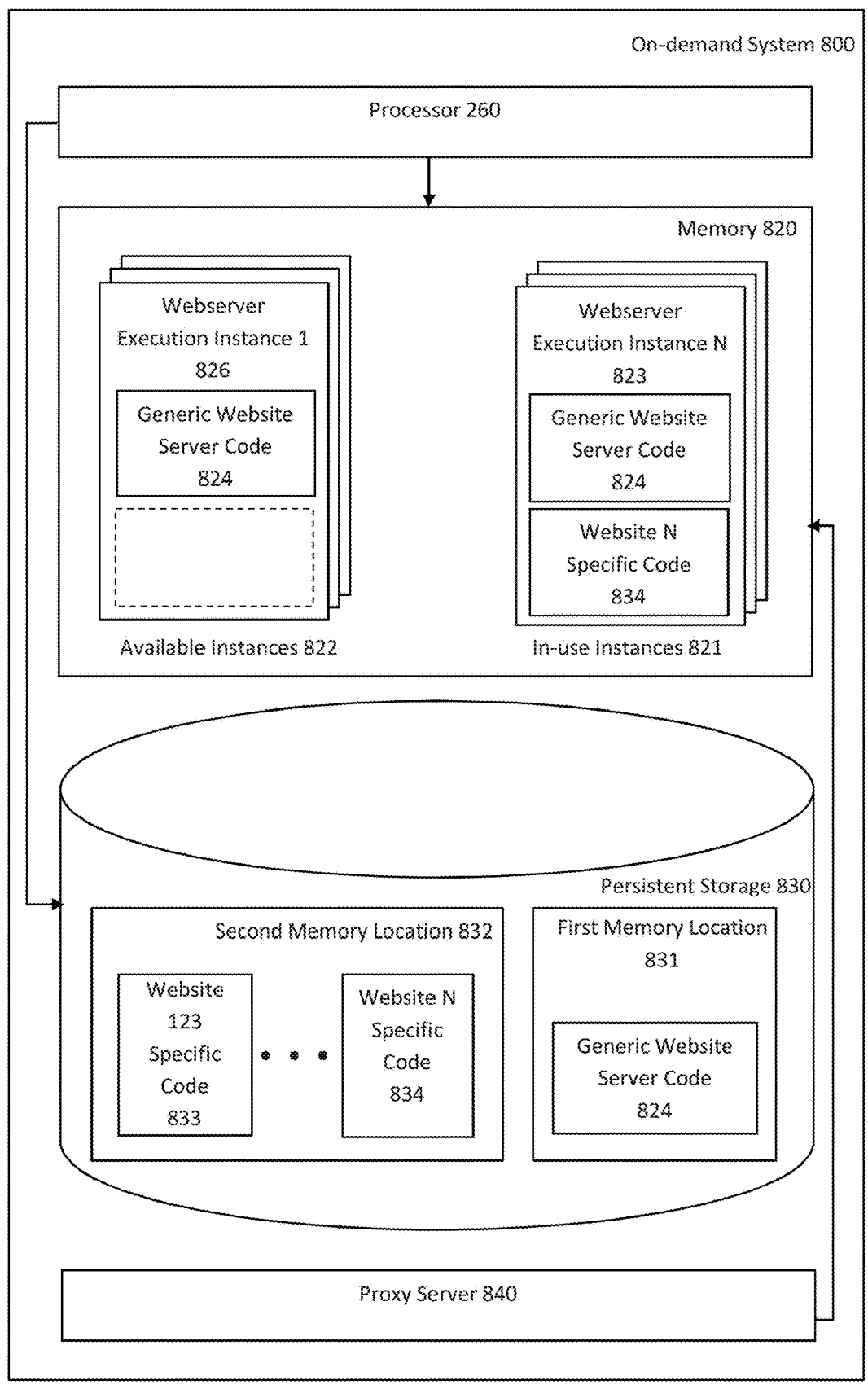
FIG. 8 depicts a block diagram of an on-demand web-server execution instance system, according to some embodiments of the present disclosure.

FIG. 8 depicts a block diagram of an On-Demand Web-Server Execution Instance System 800, according to some embodiments of the present disclosure. As show in FIG. 8, On-Demand System 800 includes a Processor 260, Memory 820 for storing currently or recently served websites, and Persistent Storage 830 to store all websites available to be served. In some embodiments, On-Demand System 800 may also include or be associated with a Proxy Server 840 to help determine if a new webserver execution instance is needed to serve a website request.

WBS System 100 and On-Demand System 800 store and access the code for web site editing and serving web requests, respectively. WBS Editor 110 is used to present web pages of websites for requests to edit, received from Web Development Device 140. Webserver execution instances are instantiated with code and page definitions created and edited using the WBS Editor 110 and stored in Site Area Database 124 so to view Indexable Web Page 125 during Web Site 123 editing as well runtime. In some embodiments, On-Demand System 800 may be a subsystem within the WBS 100. In some other embodiments, WBS 100 and On-Demand System 800 may share access to Frontend 126 and Backend 127 of Indexable Web Page 125 of Website 123. In some embodiments, Persistent Storage 830 may be a database similar to Site Area Database 124 in WBS 100. While WBS 100 may store Frontend 126 in structured data format, On-Demand System 800 might transform Frontend 126 into a code format understood by Web Browser 131 of Web Viewing Device 130. Unlike WBS 800, On-Demand System 800 typically has a read only access to the stored Frontend 126 and Backend 127 of an Indexable Web Page 125 (when used for run-time serving of web sites). But, when used in conjunction with the WBS Editor 110, On Demand System 800 can modify the Frontend 126 and/or Backend 127 of the Website 125 and other components of the Website 125. It should be clarified that the WBS 100 editor may work in conjunction with On-Demand System 800 (with the editor code being part of the Generic Website Server Code 824), but the editor itself may function as a layer above On-Demand System 800, and may not directly affect its functionality and decisions (e.g. allocation of execution instances to serve incoming requests).

Processor 260 may be associated with one or more servers that host elements of On-Demand System 800. For example, Processor 260 may be associated with a single server or a coordinated collection (e.g., farm) of servers. Further, in some embodiments each of the elements (e.g., each element within Memory 820, each element within Persistent Storage 830, Proxy Server 840, etc.) may have its own Processor 260 (e.g., as part of a dedicated server). Regardless of the number or type of Processors 260, each of the elements shown in On-Demand System 800 is capable of functioning both independently and in a coordinated manner.

Memory 820 may have one or more webserver execution instances to serve websites or pages to clients. In-Use Instances 821 may be webserver execution instances which are currently or actively serving websites. Available Instances 822, on the other hand, may be a set of webserver instances available in Memory 820 that are currently not hosting any specific website but are available to do so. In some embodiments, the number of webserver execution instances in Available Instances 822 may be a constant number. In some other embodiments, the number of webserver execution instances in Available Instances 822 might vary and depend on the number of webserver execution instances in In-Use Instances 821. For example, if there are a total of 10,000 execution instances, an increase in In-Use Instances 821 may mean a decrease in Available Instances 822, and vice versa. The number of webserver execution instances in Available Instances 822 may also be a percentage of the number of webserver execution instances in In-Use Instances 821. In-Use Instances 821 may, in some embodiments, be represented by a data structure containing a unique identifier identifying webserver Execution Instance 823 and other instances currently serving websites. In some embodiments, a similar data structure may be maintained per website hosted by On-Demand System 800 and all such data structures collectively represent In-Use Instances 821.

A Webserver Execution Instance 823 may be one of the In-Use Instances 821 serving requests to a website with the help of a webserver. Webserver Execution Instance 823 may include Generic Website Server Code 824 and Website N Specific Code 833. Generic Website Server Code 824 may, for example, be common code included in all web server execution instances. For example, such common code may include underlying webserver execution instance system elements (operating systems, web servers (e.g. Apache), database servers, etc.) In some embodiments, it may also include a WBS 100 editor or runtime environment along with common external services and plugins. Additionally, in some embodiments, the common code may include common website application-level server-side elements, such as the libraries and code related to major common items, such as WBS 100 vertical applications, etc. The common code may also include elements of common components (e.g., galleries) especially for co-hosted websites discussed below. For all of the above, the generic code may include actual server-side elements (which may be stored and executed on the server), as well as client-side elements (stored on the server and loaded on web page requests to the executing WBS 100 runtime client). In some embodiments, different groups of websites may include different Generic Website Server Code 824. Thus, for example, a commonly owned group of websites may have common Generic Website Server Code 824. This may also apply, for example, to multiple sites based on the same vertical market application framework (e.g. restaurants or hotels). Alternatively, different websites may have their own Generic Website Server Code 824, which may pertain to all webpages within each website.

Website N Specific Code 834 may include the code specific to the website or page being served by the Webserver Execution Instance 823 (such as Frontend 126 or Backend 127 code created by the website 126 Developer/Designer 1540 for the specific site). Webserver Execution Instance 823 may serve a website or page which includes Website N Specific Code 834 using a webserver (e.g., Apache, Tomcat, Nginx etc.) or a WBS-specific server. Website N Specific Code 834 may include, for example, code for performing functionality unique to the specific website or page, such as shopping cart functionality, payment processing, database access, app integration or execution, software-based router functions, and more. The discussion above and herein refers to Website Specific Code 834 related to a given website or page, and correspondingly to Webserver Execution Instance 823 which can serve requests coming from clients using the given website or page. However, On-Demand System 800 may be implemented at different levels of specific code granularity. The typical granularity level may be at the site level, i.e., where the Website Specific Code 834 covers an entire site—which is a level typically optimal for Webserver Execution Instance 823 reuse. However, the system can be implemented using a granularity level of a site group (for a group of very similar sites), entire site, site section (i.e., set of pages) and single page. For site groups, common parts for numerous sites can also be included in the Generic Website Server Code 824 as noted above.

Webserver Execution Instance 826 of Available Instances 822 may be used to serve the same website served by Webserver Execution Instance 823 of In-Use Instances 821 by injecting Website N Specific Code 833 into Webserver Execution Instance 826. In this manner, Webserver Execution Instance 823 may generate (and serve) individualized websites and pages based on the unique Website N Specific Code 834 associated with each website or page.

Persistent Storage 830 may include code generic and specific to all the websites hosted by On-Demand System 800 at First Memory Location 831 and Second Memory Location 832, respectively. Generic Website Server Code 824 may be stored, for example, in Persistent Storage 830 at First Memory Location 831. Website Specific Code 833 and 834 may be stored at Second Memory location 832, and may be code specific to websites 1 and N respectively. Persistent Storage 830 may, in various embodiments, be a distributed file system, database, or other storage system, and may be cloud-based (e.g., storage as a service). First Memory Location 831 and Second Memory Location 832 may be in different locations of the same storage system or in different storage systems which together form Persistent Storage 830. In some embodiments, Website Specific Code 833 and 834 each may be in different secondary memory locations or in the same location but separately labeled.

Generic Website Server Code 824 residing at First Memory Location 831 of Persistent Storage 830 may be copied to a webserver execution instance similar to Web Server Execution Instance 823 after spinning-up the instance. In this manner, the Generic Website Server Code 824, as well as any Website Specific Code 833-834, may be integrated to serve websites or pages that include common systems, web frameworks, libraries, components and plugins and individualized elements.

In various embodiments, each of the components of Memory 820, Persistent Storage 830, and Proxy Server 840 may be implemented through an on-premises computer network, a cloud computer network, or a hybrid network comprising both architectures. Examples of cloud hosting environments may include AMAZON WEB SERVICES, MICROSOFT AZURE, IBM CLOUD, and others, as well as proprietary cloud networks maintained by website hosting companies.

Proxy Server 840 helps determine whether a set of In-Use Instances 821 includes a webserver execution instance available to serve a request for a website generated from a Web Browser 131 of Web Viewing Device 130. Proxy Server 840 determines, for example, the availability of a webserver execution instance by interacting with Memory 820. For example, Memory 820 may maintain a list of Available Instances 822 and In-Use Instances 821, may poll Webserver Execution Instances 823 and 826 to determine their current status, or may receive other reporting information regarding the availability of a webserver execution instance. In some embodiments, Proxy Server 840 may handle HTTP requests (e.g., from clients) to access a specific website or page, and determine whether the specific website or page is already hosted by a Webserver Execution Instance 823. Further, in some embodiments, Proxy Server 840 may maintain a State Table 941 for use in determining the status of Available Instances 822 and In-Use Instances 821. Such a state table may identify such resources and the websites or pages they are already hosting.

Figure 9:
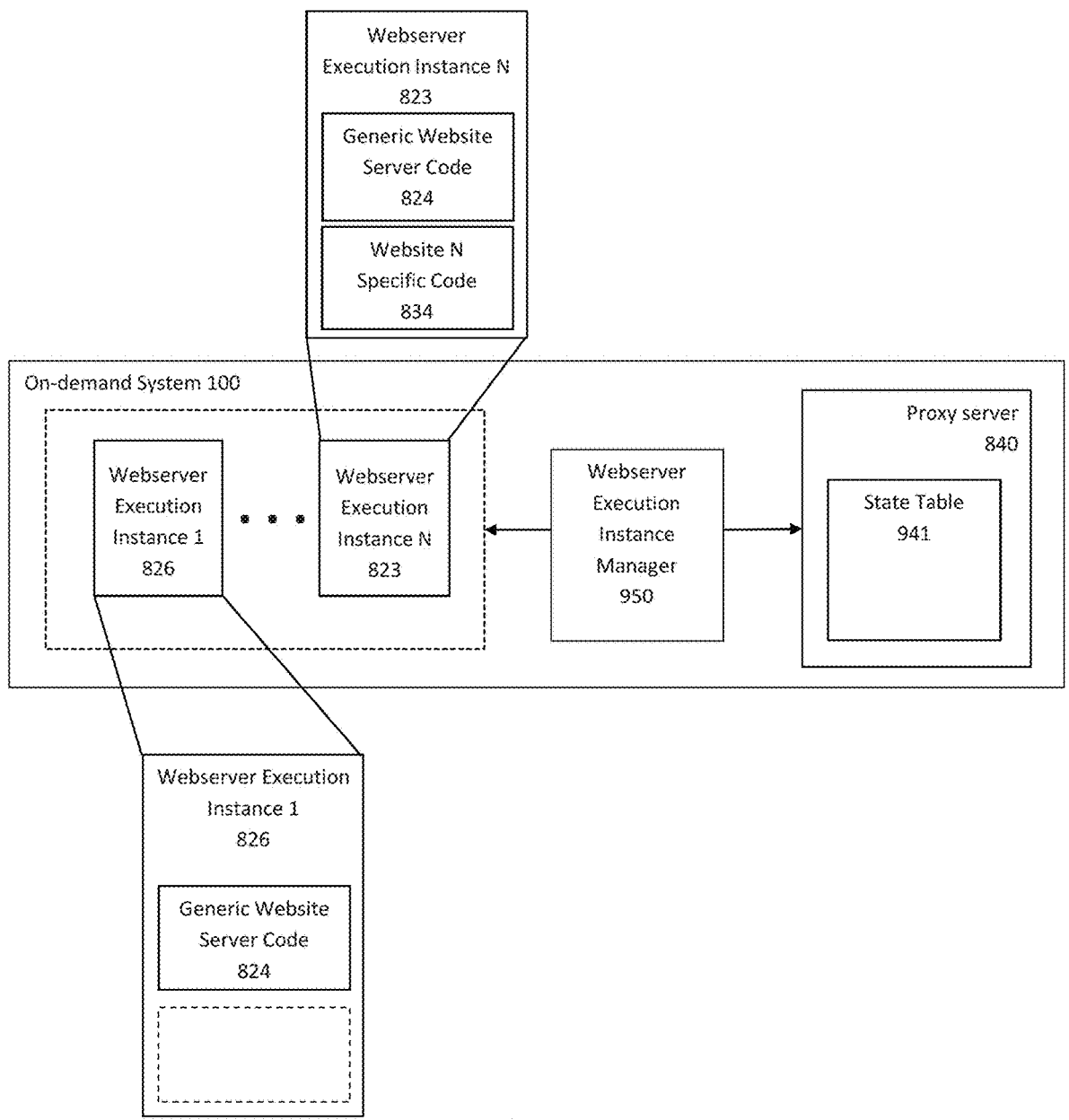
FIG. 9 depicts a schematic diagram of interaction between various on-demand web-server execution instance system components, according to some embodiments of the present disclosure.

FIG. 9 depicts a schematic diagram of interaction between On-Demand System 800 components, according to some embodiments of the present disclosure. As shown in FIG. 2, Webserver Execution Instance Manager 950 of On-Demand System 800 manages web server execution instances by communicating with the Webserver Execution Instances 823 and 826 and Proxy Server 840. In some embodiments, Webserver Execution Instance Manager 950 may determine if new web server execution instances need to be added to Available Instances 822. This may occur, for example, if there is an increase in the traffic associated with a particular website or page that is being hosted. In some embodiments, increased traffic load may be predicted based on prior knowledge inferred from gathered periodic traffic information for the site in the past. The past traffic information may include monthly, weekly, daily and hourly traffic data collected so to understand seasonal trends other times with most active usage of the site and automatically add more webserver execution instances serving a particular website. In some other embodiments, Webserver Execution Instance Manager 950 may determine if an instance of the In-Use Instances 821 is inactive. In this situation, resources may be wasted, since In-Use Instances 821 are operating or operational, despite not having any requests from clients to respond to with websites or pages. Thus, as discussed further below, any inactive In-Use Instances 821 may be deactivated or shut down. Similar to the process of adding new webserver execution instances for a website, predictions as discussed above based on prior usage information may be used to shutdown instances when there is less anticipated traffic. Webserver Execution Instance Manager 950 may make a determination to add more instances to the Available Instances 822 set and/or mark an Instance in In-Use Instances 821 as inactive by delegating the determination to Proxy Server 840. Proxy Server 840, as noted above, may include State Table 941 to help determine whether to add or remove webserver execution instances from In-Use Instances 821 and Available Instances 822. State Table 941 may maintain information associating particular In-Use Instances 821 and Available Instances 822 with their current status, historical status, or projected future status. Such status information may identify specific websites or pages that they are hosting, may host in the future, or have hosted in the past. Further, State Table 841 may include further information (e.g., how long In-Use Instances 821 and Available Instances 822 have been hosting websites or pages, how long In-Use Instances 821 and Available Instances 822 have been inactive, etc.).

Figure 10:
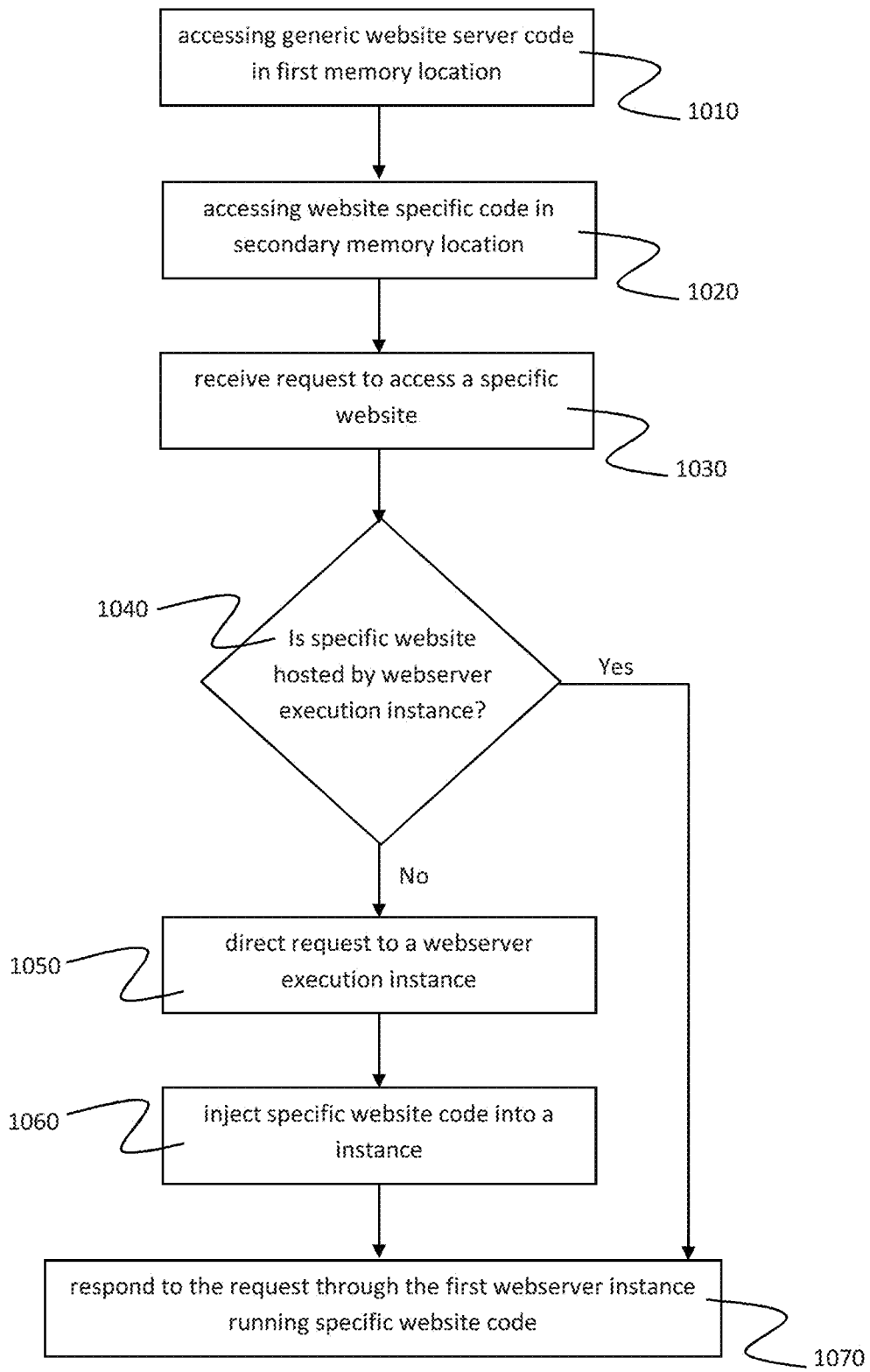
FIG. 10 is a flowchart illustrating a method for responding to a web request sent for a website, according to some embodiments of the present disclosure.

FIG. 10 is a flowchart illustrating a Method 1000 for responding to a web request sent for a website, according to some embodiments of the present disclosure. The Method 1000 in FIG. 10 identifies two paths to serve incoming web requests received by On-Demand System 800 from a Web Browser 131 of Web Viewing Device 130. Any setup requirements to serve the request might result in copying requested website specific code to a webserver execution instance serving the request to access a specific website.

As shown in FIG. 10, in Step 1010, On-Demand System 800 stores Generic Website Server Code 824 at First Memory Location 831 of Persistent Storage 830. As discussed above, this may involve storing code common to a group of websites (e.g., all of those owned by a common owner or based on a common vertical site framework) or common to a group of pages within a website. Further, Generic Website Server Code 824 may be associated with a defined, arbitrary grouping of websites or pages. As discussed above, Generic Website Server Code 824 may include code specifying common pieces of software different layers including operating systems, web frameworks, software libraries and website components and plugins, as well the WBS 100's own editor and viewer code.

In Step 1020, On-Demand System 800 may store Website N Specific Code 834 at Second Memory Location 832 of Persistent Storage 830. As discussed above, the Website N Specific Code 834 may be specific to a particular website or webpage. The Website N Specific Code 834 may include, for example, a widget, app, or custom backend or frontend functionality. Further the Website N Specific Code 833 may function such as a router for a particular website or page, as discussed above, where one or more segments from a URL entered by a user, or otherwise provided, determines how the website or page should assemble its contents (e.g., custom images, text, hyperlinks, forms, e-commerce features, personalized content, etc.).

In Step 1030, On-Demand System 800 may receive a request to access a website received from a Web Browser 131 on a Web Viewing Device 130. On-Demand System 800 handles the request by verifying if the website or page being requested is currently being served by one or more webserver execution instances in In-Use Instances 821. As discussed above, this may involve querying In-Use Instances 821 itself, querying Proxy Server 840, or obtaining a report from another service that monitors In-Use Instances 821. By referencing a lookup table or state table, the current operation (or lack thereof) of In-Use Instances 821 may be confirmed. In some embodiments, a single server may serve multiple websites or multiple clients of the same site, and the traffic load to and activity on to a particular server may be tracked and taken into account when determining which server to use to respond to additional requests.

In Step 1040, On-Demand System 800 verifies if Webserver Execution Instance 823 or other webserver execution instances in In-Use instances 821 serves the requested website. If yes, process 1000 may in some embodiments jump to Step 1070, which is discussed below.

If the answer in Step 1040 is no, process 1000 may proceed to Step 1050. If none of the webserver execution instances in In-Use Instances 821 serve the requested website, then the request may be forwarded to an available webserver execution instance in Available Instances 822. In some embodiments, the one of the webserver execution instances in Available Instances 822 may be selected for serving the requested website. In other embodiments, as shown in FIG. 10, Webserver Execution Instance 826 in Available Instances 822 receives the request for serving.

In Step 1060, a request may be sent to look up Website Specific Code 833 in Secondary Memory Location 832 matching the requested website. For example, as illustrated, Website 123 Specific Code 833 is the matching code if the request was received for Website 1. In some embodiments, Website Specific Code 833 matching the requested website is identified and copied to the Webserver Execution Instance 826. Webserver Execution Instance 826 is added to the list of In-Use Instances 821 (e.g., in a state table, or in Proxy Server 840), and removed from the list of Available Instances 822. The request is responded to (e.g., to the client) by Webserver Execution Instance 826. Process 1000 may then repeat (e.g., repeat to Step 1010, 1020, or 1030). Further, in Step 1060, the Website Specific Code 833 may be injected into Webserver Execution Instance 826, as discussed above, for integration into building a specific website or page requested by the user.

Figure 11:
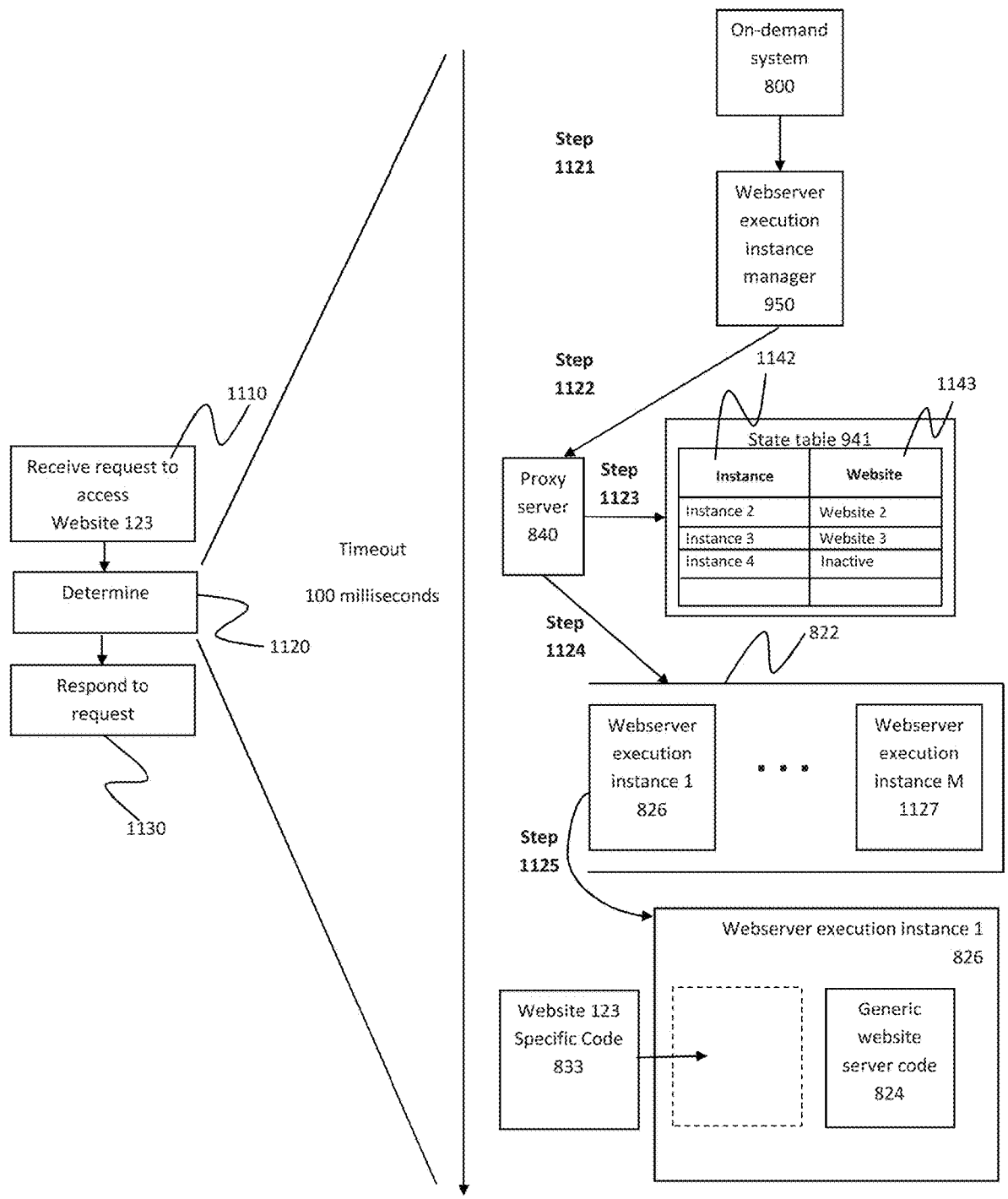
FIG. 11 is an illustration of an on-demand webserver execution instance system for determining whether a website is hosted, and generating and instantiating webserver execution instances, according to some embodiments of the present disclosure.

FIG. 11 is an illustration of On-Demand System 800 configured for determining whether a website is hosted, and generating or instantiating execution instances, according to some embodiments of the present disclosure. As shown in FIG. 11, Proxy Server 840 is used to determine the Steps to handle a request to access Website 123 received over Network 160 from Web Browser 131 of Web Viewing Device 130. Such a determination may result in immediate handling of the request by Webserver Execution Instance Manager 950 or instantiation of a webserver execution instance in Available Instances 822 using requested website specific code prior to handling the request.

As shown in FIG. 11, in Step 1110 On-Demand System 800 may receive a request for Website 123 over a Network 160. The request may come from a client computer or application, as discussed above. The request may be an HTTP request, HTTPS request, or another type of network request.

In Step 1120, On-Demand System 800 determines how best to serve the requested Website 123. As discussed above, the determination may include identifying whether a request can be handled by a current set of In-Use Instances 821 or an additional webserver execution instance is required. For example, On-Demand System 800 may determine that the current load on In-Use Instances 821 has passed a threshold of usage (e.g., threshold number of instances, amount of bandwidth used, percentage of bandwidth used, level of use of server resources such as memory or processor power etc.). In that event, it may be determined that one or more Available Instances 822 should be spun up or utilized to satisfy the demand for the particular website or page. Further, as discussed above, On-Demand System 800 may attempt to predict a future load state of In-Use Instances 821. Such a prediction may be made based on prior load levels, for example. Based on a predicted load level for In-Use Instances 821, On-Demand System 800 may likewise determine that one or more Available Instances 822 should be spun up or utilized to satisfy the forecasted demand for the particular website group, website, page set or page. On-Demand System 800 may also direct such incoming request to one of the In-Use Instances 821 (so to provide the best response time), and in parallel decide to spin up one or more Available Instances 822 so to make them available for future requests related to the given website or page.

In Step 1121, as part of the determination process, On-Demand System 800 may pass control to Webserver Execution Instance Manager 950 along with the request for Website 123 (e.g., a copy of the request, or information about the request). The request may be a request to access an indexable webpage of Website 123, a submission of a form, or various other types of requests.

In Step 1122, Webserver Execution Instance Manager 950 may delegate the determination to Proxy Server 840 to help determine how to handle the request to serve Website 123. This may involve the types of decision-making discussed above, including a determination of the current load status associated with the Website 123, projections of future load for the website, etc.

In Step 1123, Proxy Server 840 may reference the State Table 941 in Proxy Server 840 for the instances in In-Use Instances 821 which may serve the requested website. In some embodiments, the look up in State Table 941 may involve looking at a column termed "Website" 1143 in the table for a matching website URL. Other identifiers (e.g., URL, account name, arbitrary name, etc.) are possible too. In some embodiments, Step 1122 occurs periodically even when On-Demand System 800 did not receive a request to serve a website—as On-Demand System 800 may periodically monitor load levels based on historic website traffic trends and may automatically spin-up or shutdown webserver execution instances except when the current traffic trend suggests otherwise. In some embodiments, Webserver Execution Instance Manager 950 is forwarded the request for Website 123 after a failure to handle the request, indicating non-availability of a webserver execution instance to serve the request for the Website 123.

In Step 1123, Proxy Server 840 may send a request to a webserver execution instance in Available Instances 822 to pick the first available Webserver Execution Instance 826 to be marked for serving request for Website 123. In other embodiments, Webserver Execution Instance 826 may be chosen based on a policy that accounts for differences among Webserver Execution Instances 826 that makes them suitable or more optimal to handle the request (e.g., geographical location, applications running, memory available, processing power, disk/memory fragmentation level etc.).

In Step 1124, On-Demand System 800 selects a webserver execution instance in Available Instances 822 for serving the request for Website 123. In some embodiments, Webserver Execution Instance 826 is selected to serve the request for Website 123.

In Step 1125, Webserver Execution Instance 826 may be added to the set of In-Use Instances 121 by injecting Website 123 Specific Code 833 into Webserver Execution Instance 826. In some embodiments, the On-Demand System 800 may request the Proxy Server 840 to update State Table 941 with the entry for Webserver Execution Instance 826. State Table 841 may thus change, including adding a row with Instance 1142 and Website 1143 identifiers in State Table. In some embodiments, the first available instance, e.g., Webserver Execution Instance 826, may be selected to be injected with Site Specific Code 833. After this injection, Webserver Execution Instance 826 would be removed from the set of available instances 822.

In other embodiments, the selection may be based on geographical proximity to the Website 123 request location or the number of potential web requests which might originate from a certain geographical location. In some embodiments, multiple web server execution instances may be injected with Website 123 Specific Code 833 and added to the set of In-Use Instances 821.

Determination 1120 to handle requested Website 123 may further have a timeout threshold (e.g., 10 or 100 milliseconds). The timeout period may match the general web standard to serve web page requests. Webserver execution instances which are part of Available Instances 822 help reduce the time to spin-up instances when a new website request is placed. The cold start problems of prior, conventional website building systems are thus reduced.

In Step 1130, Webserver Execution Instance 826 may serve the request for Website 123 using Website 123 Specific Code 833. As discussed above, by serving a website or page generated using Website 123 Specific Code 833, the content of the website may be tailored to the user or how the user arrived at the site (e.g., using a software-based router). In some embodiment, the injection step itself may modify the injected material, e.g. adapting it to the specific user/platform/device making the request or to other "environmental" conditions (country, language, database accessed, user access history, etc.). The client code initiating the network request may add additional parameters or information to the network request so to enable the injecting module to perform such adaptation. The additional information can be added directly (e.g. as added URL or other request parameters) or indirectly (e.g. by available through an additional request, prior storage in a database or other method).

Figure 12:
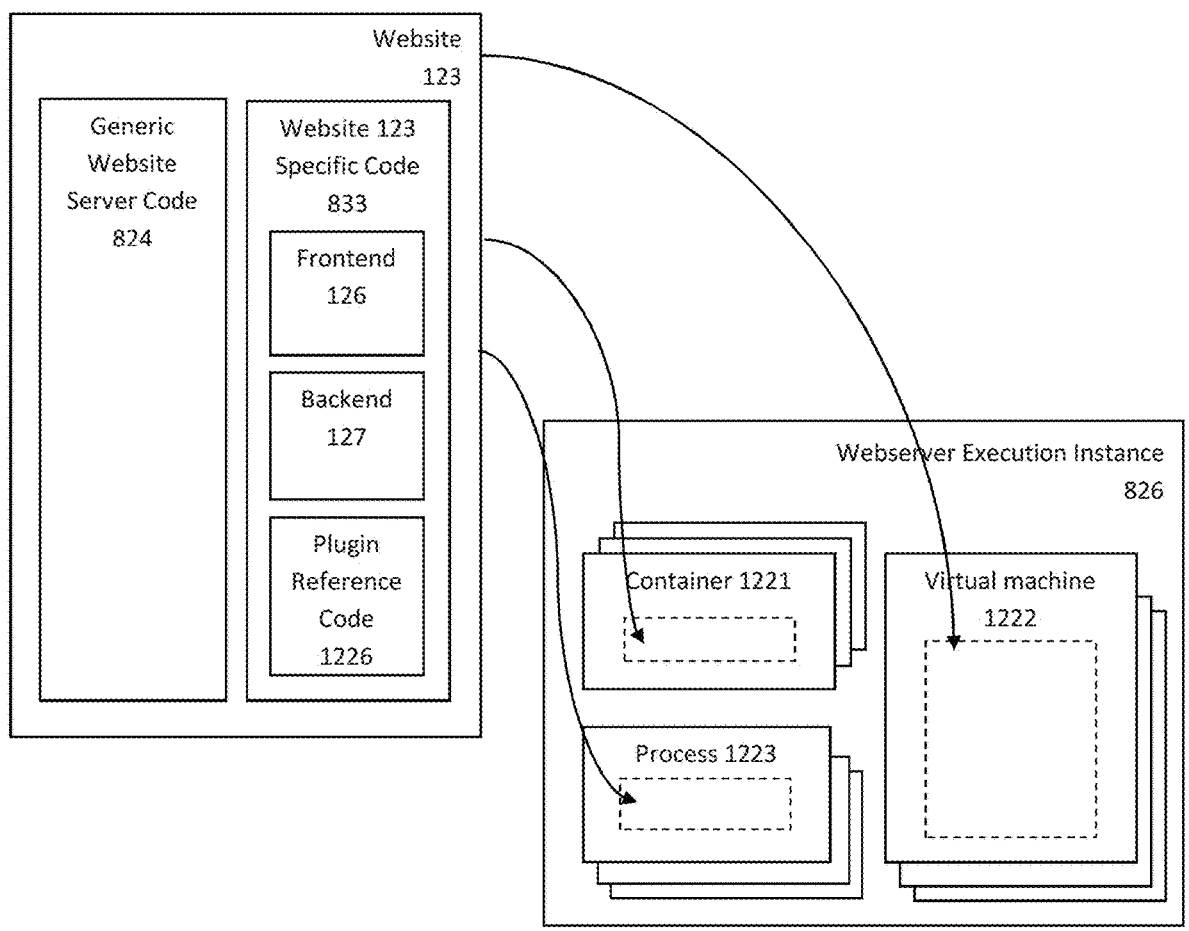
FIG. 12 depicts instantiation of webserver execution instance elements with a website, according to some embodiments of the present disclosure.

FIG. 12 depicts an instantiation of server infrastructure elements with a website, according to some embodiments of the present disclosure. The techniques of FIG. 12 may be practiced in the systems described above and described throughout this disclosure.

As shown in FIG. 12, Website 123 may be served through a webserver execution instance by copying Website 123 Specific Code 833 to Container 1221 or Virtual Machine 1222. In some embodiments, Website 123 may be served by a separate operating system Process 1223 (e.g., via serverless code). Website 123 Specific Code 833 may include Frontend 126, Backend 127, and Plugin Reference Code 1226, as discussed above in connection with the customized backend functionality that may be provided in websites. In some embodiments, Frontend 126, Backend 127, and Plugin Reference Code 1226 may be copied to individually to Container 1221, Virtual Machine 1222, or Process 1223. In some embodiments, Generic Website Server Code 824 may be copied to Container 1221 or Virtual machine 1222 (which would later include Website 123 Specific Code 833) as part of Webserver Execution Instance 826 instantiation.

In some embodiments, the use of On-Demand System 800, such as through a serverless code implementation, may improve processing times and server utilization, while reducing latency for users. In serverless code embodiments, there are no dedicated servers to manage. Instead, code (e.g., Frontend 126, Backend 126, and Plugin Reference Code 1226) may be provided as code and executed on-demand in the cloud. To the extent users are charged for the code execution, they may be charged proportional the actual execution of the code (rather than based on dedicated infrastructure costs or servers which must remain allocated to a given site while waiting for incoming requests). Alternatively, this may substantially reduce the costs for an on-line WBS vendor, while allowing it to provide better service to its users. In some embodiments, On-Demand System 800 may define a set of programming languages or web frameworks that it supports for processing serverless code. On-Demand System 800 may also support WebSockets, streaming or chunked communications, additional protocols (e.g., TCP and UDP, etc.), memory as a service functionality (e.g., for stateless, side-effect-free code functions), and native serverless options (e.g., Go, Rust, C, etc.). By being able to process serverless code on-demand, the problems of conventional website hosting systems (e.g., experiencing a "cold start" to load instances of machines or websites) may be reduced. Start time for websites or pages (including any running code) may be less than 100 ms, thus reducing latency and improving the user experience. By contrast, some conventional systems experience a start time of websites or pages of roughly 600 ms to 2 seconds, including the functions of scheduling overhead, starting an instance, starting a process (e.g., code execution), and request handler functioning.

Website Execution Instance 826 may serve multiple websites through Container 1221, Virtual Machine 1222, or Process 1223. In some embodiments, Webserver Execution Instance 826 may have a set of Container 1221, Virtual Machine 1222, and Process 1223 resources devoted to it or available to it. Multiple Containers 1221, Virtual Machines 1222, and Processes 1223 may serve multiple websites. In some embodiments, Website Execution Instance 826 variants which may serve multiple websites may include a single Container 1221, Virtual Machine 1222, or Process 1223 serving multiple websites. Container 1221, Virtual Machine 1222, and Process 1223 serving multiple websites may need multiple websites site specific code to be copied to serve various website requests.

Figure 13:
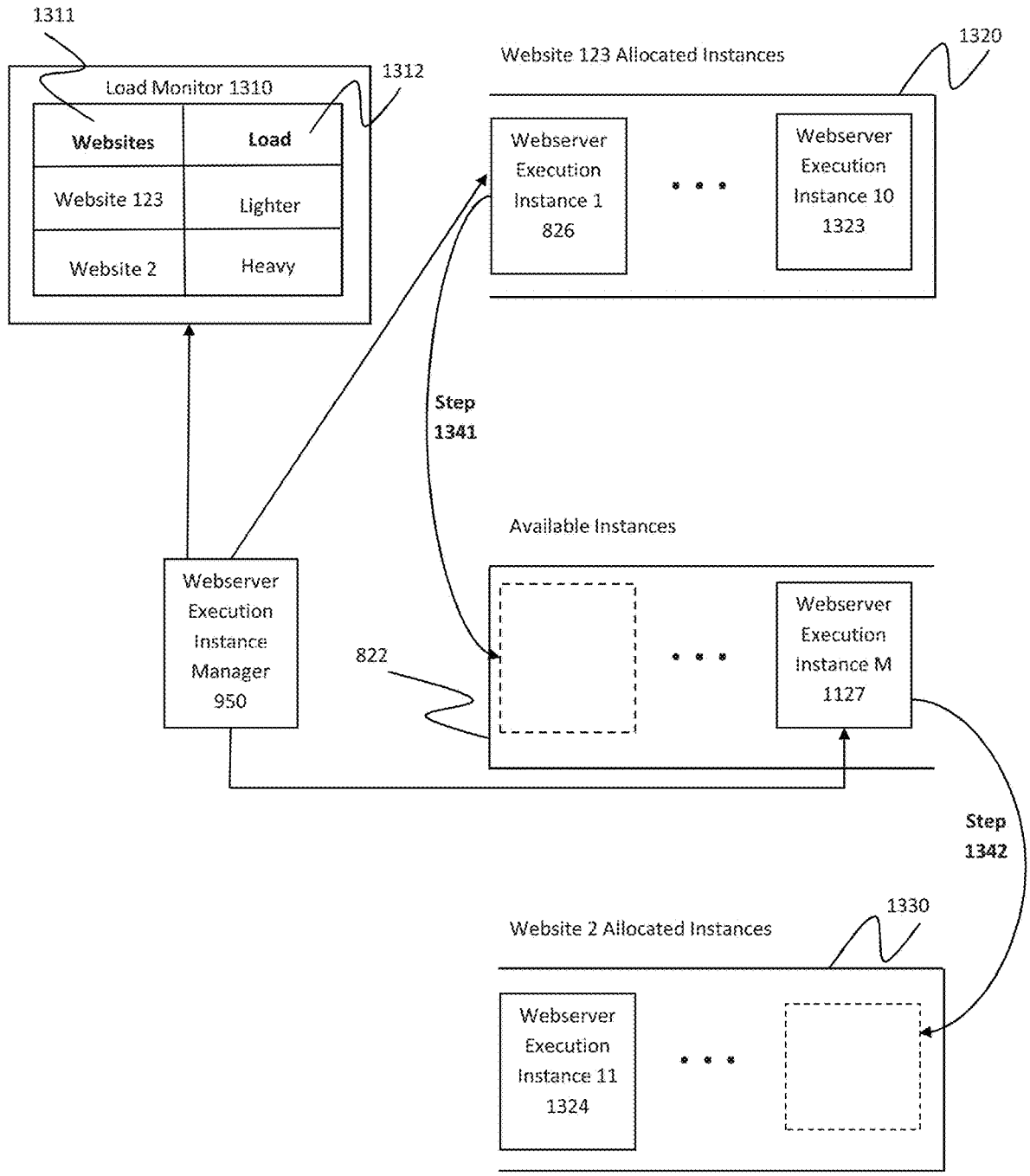
FIG. 13 depicts load monitoring of hosted websites and managing in-use instances, according to some embodiments of the present disclosure.

FIG. 13 depicts techniques of load monitoring of hosted websites and managing In-Use Instances 821, according to some embodiments of the present disclosure. These techniques may be practiced in the systems as described above.

As shown in FIG. 13, Webserver Execution Instance Manager 950 (as discussed above in connection with FIG. 11) monitors or communicates with the Load Monitor 1310 to determine if any of the websites served by On-Demand System 800 have a heavier load than desired or budgeted. As discussed above, this may be determined based on current, prior, or future load characteristics. In some embodiments, future load may be predicted based on prior knowledge based on gathered periodic load of the website/webserver hosting multiple websites in the past. The past load may include monthly, weekly, daily and hourly to understand seasonal trends other times with most active usage of the site and automatically add more webserver execution instances serving a particular website or group of websites being served by a webserver.

When websites have a relatively lighter load, some instances are removed from the set of In-Use Instances 821 for a particular website and moved back to Available Instances 822. In some embodiments, Load Monitor 1310 lists all the Websites 1311 hosted by On-Demand System 800 and their Load 1312 in a tabular form. In some embodiments, Load Monitor 1310 table listing Website load may be part of State Table 941 managed by or accessible to Proxy Server 840. In some other embodiments, Load Monitor 1310 may be a separate table in Proxy Server 840. In other embodiments, Load Monitor 1310 may be in Memory 820 of On-Demand System 800.

In some embodiments, In-Use Instances 821 may be a collection of separate sets of instances hosting some or all websites of On-Demand System 800. In some embodiments, Websites 123 and 2, as illustrated, are the websites hosted by On-Demand System 800. In various embodiments, Website 123 Allocated Instances 1320 and Website 2 Allocated Instances are 1330 are the set of webserver execution instances of Website 123 and Website 2. In some embodiments, Website 123 Allocated Instances 1320 and Website 2 Allocated Instances 1330 together are considered In-Use Instances 822.

Load Monitor 1310 load table may be updated by Webserver Execution Instance Manager 950 directly or it might request Proxy Server 840 to update it. In some embodiments, Load Monitor 1310 load table is updated periodically by Proxy Server 840 based on the number of requests to access to Websites 1311 hosted by On-Demand System 800. Load Monitor 1310 load table may be updated based on other website usage statistics. For example, for a multimedia-heavy website, the usage statistics might include usage of memory and processor cycles to serve website requests involving conversion of video and audio to different formats based on the environment of the device used by the use. Webserver execution instances of In-Use Instances 821 are moved to Available Instances 822 when the website they are hosting has a lighter load. Similarly, when a website has a higher load, webserver execution instances of Available Instances 822 are marked In-Use Instances 821 and website specific code for the website with heavier load is injected into these webserver execution instances.

In some embodiments, based on Proxy Server 840 observing that Website 123 has a load that is lighter, On-Demand System 800 may cause Webserver Execution Instance 826 to be moved from Website 123 Allocated Instances 1320 set to Available Instances 822 set. In some embodiments, Webserver Execution Instance 1323 is moved to Available Instances 822. In some embodiments, multiple webserver execution instances are moved to Available Instances 822 at the same time. Proxy Server 840, on observing that Website 2 has a heavier load in Load Monitor 1310, may move Webserver Execution Instance 1127 from Available Instances 822 set to Website 2 Allocated Instances 1330 set. As part of Step 1342, Website 2 may have site-specific or page-specific code that is injected into Webserver Execution Instance M 1127 before moving it to Website 2 Allocated Instances 1330. Of course, Step 1341 and Step 642 are independent and do not have occur together or in any specific order.

Figure 14:
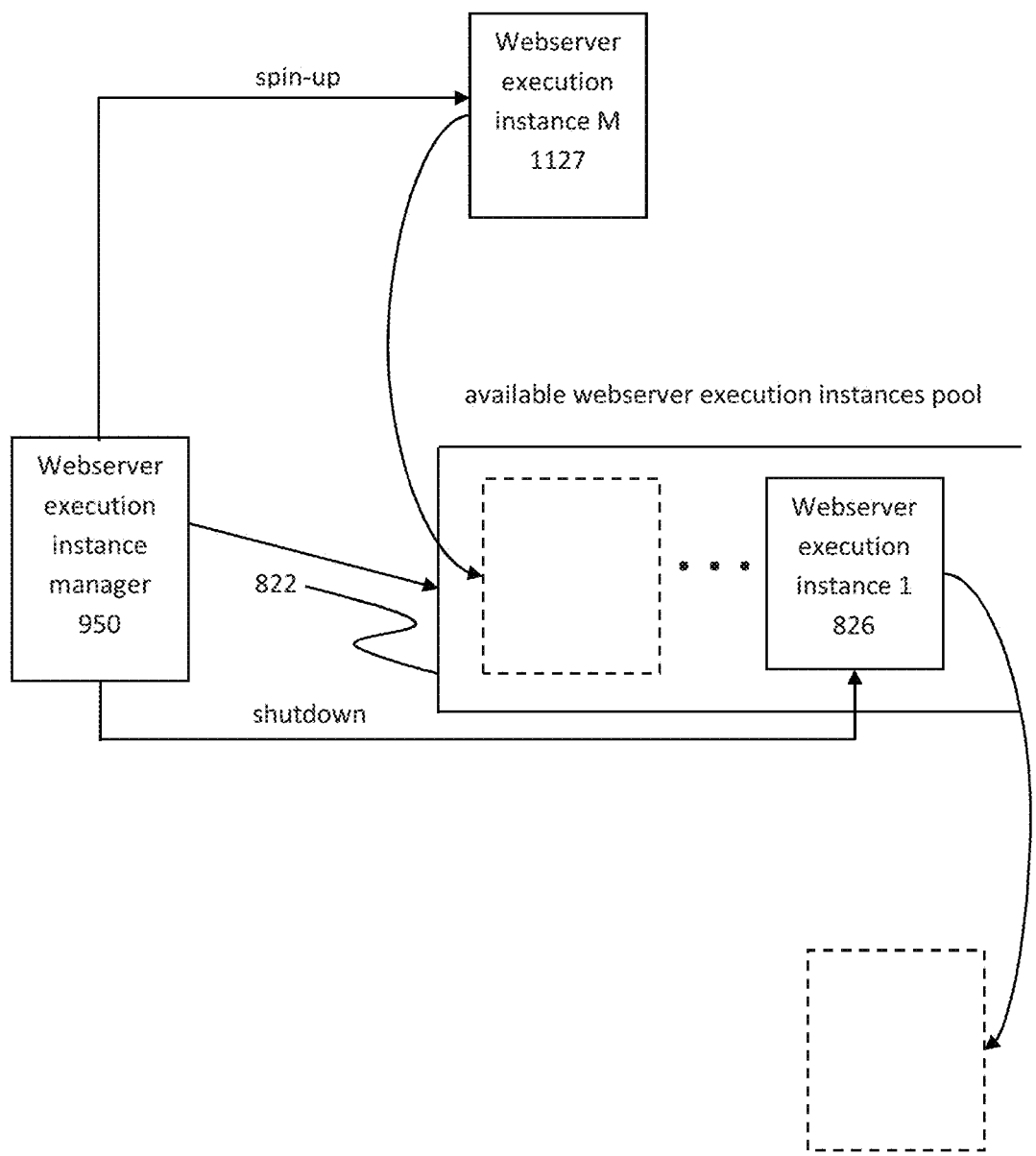
FIG. 14 depicts monitoring number of webserver execution instances available for hosting, according to some embodiments of the present disclosure.

FIG. 14 depicts monitoring webserver execution instances available for hosting, according to some embodiments of the present disclosure. As shown in FIG. 14, Webserver Execution Instance Manager 950 monitors the number of Available Instances 822. Webserver Execution Instance Manager 950 may spin-up new instances and add them to the set of Available Instances 822 pool when the number of webserver execution instances in the set of Available Instances 822 is less than a threshold, as discussed above. Webserver Execution Instance Manager 950 may conversely shutdown instances in the set of Available Instances 822 when the number of webserver execution instances is higher than a threshold. These techniques of spinning up and shutting down execution instances may account for current, prior, or anticipated future demand for particular websites or pages, as discussed above.

In some embodiments, Webserver Execution Instance Manager 950 may wait for a certain amount of time prior to spinning-up new instances to make sure inactive instances identified through State Table 841 are not added back to the pool. Similarly, in some embodiments, Webserver Execution Instance Manager 950 may wait for certain amount of time prior to shutting down available instances to make sure an instance is not required to be injected with website specific code to handle a new website request. Shutting down and spinning-up instances can be a time intensive process and Website Execution Instance Manager 150 avoids doing it frequently by waiting after discovering that a number of available instances deviate from a threshold number.

In some embodiments, Webserver Execution Instance Manager 950 spins-up and shuts down webserver execution instances when the current number of instances in Available Instances 822 set differs from threshold by a specified number or percentage. This allows for a range of values for the number of Available Instances 822 to be present at any point of time. In other embodiments, Webserver Execution Instance Manager 850 may react immediately on deviation from a threshold to spin-up and shutdown instances.

Figure 15:
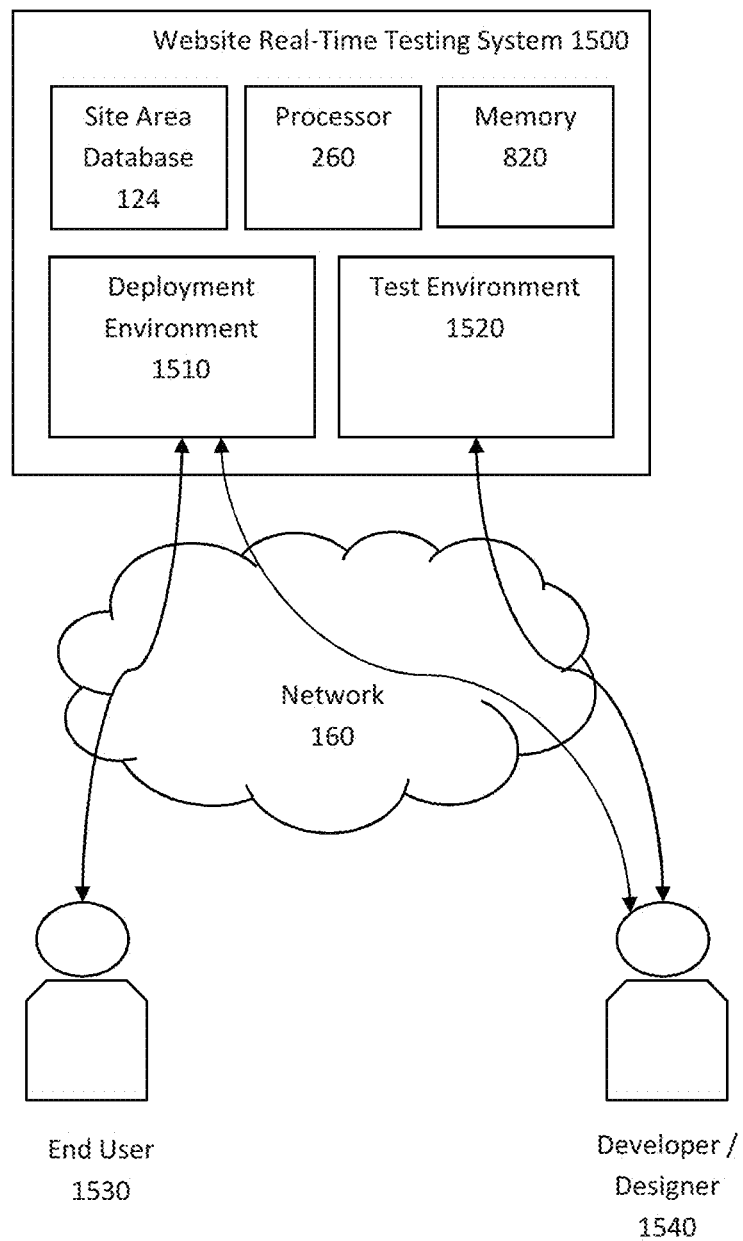
FIG. 15 depicts an exemplary website real-time testing system, according to some embodiments of the present disclosure.

FIG. 15 depicts an exemplary website real-time testing system, according to some embodiments of the present disclosure. As shown in FIG. 15, Website Real-Time Testing System 1500 includes Processor 260, Memory 820, Site Area Database 124 for storing data used by websites, Deployment Environment 1510 providing access to data related to a website being accessed. In some embodiments, Website Real-Time Testing System 1500 may also include Test Environment 1520 providing access to data related to a website being accessed for testing purposes. Alternative terms may be used for test/deployment such as development/run-time, staging/production and testing/live.

In some embodiments, On-Demand System 800 may be a sub-system included in whole in the Website Real-Time Testing System 1500. In some embodiments, Website Real-Time Testing System 1500 may be composed partially of, or may include On-Demand System 800.

Deployment Environment 1510 may be a set of software components executing in a webserver execution instance in an On-Demand System 800.

Test Environment 1520 may be set of software components executing in a webserver execution instance in On-Demand System 800. In some embodiments, a Test Environment 1520 is generated based on the type of device used to access a website. For example, Website 123 accessed through Web Browser 141 on Web Viewing Device 140 may result in creation of Test Environment 1520, which may be different in appearance and layout if Web Viewing Device 140 is a desktop computer or mobile phone. In some other embodiments, a Test Environment 1520 may be generated based on which user is accessing the website. For example, a Developer/Designer 1540 requesting access to Website 123 may result in creation of Test Environment 1520. In some embodiments, a Test Environment 1520 may be shared across users. Test Environment 1520 may be different for different users. In some embodiments, Test Environment 1520 may be shared across multiple websites stored in Site Area Database 124. In some embodiments, an instance of Test Environment 1520 may always be available, and Developer/Designer 1540 may select between accessing a given website through Test Environment 1520 or Deployment Environment 1510.

End User 1530 may access a website and its data in a Deployment Environment 1510 through Network 160. In some embodiments, End User 1530 may access Website 123 through Web Browser 131 on Website Viewing Device 130, consistent with above embodiments.

Developer/Designer 1540 may access a website and its data in a Test Environment 1520 through Network 160. Developer/Designer 1540 may access Website 123 through Web Browser 141 on Website Development Device 140. In some embodiments, Developer/Designer 1540 may access Website 123 in Deployment Environment 1510 by using Web Browser 131 on Web Viewing Device 130. It should be noted that Web Viewing Device 130 and Development Device 140 may be the same device.

End User 1530 and Developer/Designer 1540 may be different roles of a same user accessing Website 123. In some embodiments, a user can change roles by accessing the Website 123 using different devices. For example, a user accessing Website 123 using WBS Vendor Staff Device 150 or Website Development Device 140 may be regarded as Developer/Designer 1540. A user accessing Website 123 using Website Viewing Device 130 may be regarded as End User 1530. A website may be accessed using Deployment Environment 1510 or Test Environment 1520 based on the whether the user is End User 1530 or Developer/Designer 1540 respectively. Also, a website may be accessed using Deployment Environment 1510 or Test Environment 1520 based on whether the request originated from Website Viewing Device 130 or Website Development Device 140. In some embodiments, a website may be accessed using Deployment Environment 1510 or Test Environment 1520 based on a combination of user and device type.

Figure 16A:
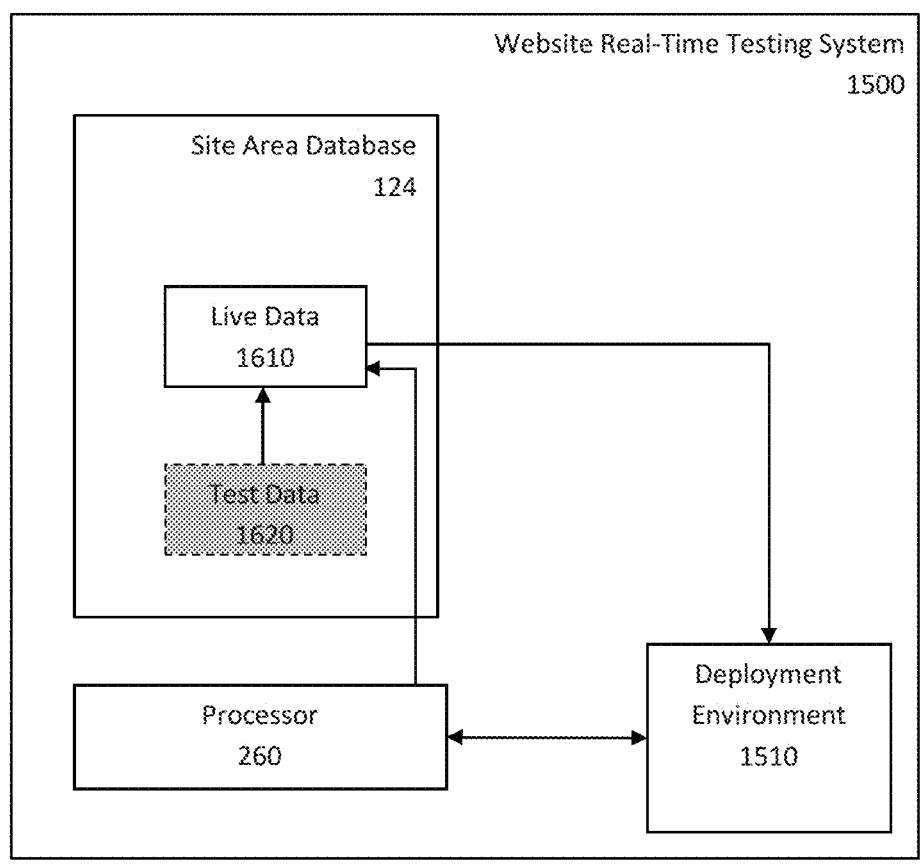
FIG. 16a depicts a schematic diagram of deployment environment access to data elements, according to some embodiments of the present disclosure.
Figure 16B:
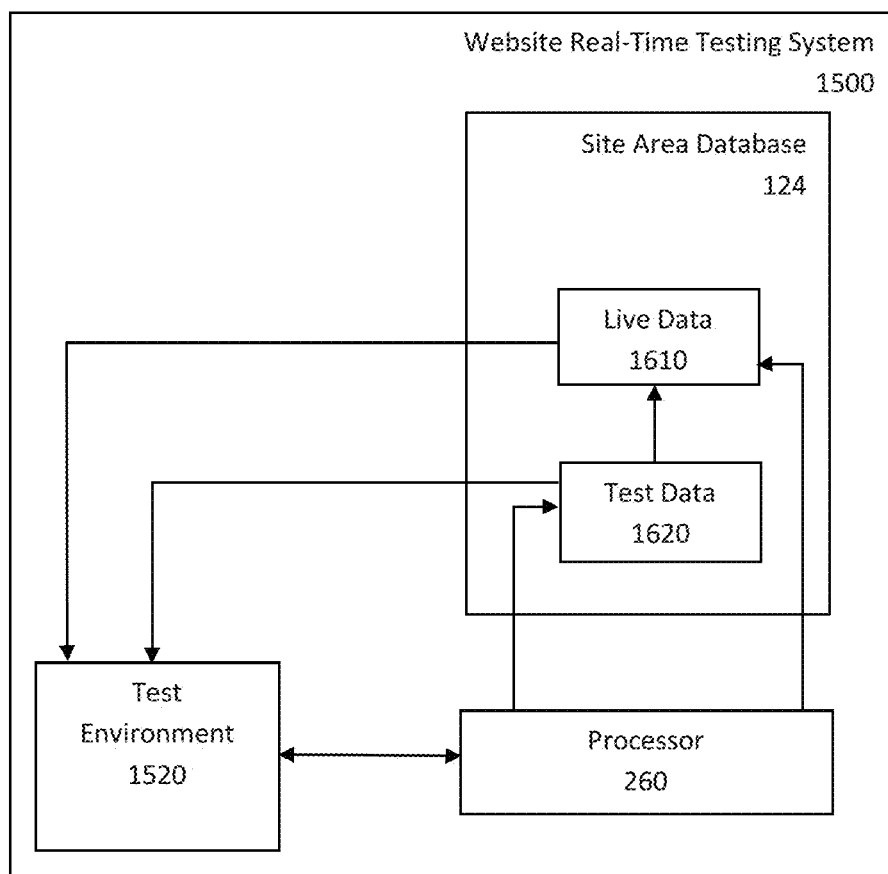
FIG. 16b depicts a schematic diagram of test environment access to data elements, according to some embodiments of the present disclosure.

FIG. 16a depicts a schematic diagram of a Development Environment 1510 for accessing data elements, according to some embodiments of the present disclosure. As shown in FIG. 16a, Deployment Environment 1510 may request Processor 260 to help access Live Data 1610. Deployment Environment 1510 may not access Test Data 1620, depicted by a broken line. FIG. 16b depicts a schematic diagram of a Test Environment 1520 for accessing data elements, according to some embodiments of the present disclosure. As shown in FIG. 16b, Test Environment 1520 may request Processor 260 to help access Live Data 1610 and Test Data 1620. Developer/Designer 1540 accessing a Website 123 using Test Environment 1520 may request data elements associated with Indexable Webpage 125 of Website 123. Test Environment 1520 may be configured for receiving requests for data elements from a user, and may forward the requests to Test Data 1620. In some embodiments, Test Data 1620 may determine if the requested data element is present in Test Data 1620 or forward the request to Live Data 1610. In some embodiments, Test Environment 1520 may itself determine whether to request Live Data 1610 or Test Data 1620 for a certain data element. In some embodiments, Test Environment 1520 may access Live Data 1610 and Test Data 1620 after copying them to Memory 820.

Figure 17:
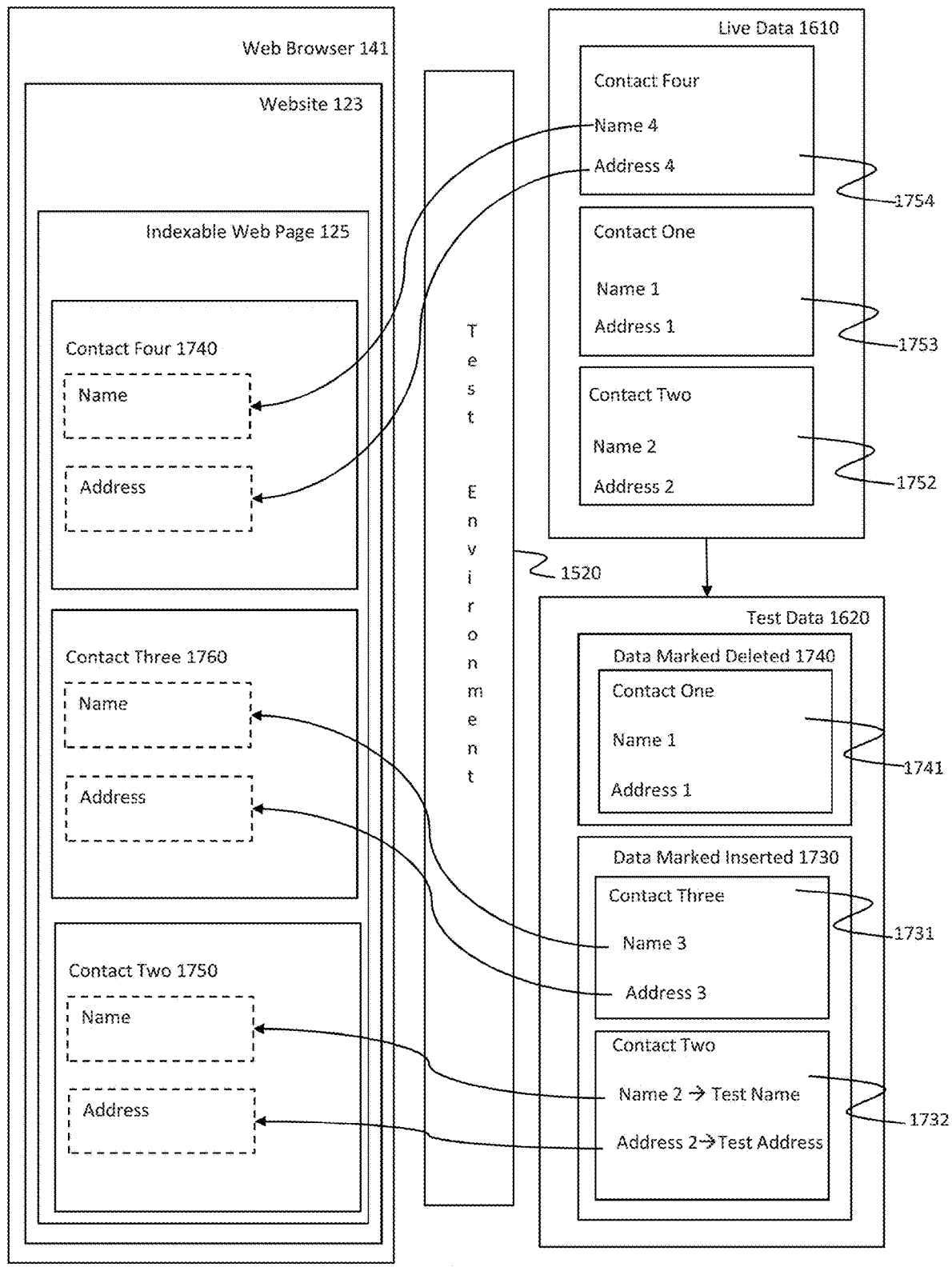
FIG. 17 is an illustration of website access to live and test data in a test environment, according to some embodiments of the present disclosure.

FIG. 17 is an illustration of website access to live and test data in Test Environment 1520, according to some embodiments of the present disclosure. As shown in FIG. 17, Indexable Web Page 125 of Website 123 is being accessed using Web Browser 141 on Web Development Device 140. Indexable Web Page 125 and the associated data elements are being accessed through Test Environment 1520.

Indexable Web Page 123 may access both Live Data 1610 and Test Data 1620 as part of accessing data elements associated with Indexable Web Page 125. In some embodiments all requests to access data elements may first be sent to Test Data 1620. Test Data 1620 may filter out data element access requests which can be handled by Test Data 1620 itself before forwarding the requests to Live Data 1610.

FIG. 18 depicts the generation of test data used in Test Environment 1520 for testing websites, according to some embodiments of the present disclosure. As shown in FIG. 18, Live Data 1610 forms part of the Test Data 1620. In some embodiments, the order of adding Data Marked Inserted 1730 and Data Marked Deleted 1740 may be different. Data Marked Inserted 1730 and Data Marked Deleted 1740 might traversed concurrently to avoid adding something to the Test Data 1620 and later deleting the same marked deleted in Data Marked Deleted 1740.

Data Marked Inserted 1730 and Data Marked Deleted 1740 may be persisted in Site Area Database 124. In some embodiments Data Marked Inserted 1730 and Data Marked Deleted 1740 may reside in Memory 920 until the session to access Website 123 in Test Environment 1520 is active. Data Marked Inserted 1730 and Data Marked Deleted 1740 may be persisted to Site Area Database 124 when a session becomes inactive. For example, Developer/Designer 1540 may explicitly request Data Marked Inserted 1730 and Data Marked Deleted 1740 to be persisted to Site Area Database 124. In some embodiments, Data Marked Inserted 1730 and Data Marked Deleted 1740 may share the same location in Site Area Database 124. Data Marked Inserted 1730 and Data Marked Deleted 1740 may be persisted based on number of read requests. Data elements within Data Marked Inserted 1730 may be selectively persisted to Site Area Database 124. Data elements may be selectively persisted based on additional criteria, such as the number of times a data element is requested to be read or the time for which a data element in them has not changed or number of sessions the data was accessed.

Figure 19:
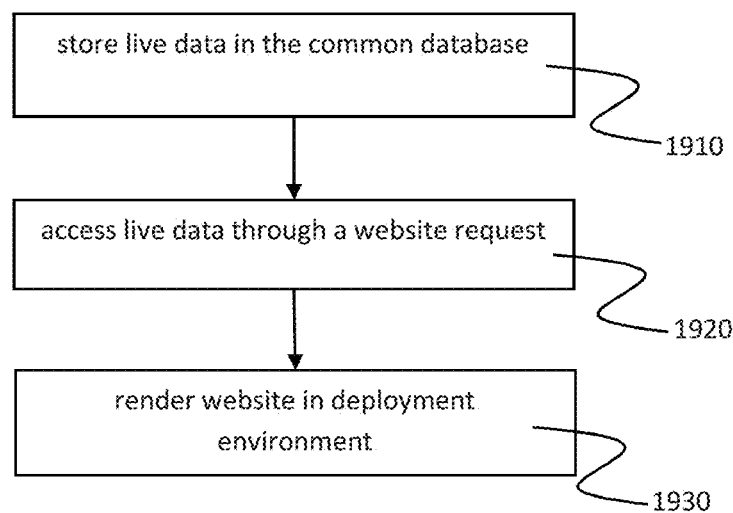
FIG. 19 is a flowchart illustrating a method to access a website in a deployment environment, according to some embodiments of the present disclosure.

FIG. 19 is a flowchart illustrating a Method 1900 to access a website in a deployment environment, according to some embodiments of the present disclosure.

As shown in Step 1910. Data elements that are updated and added when accessing a website in Deployment Environment 1510 are stored in Live Data 1610 of Site Area Database 124.

In Step 1920, Live Data 1610 stored in Site Area Database 124 associated with an indexable webpage of a website accessed in Deployment Environment 1510 is accessed by Website Real-time Testing System 1500 as part of serving webpages requested by a user.

In Step 1930, data elements accessed in Step 1920 are applied to the indexable webpage they are associated with to render the webpage in Web Browser 131 of Web Viewing Device 130 used by End User 1530.

Figure 20:
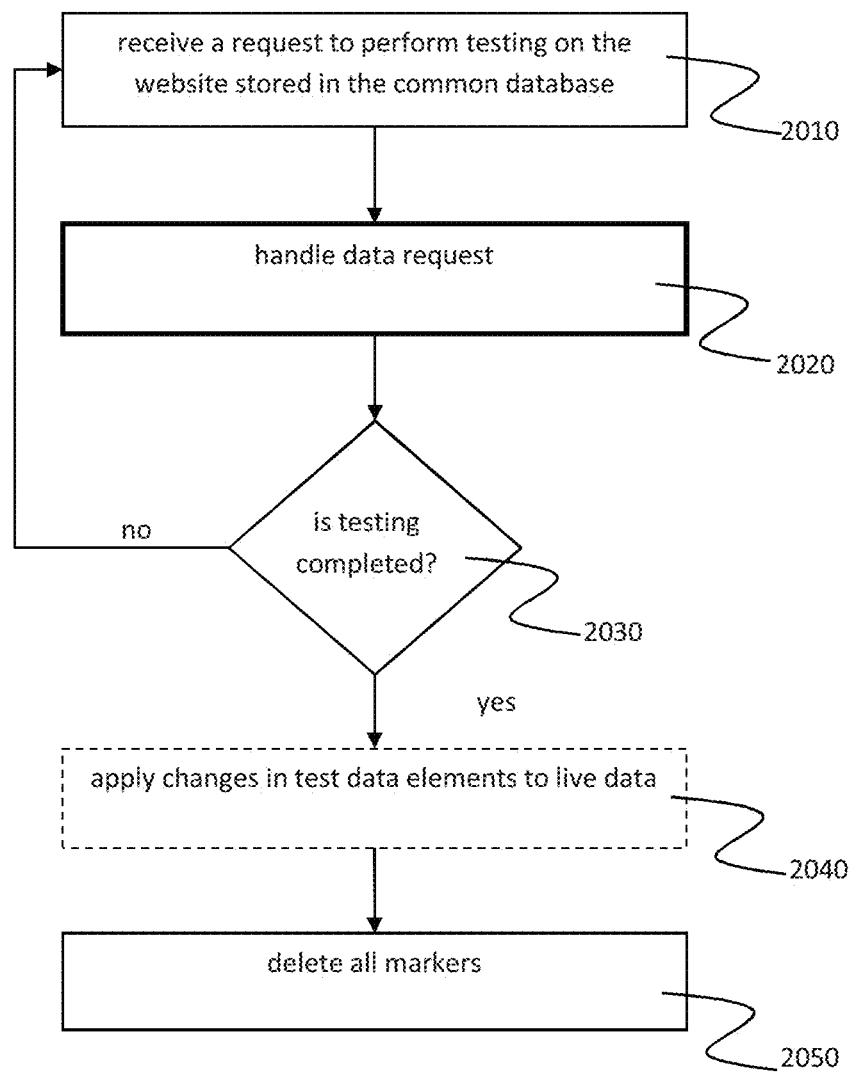
FIG. 20 is a flowchart illustrating a method to access a website in a test environment, according to some embodiments of the present disclosure.

FIG. 20 is a flowchart illustrating a Method 2000 to access a website in a test environment, according to some embodiments of the present disclosure.

In Step 2010, Website Real-Time Testing System 1500 may receive a request to perform testing on the website (e.g., Website 123) stored in the common database (e.g., Site Area Database 124). In Step 2020, Website Real-Time Testing System 1500 handles the data request made as part of the process of testing a website using Test Environment 1520. For example, Website 123 may be tested by Developer/Designer 1540 by accessing the Website 123 using Web Browser 141 of Website Development Device 140. For example, Developer/Designer 1540 may request Indexable Web Page 125 of Website 123 by typing the URL. Further, in some embodiments the URL may be specified by an application. The request includes both request to Frontend 126 and also data elements of Data Group 210 associated with Indexable Web Page 125 of Website 123. A read request for the data may be made as part of the process of accessing a webpage.

As shown in FIG. 20, in Step 2030, Website Real-Time Testing System 1500 verifies if the testing is completed. In some embodiments, testing a website is considered completed if the website is accessed through Test Environment 1520 for a certain period of time. Testing may be considered completed after a certain number of data requests. Testing may also be considered completed when Developer/Designer 1540 accessing a website through Web Browser 141 of Website Development Device 140 closes the browser tab or window used to access the website. Testing may also be considered completed when Developer/Designer 1540 explicitly request this from Website Real-Time Testing System 1500. If the answer to Step 2030 is no, Method 2000 may jump back to Step 2010 and be ready to receive the next data request. If the answer to Step 2030 is yes, Method 2000 may proceed to Step 2040. In Step 2040, Method 2000 may apply changes made to data elements and saved in Test Data 1620 to corresponding data elements in Live Data 1610. Step 2040 may be optional, as Developer/Designer 1540 may request, for example, that the data changes incorporated in Test Data 1620 be dropped.

In Step 2050, all the markers associated with the updates to the data elements made during testing of Website 123 in Test Environment 1520 may be deleted.

Figure 21:
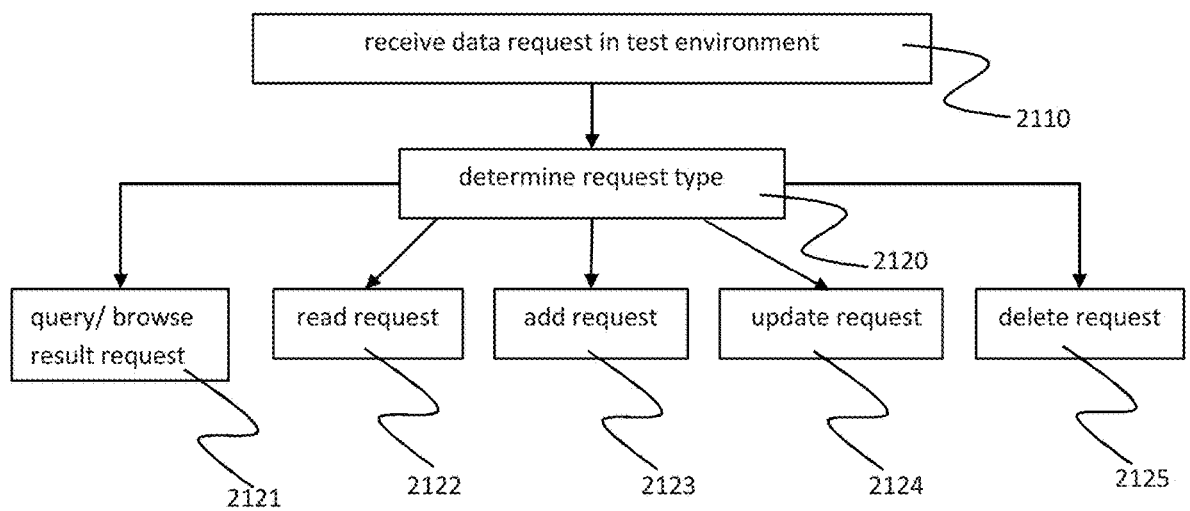
FIG. 21 is a flowchart illustrating a method for handling data requests in a test environment, according to some embodiments of the present disclosure.

FIG. 21 is a flowchart illustrating Method 2100 for handling data requests in Test Environment 1520, according to some embodiments of the present disclosure. The Method 2100 in FIG. 21 identifies one of five exemplary paths to handle the incoming request for data elements associated with a website being accessed by a Developer/Designer 1540.

As shown in FIG. 21, in Step 2110, Website Real-Time Testing System 1500 receives a data request in Test Environment 1520. The data request is part of accessing a website for testing in Test Environment 1520. For example, a Developer/Designer 1540 accessing a Website 123 through Website Development Device 140 may cause a request for Data Element 211 of Data Group 210 associated with Website 123.

In Step 2120, Website Real-Time Testing System 1500 determines the type of the request to access to data elements associated with a website being tested. The determination results in different types of requests being processed. The data request may be a read request to access data elements associated with a website being tested by Developer/Designer 1540 when they request an indexable web page by typing a URL. In some embodiments, the data request may be a write request to add a data element. For example, Developer/Designer 1540 testing Website 123 may submit a form on Indexable Web Page 125 requesting creation of a new data element to be added to Data Group 210. The data request may be an update request to alter the contents of a data element associated with the website being tested by Developer/Designer 1540. The data request may be a delete request to remove a data element associated with a website being tested by Developer/Designer 1540.

In Step 2121, Website Real-Time Testing System 1500 has determined in Step 2120 that the data request is to search for data elements associated with the website being tested by Developer/Designer 1540, or to browse the result of such searching operation.

In Step 2122, Website Real-Time Testing System 1500 has determined in Step 2120 that the data request is to read data elements associated with the website being tested by Developer/Designer 1540.

In Step 2123, Website Real-Time Testing System 1500 has determined in Step 2120 that the data request is to add data elements associated with the website being tested by Developer/Designer 1540.

In Step 2124, Website Real-Time Testing System 1500 has determined in Step 2120 that the data request is to update data elements associated with the website being tested by Developer/Designer 1540.

In Step 2125, Website Real-Time Testing System 1500 has determined in step 2120 that the data request is to delete data elements associated with the website being tested by Developer/Designer 1540.

Figure 22:
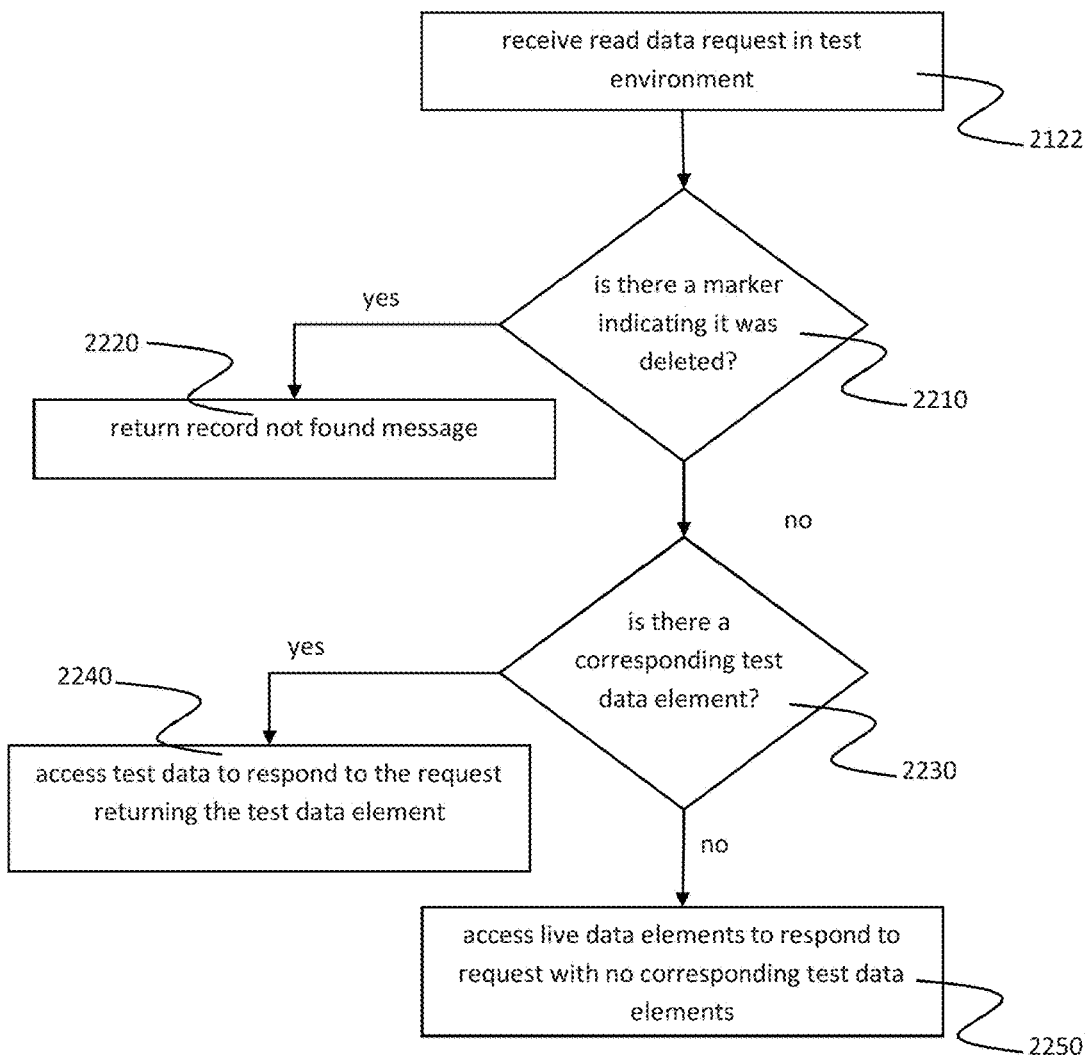
FIG. 22 is a flowchart illustrating a method for handling read requests in a test environment, according to some embodiments of the present disclosure.

FIG. 22 is a flowchart illustrating a Method 2200 for handling read requests in test environment, according to some embodiments of the present disclosure. The Method 2200 in FIG. 22 identifies three paths to determine if a data request need to be responded and if so whether to use data elements in Test Data 1620 or Live Data 1610.

As shown in FIG. 22, in Step 2122, a received data request has been determined in Method 2100 to be a read request for data elements in Site Area Database 124 and Memory 820.

In Step 2210, Website Real-Time Testing System 1500 looks up the requested data element in Test Data 1620 and when a match is found verifies if it is marked as deleted. If the answer in Step 2210 is yes, Method 2200 may proceed to Step 2120 and regards Method 2200 to be complete. In Step 2 no data element found message is returned. For example, Developer/Designer 1540 accessing Indexable Web Page 125 of Web Site 123 may send a request for Data Element 1741 in Data Marked Deleted 1740 of Test Data 1620 resulting in "no data element found" message being returned.

If the answer in Step 2210 is no, Method 2100 may proceed to step 2130. As shown in FIG. 22, in Step 2230, Website Real-Time Testing System 1500 looks up the requested data element in Data Marked Inserted 1730 of Test Data 1620.

If the answer in Step 2230 is yes, Method 2200 may proceed to Step 2240. In Step 2240, the data element requested is found in Test Data 1620 and is returned. The requested data element may be in Data Marked Inserted 1730 of Test Data 1620 as it added as a new data element previously. Further, the requested data element may be in Data Marked Inserted 1730 as it was updated while testing a website previously. For example, Developer/Designer 1540 request to access data element of Contact Two 1760 in Test Environment 1520 will result in Data Element 1732 in Data Marked Inserted 1730 of Test Data 1620 is returned after Method 2200 executes Step 2240. The same data element when requested in Deployment Environment 1510 may result in Data Element 1752 being returned.

If the answer in Step 2230 is no, Method 2200 may proceed to Step 2250. In Step 2250, Data element requested is returned from Live Data 1610.

Figure 23A:
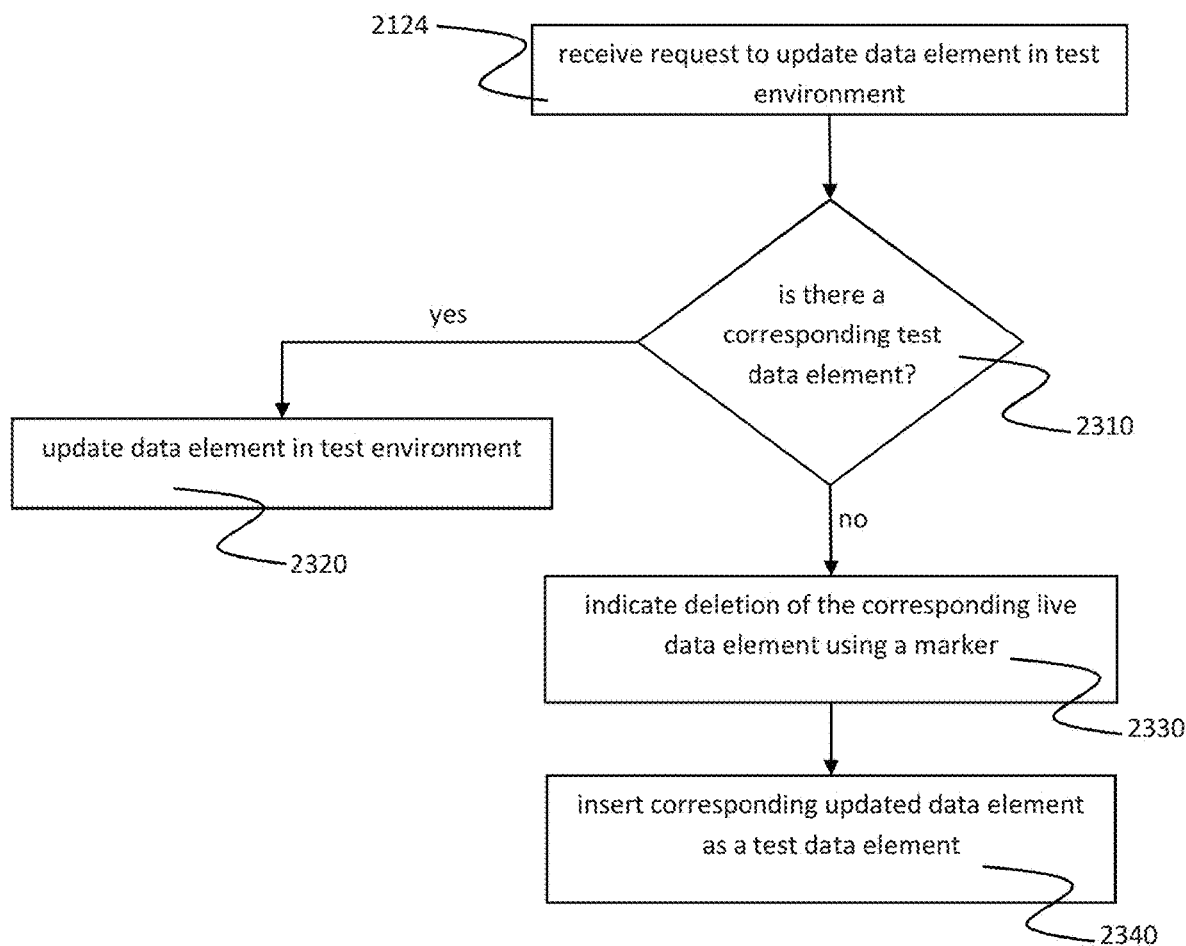
FIG. 23a is a flowchart of a method for updating data elements in a test environment, according to some embodiments of the present disclosure.

FIG. 23a is a flowchart illustrating a Method 2300 for updating data elements in test environment, according to some embodiments of the present disclosure. Method 2300 in FIG. 23a defines a location to store the updated data element requested while testing a website.

As shown in FIG. 23a, in Step 2124 a received data request has been determined in Method 2100 to be a request to update a data element present in Live Data 1610 or Data Marked Inserted 1730 of Test Data 1620 while testing a website.

In Step 2310, Website Real-Time Testing System 1500 determines the location of the of the data element being requested to be updated by first checking in Data Marked Inserted 1730 of Test Data 1620.

If the answer to Step 2310 is yes, then Method 2200 proceeds to Step 2320. In Step 2320, a data element corresponding one being requested to be updated is updated.

If the answer to Step 2310 is no, then Method 2200 proceeds to Step 2330 indicating that the data element requested to be updated was not updated in the past and is present only in Live Data 1610. The data element in Live Data 1610 is copied to Data Marked Deleted 1740 to avoid any future access to the data in Test Environment 1520.

In Step 2340, Website Real-Time Testing System 1500 inserts the updated data element into Test Data 1620. In some embodiments, adding a data element involves adding a database entry and marking in an additional column that it was added through Test Environment. The data element inserted into Data Marked Inserted 1730 of Test Data 1620 from Test Environment 1620 cannot be accessed in by requests in Deployment Environment 1610. For example, Developer/Designer 1540 request to update Data Element 1752 through Website 123 results in Data Element 1732 being inserted into Data Marked Inserted 1730 of Test Data 1620.

Figure 23B:
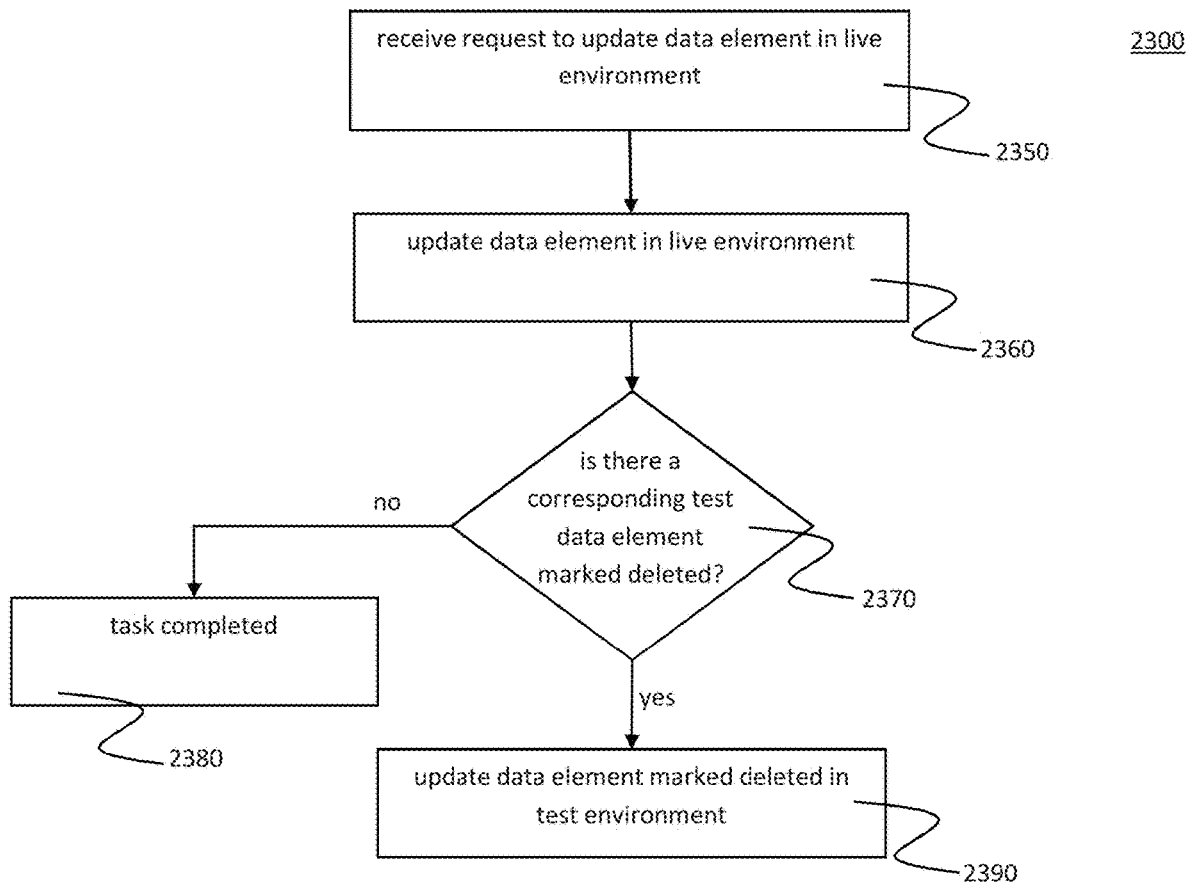
FIG. 23b is a flowchart of a method for updating data elements in a deployment environment, according to some embodiments of the present disclosure.

FIG. 23b is a flowchart illustrating another Method 2300 for updating data elements in Deployment Environment 1510, according to some embodiments of the present disclosure. The method makes sure Live Data 1610 is available real-time to Developer/Designer 1540 testing a website using Test Environment 1520.

In Step 2350, a request to update data element in Deployment Environment 1510 is received.

In Step 2360, a data element in Live Data 1610 is updated as per the request.

In Step 2370, a look up request to identify data element updated in Live Data 1610 in Step 2360 is made against Data Marked Deleted 1740. A corresponding data element found in Data Marked Deleted 1740 was either updated or deleted in Test Environment 1520.

If the answer in Step 2370 is no, the Method 2300 proceeds to step 2380 where task is regarded complete and Method 2300 exits.

If the answer in Step 2370 is yes, then Method 2300 proceeds to Step 2390. In Step 2390 the data element requested to be updated through Deployment Environment 1510 is updated in Data Marked Deleted 1740. This results in the data element being updated in Live Data 1610 being not included in the query results as discussed in Process 2500 below.

Figure 23C:
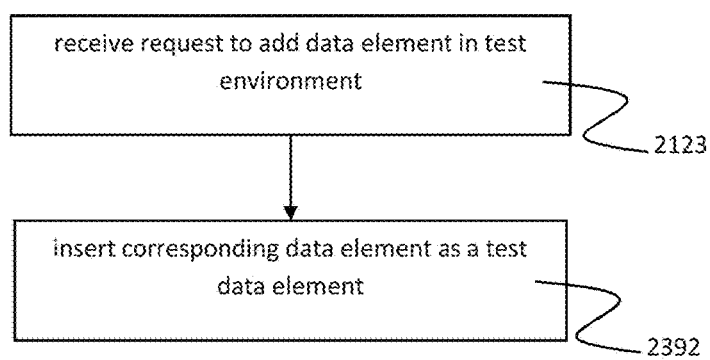
FIG. 23c is a flowchart of a method for adding data elements in a test environment, according to some embodiments of the present disclosure.

FIG. 23c is a flowchart illustrating another Method 2300 for adding data elements in test environment, according to some embodiments of the present disclosure. The Method 2300 in FIG. 23c defines a location to store new data requested to be added while testing a website.

As shown in FIG. 23c, in Step 2123 a received data request has been determined in Method 2100 to be a request to add a new data element not present in Live Data 1610 to Test Data 1620 while testing a website.

In Step 2392, Website Real-Time Testing System 1500 inserts the data element into Test Data 1620. In some embodiments, adding a data involves adding a database entry and marking in an additional column that it was added through Test Environment. The data element inserted into Data Marked Inserted 1730 of Test Data 1620 from Test Environment 1620 cannot be accessed in by requests in Deployment Environment 1610. For example, Developer/Designer 1540 may request to add Data Element 1731 through Website 123 results in Data Element 1731 being inserted into Data Marked Inserted 1730 of Test Data 1620.

Figure 24:
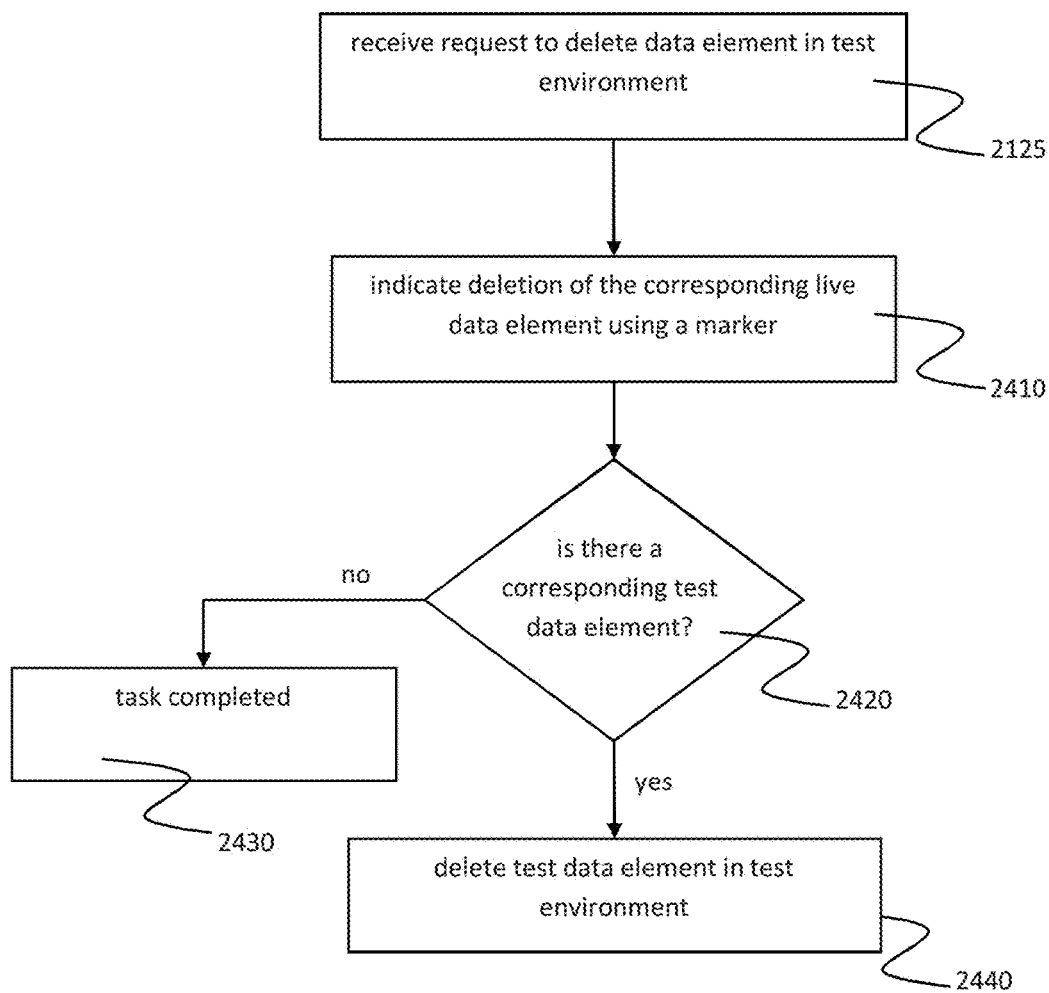
FIG. 24 is a flowchart illustrating a method for deleting data elements from a test environment, according to some embodiments of the present disclosure.

FIG. 24 is a flowchart illustrating a Method 2400 for deleting data elements from test environment, according to some embodiments of the present disclosure. As shown in FIG. 24, the data element requested to be deleted may be presented in Live Data 1610 or may have been previously added through Test Environment and is present in Data Marked Inserted 1730.

As shown in FIG. 24, in Step 2125, a received data request has been determined in Method 2100 to be a delete request for data element in Site Area Database 124 or Memory 820.

In Step 2410, Website Real-Time Testing System 1500 may insert the data element requested to be deleted to Data Marked Deleted 1740 of Test Data 1620. Any data element, whether it was added or updated in Test Environment, may be added to Data Marked Deleted 1740 as all data elements in Data Marked Deleted 1740 may be skipped when a request for data elements associated with a website being tested is made.

In Step 2420, a look up for the data element requested to be deleted is searched in Data Marked Inserted 1730 of Test Data 1620. Process 2300 is regarded complete if no such data element is found in Test Data 1620. For example, Developer/Designer 1540 testing Website 123 on Web Browser 141 makes a request to delete Data Element 1741 results in Data Element 1741 inserted into Data Marked Deleted 1740. Data Element 1741 is not present in Data Marked Inserted 1730 indicates no data needs to be removed and Process 2400 is regarded as complete. If the answer in Step 2420 is no, then Method 2400 has not found a Data Marked Inserted 1730 a data element requested to be deleted and Method 2400 proceeds to Step 2430 where the task is complete and Method 2400 exits.

If the answer in Step 2420 is yes, then Method 2400 found in Data Marked Inserted 1730 a data element requested to be deleted. In Step 2440, data element of Test Data 1620 is removed from Data Marked Inserted 1730.

FIG. 25 illustrates an overlay process to generate the results of querying test data, according to some embodiments of the present disclosure. As shown in FIG. 25, Method 2500 is a four-step process which accesses concurrently Live Data 1610, Data Marked Inserted 1730, and Data Marked Deleted 1740 of Test Data 1620.

As shown in FIG. 25, in Step 1, data elements matching the query are accessed from Live Data 1610, Data Marked Inserted 1730, and Data Marked Deleted 1740. In some embodiments, data elements are accessed by executing a query in Site Area Database 124 against Live Data 1610, and Data Marked Inserted 1730 and Data Marked Deleted 1740 of Test Data 1620. In some embodiments, the results of the queries may be arranged as one Fused Table 2510.

Data elements are sorted as requested in the query. In some embodiments, the data elements are sorted by column "B" in the 2510 in descending order. In some embodiments, the order may involve more than one column. In some embodiments, when there is no order requested a random column is chosen and sorted in ascending or descending order. In some embodiments a primary key is added to the columns used in sorting.

In Step 2, the system traverses the data elements in Live Data 1610, Data Marked Inserted 1730, and Data Marked Deleted 1740 simultaneously to select the data elements to be included in Test Data 1620.

In order to determine the data elements to be included in Test 1720, a pointer is set at the first element of Live Data 1610, Data Marked Inserted 1730, and Data Marked Deleted 1740. In some embodiments, the pointer is placed at the lowest data element based on column "B." The current lowest record in Live Data 1610, Data Marked Inserted 1730, and Data Marked Deleted 1740 is compared to identify the lowest data element. The lowest may be found might be present in multiple locations. For example, Data Element 2520 and 2530 are the lowest data elements in Live Data 1610 and Data Marked Deleted 1740 and have same content.

Once the lowest data element is identified it is determined whether a data element is to be included in Test Data 1620 based on the following rules. If the data element exists in both Live Data 1610 and Data Marked Deleted 1740 then data element is skipped from being included in Test Data 1620. For example, Data Element 2520 and 2530 have the same content and exist in Live Data 1610 and Data Marked Deleted 1740 indicating the data element was requested to be deleted in Test Environment 1520 earlier while testing a website. It could have also been updated and Data Element 2560 was the resulting updated element.

If the data element exists only in Live Data 1610 then it is included in Test Data 1620. For example, Data Element 2540 is only present in Live Data 1610 indicating it was not altered or deleted in Test Environment when a testing a website which is associated with Data Element 2540.

If the data element exists only in Data Marked Inserted 1730 then it is included in Test Data 1620. For example, Data Element 2540 is only present in Data Marked Deleted 1740 indicating it was either inserted as a new data element or inserted as part of updating Data Element 2520 while testing a website.

Once a data element is included or skipped only those sources of data element which had the lowest data element have their pointers for moved to the next data element. In some embodiments, the pointers for Live Data 1610 and Data Marked Deleted 1740 are moved to the next record after the first iteration of traversal.

On reaching the last data element in all the three sources of data elements, Method 2500 terminates and Test Data 1620 is obtained. Fused Table 2560 indicates the lowest data elements identified in each iteration of Step 2 discussed above. Only those sources which had the lowest data element are shown filled and the rest are left empty. For example, in first iteration of Step 2, the lowest Data Elements 2520 and 2530 have same content are shown as part of their respective sources Live Data 1610, and Data Marked Deleted 1740 and Data Marked Deleted 1740 is left empty indicating it did not have the lowest data element. Similarly, in the last iteration only Data Marked Inserted 1730 has the lowest data element 2550 indicated in the last row of the Fused Table 2560.

Figure 26:
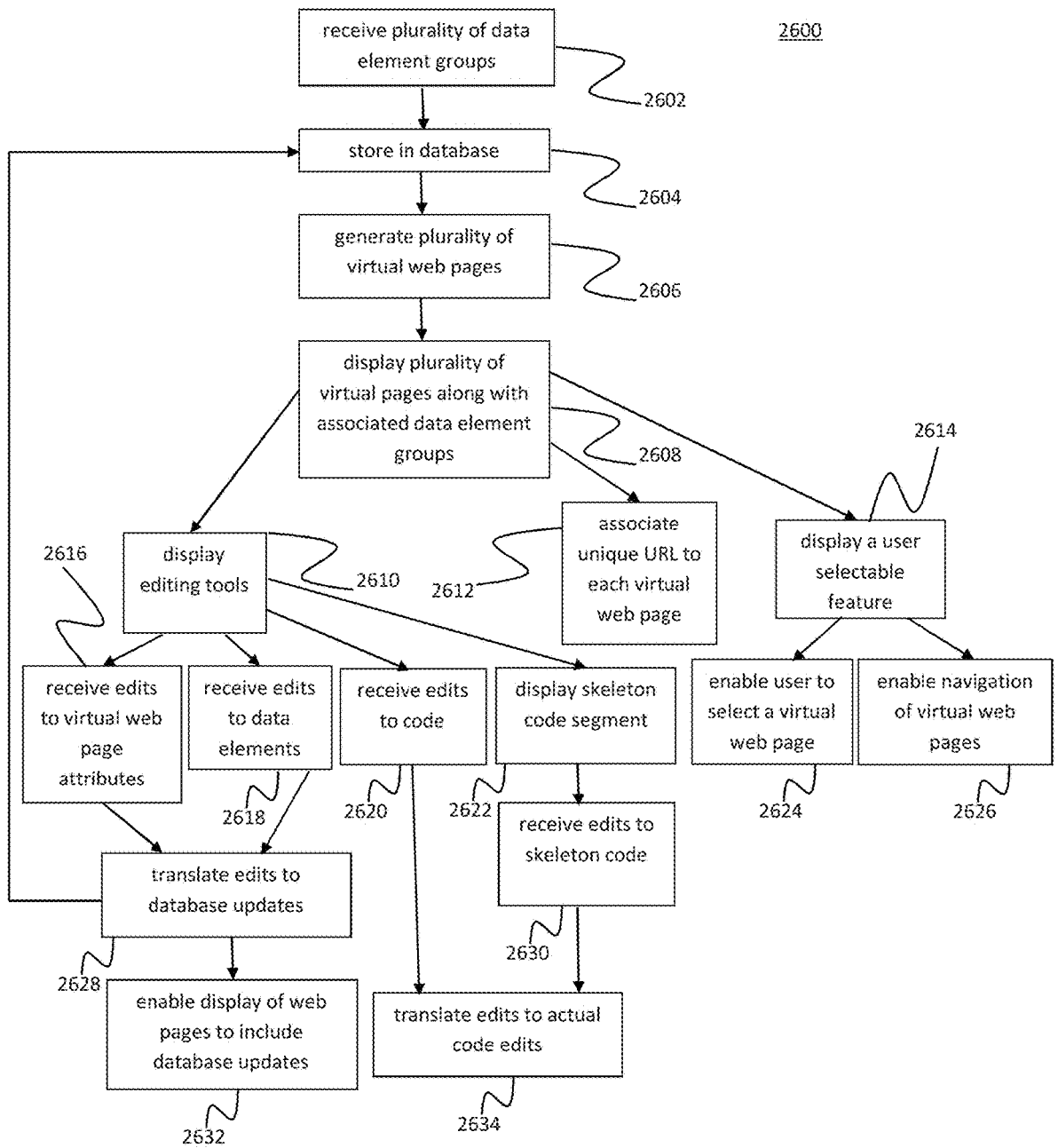
FIG. 26 is a flowchart showing Steps involved in editing a database during website preview, according to some embodiments of the present disclosure.

FIG. 26 depicts a flowchart showing steps of a Method 2600 for editing a database during website preview, according to some embodiments of the present disclosure. Method 2600 may be practiced in the system environments described throughout this disclosure, such as those of FIGS. 1, 2, 15, and others.

As shown in FIG. 26, Step 2602 may involve receiving one or more groups of data elements (e.g., from a user of a website building system). The data elements, as discussed above, may include a variety of different types of content, or records of content, that can be integrated into a website, such as text, images, videos, advertisements, database output displays, etc. In some embodiments, data elements may further include a set of data objects (e.g., two instances of text, and one image). Each group may have one or more data element. A group may thus define a related set of one or more elements. For example, a first website or page (e.g., an identifier of the webpage) may be associated with a group comprising only text, a second website or page may be associated with a group comprising of data elements (each of which comprising one text and three images), a third website or page may be associated with a group comprising of data elements comprising text and video, etc. Through a website editing interface, as discussed above, the user may identify what groups of data elements should appear on or be associated with individual webpages of a website, or with given virtual page templates.

Data groups may, in some embodiments, be site-level entities that can be used and re-used in multiple pages of a website, or may be owner-level entities that can be used and reused by a particular website owner. Further, data groups may also be system-level entities (e.g., a database of zip codes, geographical area descriptions, etc.) or page-level entities.

Method 2600 may also include a Step 2604 of storing the groups of one or more data elements in a Site Area Database 124, consistent with above embodiments. Examples of such databases are described above (e.g., in connection with FIGS. 1, 2, 15, and others). The databases may be configured to maintain each group, maintain associations between the groups and websites or pages, or virtual page templates, and store other content and information. As discussed further below, when a user makes edits to a virtual webpage during a preview mode, such edits may be translated into edits to the database in real-time, thus maintaining an up-to-date database for each webpage.

In addition, Method 2600 may include a Step 2606 of generating one or more virtual webpages. Each of the virtual webpages may represent data element (consisting of one or more objects) which may be displayed in preview mode (during development) before the actual website goes or its updated parts go live (i.e., becomes viewable through the Internet to other users). In order to subsequently publish a virtual web page collection in live mode, a user may select an option titled "Publish," "Post," or the like, which will make the website viewable through the Internet (as publishing is typically done at the site level and not for a single page). Once published, virtual pages (i.e. instances derived from the Web Page Template 2704) may behave similarly to ordinary (actual) pages, though they are dynamically generated. In some embodiments, each of the actual webpages is not designed with functionality for updating the database, while the virtual webpages may be designed with that functionality in place. As an example, a hotel rental website may maintain five different virtual page templates for five different types of rooms available in a particular hotel (such as single bed, double bed, etc.). Each of the virtual page templates may be associated with its own group of data elements (i.e. records for rooms of the given type), and each room would thus have a virtual webpage which may be displayable and editable during a preview mode as a virtual web page.

Further, Method 2600 may include a Step 2608 of displaying each group of at least one data element in a separate one of the virtual webpage sets. For example, in the above hypothetical of a hotel website, during the preview mode each of the five virtual webpages templates corresponding to different types of hotel rooms may have its associated groups of data elements (e.g., different text describing the rooms, images of the rooms, videos of the rooms, etc.). The generated virtual webpage sets (i.e. instances) may be displayed to the user via a browser or other client, as discussed above in connection with other techniques.

Method 2600 may also include a Step 2610, which involves displaying an editing tool to permit a user to edit one or more of the virtual webpage templates and instances. The templates may be edited as though they are regular pages. The instances may be editable in preview mode only, as they are may not be visible as part of the regular editor page browsing and editing process. In an alternative embodiment, the system may allow editing of instances as part of the regular site editing process. A variety of editing tools may be used, including rulers and grids (e.g., to align data elements), drag and drop selectors (e.g., for moving data elements with a cursor), hyperlink insertion and editing, integration of widgets or apps (e.g., from an app store), button insertion and editing, text creation and editing, image insertion and editing, video insertion and editing, slideshow creation and editing, cursor hovering functionality, background styles, repeaters (e.g., which create multiple versions of a particular data element or group), software-based routers (e.g., which create a different version of a webpage based on an element of the URL used to access it), and more. The system may display (and operate) different subset of the available editing tools for templates and for instances, and may also customize the displayed editing tool subset depending on the user, virtual page template, specific instance, underlying connected data group or element etc. As discussed further below, a user may make edits to the virtual webpage templates and instances through the editing tools, and the edits may be translated into edits to the database maintaining component information and/or content for the webpages.

Method 2600 may also include a Step 2612 of associating a unique URL to each virtual webpage. For example, a website may have a domain name (e.g., wix.com) and each page within the website may have a different suffix (e.g., wix.com/page1, wix.com/page2, wix.com/page3, etc.). Further, in some cases, URLs associated with virtual webpages may have different paths (referring to files or directories) or parameter values. In some embodiments, a software-based router may be configured for the website or for individual webpages. The software-based router may be configurable, for example, to associate particular URL prefixes, paths, segments or parameters with particular webpages. Each of the webpages may be configured to pull different data from the database storing data elements. In a JavaScript implementation, for example, an incoming request for a webpage may be associated with an object that includes information about the request (e.g., the URL, where it came from, who it came from, etc.). The software-based router can process this information and decide which (possibly virtual) webpage to show and what data elements to include in it.

In addition, Method 2600 may include a Step 2614 of displaying a user selectable feature (e.g., buttons, scroll bars, links, etc.) enabling the user to navigate through the virtual webpages to individually and dynamically display each of the virtual webpages. In the above example, therefore, the user selectable feature may allow the user to view each of the five webpage sets corresponding to different hotel room types. Each page may be dynamically selected and viewed as a virtual webpage.

Method 2600 may further include a Step 2616 of receiving edits to one or more virtual webpage attributes from a user. For example, using the editing tool described above, a user may change the background of a page, the layout or template of a page, the apps or widgets integrated into a page, the URL prefixes or suffixes associated with a page, repeater functionality within a page, software-based router functionality for a page, or perform various other types of edits. Changes made to the Web Page Template 2704 may be written directly to the template page definition in the Site Area Database 124. Changes made to virtual page instances may be stored in a separate database, which shall contain adaptations to virtual page instances. Under such a scheme, the adaptations shall be indexed with a unique index of the specific virtual page instance (e.g. in our hotel example, "Single bed room #1234"). The adaptation would be retrieved and re-applied whenever this virtual page instance is generated for display (e.g. during preview or during live display).

In some embodiments, users are permitted to edit virtual page instances but only in terms of their field information (e.g., text, graphics, videos, etc.). For example, in such embodiments, users may be prohibited from editing other elements (i.e., other than content) of a virtual page instance, including layout, attributes, etc.

Method 2600 may also include a Step 2618 of receiving edits to data elements themselves. Such edits may be made directly to a display of the data group (i.e., a display user interface elements which allow browsing and editing of the underlying data groups and elements). Alternatively, such editing may be performed though editing of field content in the generated virtual page instances related to the items. The system may enable such editing by adding (in preview mode) additional editing controls to the displayed virtual page instances (such as a "select alternative picture" button added to each displayed image originating from a data group). As discussed above, the data elements may be stored in a database. The edits may include editing text, replacing or modifying images, replacing or modifying videos, altering the functionality of hovering a cursor over an element, and various other types of edits.

In addition, Method 2600 may include a Step 2620 of receiving edits to code associated with one or more virtual webpages. Examples of the code may be the frontend code and backend code described above in connection with FIGS. 1-7. For example, the code may relate to collecting and storing data and content in a database, creating dynamic pages, implementing user-facing widgets and apps, repeating layouts of data elements, configuring software-based routers, and more. In some embodiments, in a Step 2622, skeleton code segments may be generated to facilitate user edits to code associated with webpages. For example, skeleton code may be high-level abstractions of functions associated with more granular source code, which can implement the various types of frontend and backend functionality described above for webpages. The skeleton code may be displayed to users through the editing interface and the users may make edits to it. User edits to skeleton code may then be translated into edits to the more granular actual code associated with individual webpages. As for edits to page attribute and page data/field content noted above, the system may support edits to the Web Page Template 2704 (which are stored in the Site Area Database 124, possibly subject to sandboxing of development changes before publishing) or to virtual page instances (which may be stored in the virtual page instance adaptations database). This is further detailed in the description of Steps 2630 and 2634 below.

In Method 2600, a Step 2624 may enable a user to select particular virtual webpages and a Step 2626 may enable a user to navigate through virtual webpages. For example, users may select pages individually by clicking on hyperlinks or other links associated with images or visual representations of the pages, or may navigate through pages visually (e.g., by a left/right or up/down toggle button, or through other selection visualizations).

According to Method 2600, any edits to virtual webpages (e.g., editing instances through Steps 2616 or 2618) may be translated into updates to the database maintaining the data elements for the webpages in a Step 2828. For example, if a user replaces an image on a virtual webpage with another image (e.g., user-uploaded image, etc.), the new image may be stored in the database. Further, if the user replaces text on the virtual webpage (e.g., the description of a specific hotel room), the updated text may also be stored in the database. In some embodiments, the updates to the database may be performed automatically based on the user's edits to the virtual webpage. Because the database is used to build the virtual webpages and is associated with the contents of the virtual webpages, edits to the virtual webpages may be associated back to the database used to build them. In some embodiments, multiple versions of the database are stored, at least temporarily, so that users can perform undo or revert operations if they want to negate a change to a virtual webpage they have made and return to an earlier version. For example, users may select an undo or revert option, or may be presented with timestamps or version identifiers associated with prior versions of a virtual webpage to which they can return and resume their editing. Such versioning system may also support making change to development database version which are not part of the published version until a publish operation is performed. This is also known as "sandboxing" of the development database.

Method 2600 may also include a Step 2630, where any edits to skeleton code made by the user are received. Further, in a Step 2634, any edits to the actual code (e.g., through Step 2620) or the skeleton code (e.g., through Step 2630 may be translated into edits to actual code for the webpage. As described above, for example, users may make edits to actual or skeleton code associated with various backend or frontend functionalities of virtual webpages. Such edits to the code may be stored in the same database hosting the data elements for a virtual webpage or a separate code database.

Further, in a Step 2632, Method 2600 may include enabling, during a live view of an actual webpage associated with a virtual webpage, a display of the webpages with the updates made to the virtual webpage during the preview mode—including both regular webpages and virtual webpage instances. As discussed above, for example, users may be able to edit numerous features of a virtual webpage during preview mode (e.g., page structure, data elements, frontend code, backend code, etc.) for both templates and instances. Such edits may be translated into corresponding updates to page definitions or data element changes, which may be stored in the Site Area Database 124 and/or in separate databases (e.g., a data element database, an instance adaptation database, and/or a separate code database on which the virtual webpage is based). Such separate databases may also be hosted by WBS 100, for example, as part of Memory 820 or Persistent Storage 830. Further, such edits may be translated into corresponding updates for the actual, live webpage as well. In various embodiments, virtual webpages and actual webpages may be based on the same database(s) or different (e.g., linked) database(s). It should be noted that these databases (e.g., Site Area Database 124 and other databases, such as a data element database, instance adaptation database, or separate frontend/backend code database) may be implemented as a single database, a set of databases, or a combination of databases (each of which may support a subset of the required functions).

Figure 27:
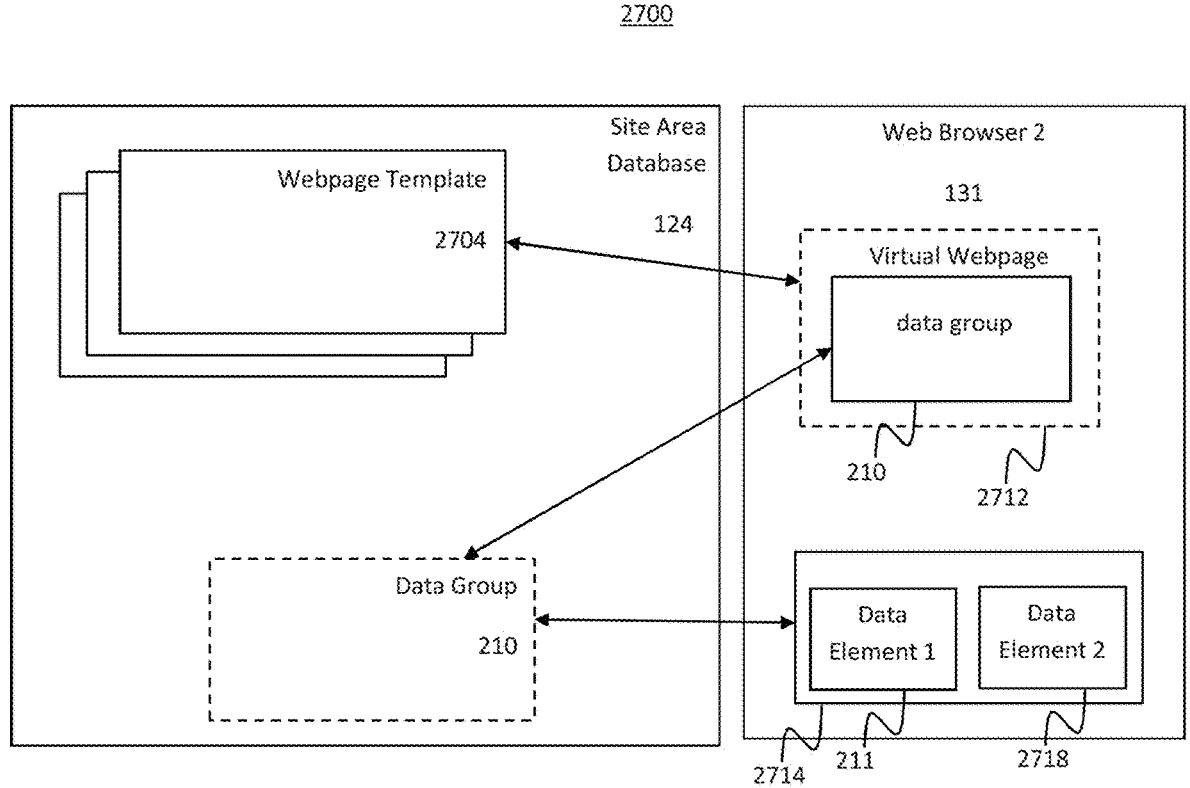
FIG. 27 is a system for the development and preview of web pages, according to some embodiments of the present disclosure.

FIG. 27 is a system 2700 for the development and preview of web pages, according to some embodiments of the present disclosure. As discussed above, system 2700 may be similar to, or operate within, the systems discussed in connection with FIGS. 1, 2, 15, and others. In some embodiments, system 2700 may include a Site Area Database 124, which stores data elements and/or code for one or more webpage 2704. As shown, numerous webpages 2704 may be maintained, each of which may have its own corresponding data elements. As discussed above, the data elements may be organized into Data Group 210 of one or more data elements. As noted above, such data group 2710 may be system-wide, site-group specific, site-specific or page-specific (typically for a given Web Page Template 2704).

As shown in FIG. 27, Site Area Database 124 may communicate over a network with a Web Browser 131 or other client application, which may be operated by a user. The Web Browser 131 may display a Virtual Webpage 2712 corresponding to each Webpage Template 2704 in Site Area Database 124 using data elements in Data Group 210. Further, each virtual webpage 2712 may be associated with a Data Element 211. Further, users may have a display of data elements individually (e.g., Data Element 1 211 and Data Element 2 2718) as part of data element group 2714. As discussed above, users may interact with the displayed virtual webpage 2712, including its elements 2710, 2714, 211, 2718, to edit the various features of Virtual Webpage 2712. The edits may involve specific data elements, page structure features, frontend code, backend code, and more. As discussed above, such edits may be received by Site Area Database 124 and/or other databases.

Figure 28:
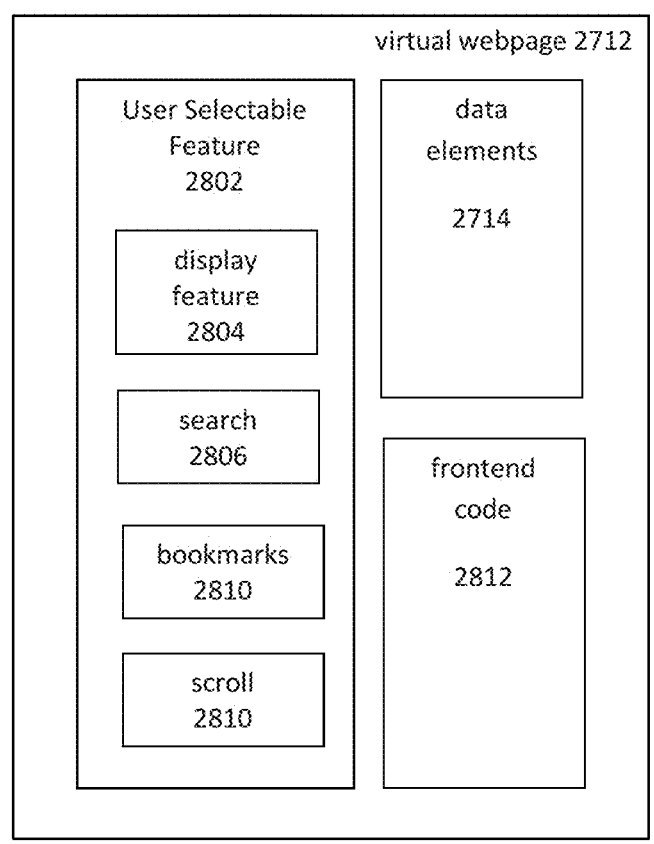
FIG. 28 is a block diagram of a virtual web page, according to some embodiments of the present disclosure.

FIG. 28 is a block diagram 2800 of virtual web page, according to some embodiments of the present disclosure. Consistent with the above examples, virtual webpage 2712 may include various User Selectable Features 2802, including a display feature 2804, search element 2806, bookmarks 2810, scroll feature 2810, and other features. Virtual webpage 2712 may further include data elements 2714 and frontend code 2812, as discussed above. Further, virtual webpage 2712 may be associated with backend code (not shown), such as dynamic webpage code. Users may view, interact with, and make edits to virtual webpage 2712 as discussed above. Such edits may be received by one or more components of the website building system, such as Site Area Database 124. Through the display of virtual webpage 2712, users may visualize the edits they are making before a corresponding webpage goes live. To publish the virtual webpage 2712 in a live mode, a user may select a "publish" or "render" link, as discussed above.

Figure 29:
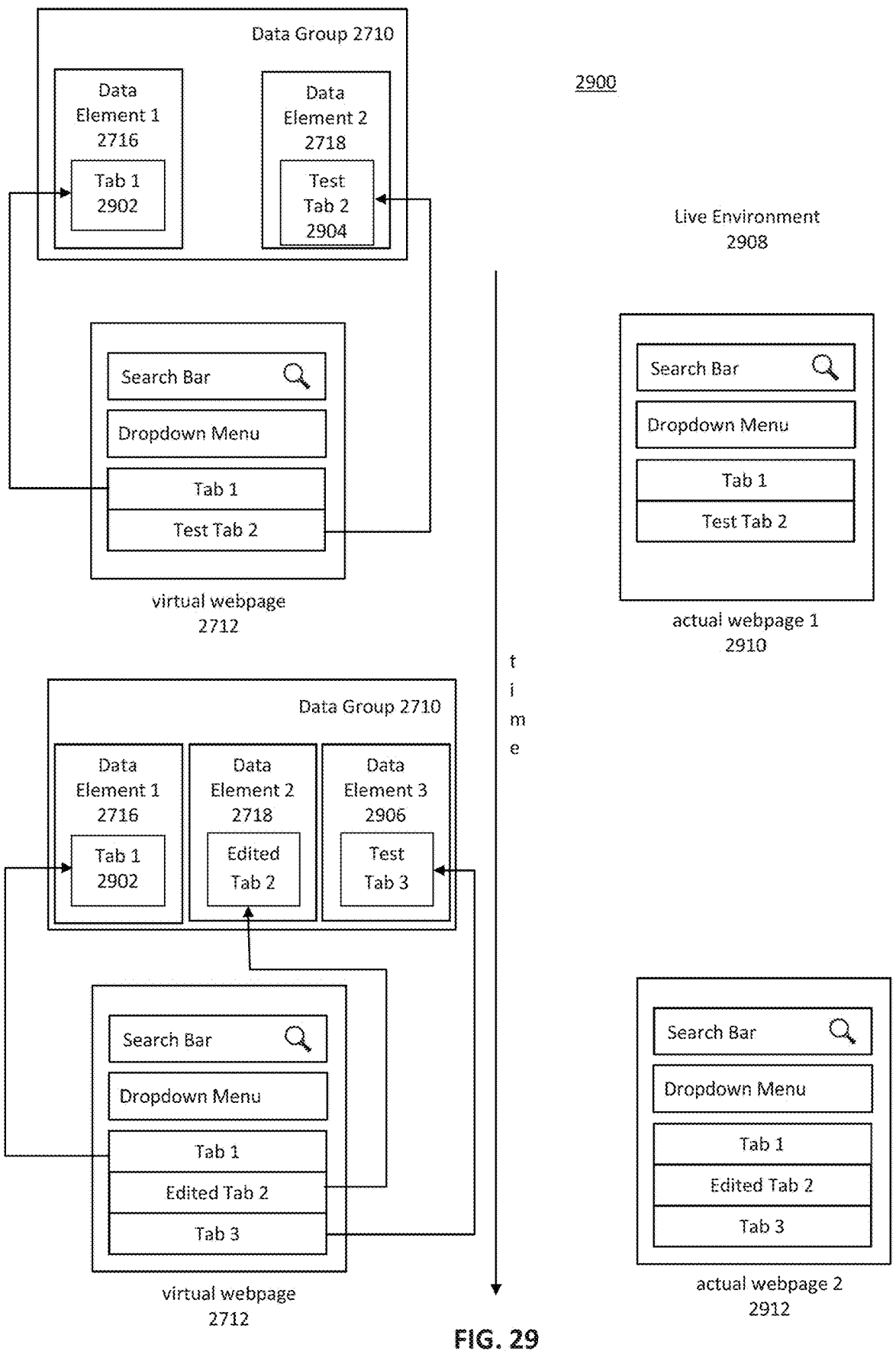
FIG. 29 is a timeline display of dynamic refresh of webpages, according to some embodiments of the present disclosure.

FIG. 29 is a timeline display 2900 of dynamic refresh of webpages, according to some embodiments of the present disclosure. In particular, as a user makes edits to a virtual webpage 2712, the edits may be refreshed in Site Area Database 124 and thus also in the user's browser. As shown in FIG. 29, data group 2710 may include Data Element 1 211 and Data Element 2 2718, among other data elements. Within Data Element 1 211, a Tab 1 2902 may be displayed and within Data Element 2 2718, a Test Tab 2 2904 may be displayed. Tab 1 2902 and Test Tab 2 2904 may be displayed on virtual webpage 2712, as shown, along with other elements (e.g., a search bar, dropdown menu, etc.).

As time progresses in timeline display 2900, the user may make edits to the virtual webpage 2712. For example, as shown, the user may make edits to Test Tab 2 2904, resulting in Edited Tab 2. Further, a new Data Element 3 2906 may be added to virtual webpage 2712, as part of data group 2710. As the edits to the virtual webpage 2712 are made, corresponding edits may be made in a Live Environment 2908. For example, upon the user selecting a "publish" or "render" function, Live Environment 2908 may be updated to display the updates to data group 2710 and other aspects of virtual webpage 2712. For example, a first version of the actual webpage 2910 may not include the Edited Tab 2 or Tab 3, while the subsequent version of the actual webpage 2912 may include those updates. In various embodiments, updates to the virtual webpage 2712 may be made automatically or upon the user selecting a refresh or update function. Further, updates to the actual webpage 2910 and 2912 in Live Environment 2908 may be made upon the user confirming a transition to the Live Environment 2908 (e.g., selecting a "publish" or "render" link).

Figure 30:
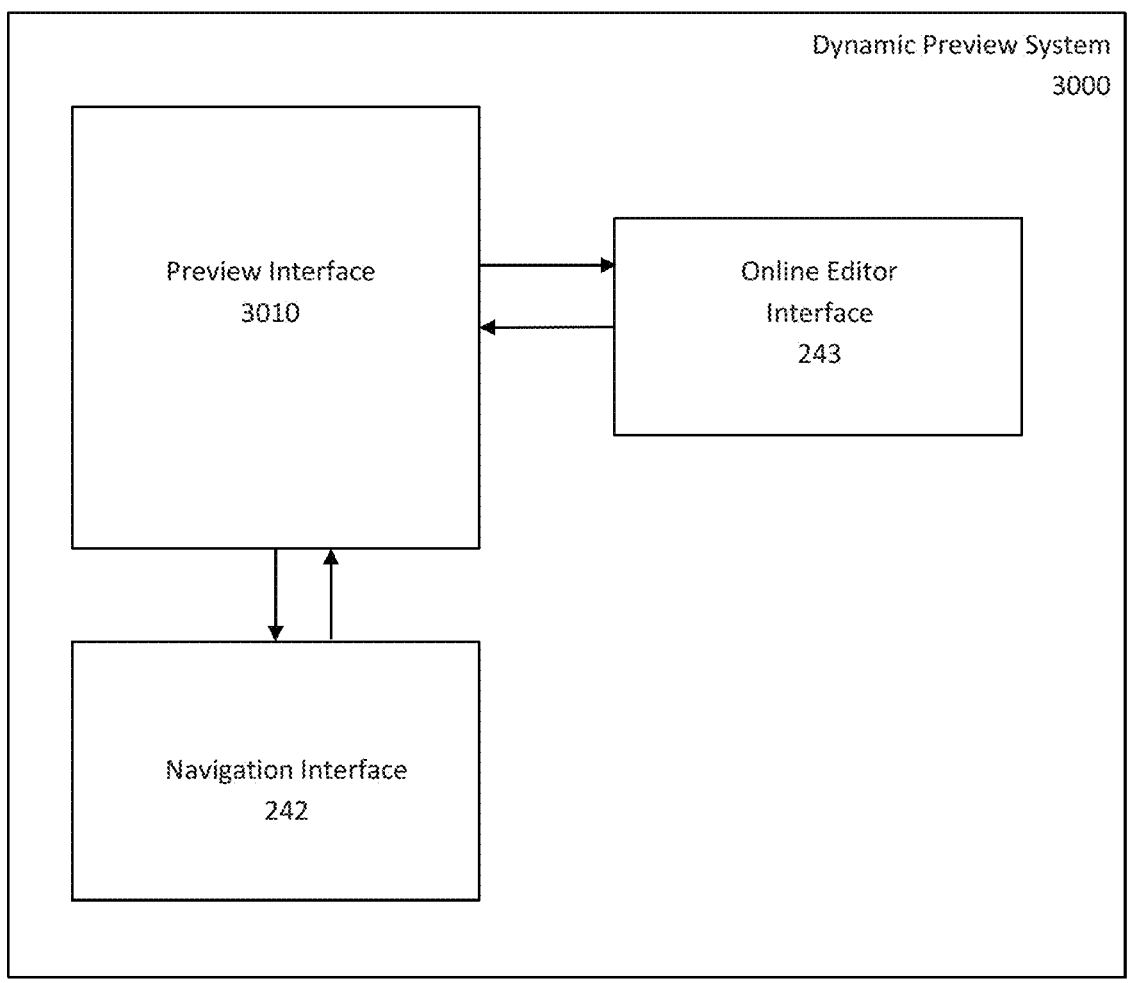
FIG. 30 depicts a block diagram of a dynamic preview system, according to some embodiments of the present disclosure.

FIG. 30 depicts a block diagram of a Dynamic Preview System 3000, according to some embodiments of the present disclosure. As shown in FIG. 30, Dynamic Preview System 3000 helps display web pages as they would appear, for example, in Deployment Environment 1510. Preview Interface 3010 may be a frame or other graphical interface within Online Editor Interface 243 displaying a web page. In some embodiments, Preview Interface 3010 may be a separate tab opened on the web browser being used to show Online Editor Interface 243.

Preview Interface 3010 may be used to display both static web pages and virtual web pages (i.e. instances of a given Webpage Template 2704). Virtual web pages generated for viewing in the Preview Interface 3010 may be accompanied by a Navigation Interface 242. Preview Interface 3010 may allow Navigation Interface 242 to include scrollable features to allow users to scroll across multiple virtual web pages generated for display in Preview Interface 3010. Navigation Interface 242 may allow both sequential navigation and direct access to specific virtual web pages, as well as navigation between virtual pages via searching (e.g. using values of the key data item used to identify specific virtual pages). Navigation Interface 242 may have direct access to specific virtual web pages and may support bookmarked virtual web pages to selectively browse. For example, the virtual web pages being displayed in Preview Interface 3010 may be accompanied by a links to first, last, previous or next virtual web pages. The WBS 100 may also support other arrangements of the virtual pages—not just a linear one. For example, the WBS 100 may support a hierarchical arrangement of virtual pages, which may be navigated using additional options such as "go to higher tree level" or "expand level below current page".

Figure 31:
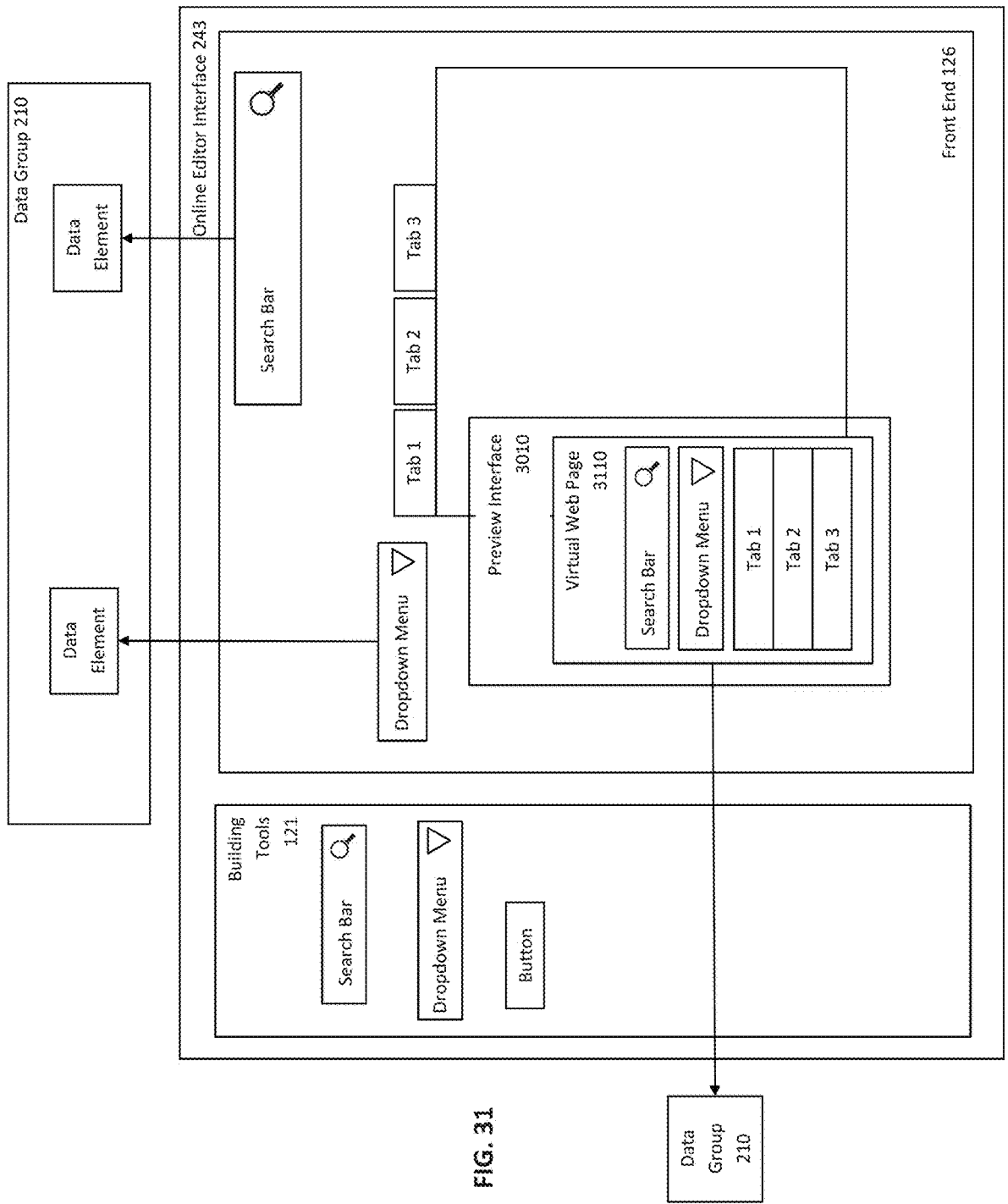
FIG. 31 illustrates a preview of a virtual web page being edited, according to some embodiments of the present disclosure.

FIG. 31 illustrates a preview of a Virtual Web Page 3110 being edited, according to some embodiments of the present disclosure. As shown in FIG. 31, Front End 126 is associated with Data Group 210. Building Tools 121 included in Front End 126 may be associated with specific data elements of Data Group 210. Virtual Web Page 3110 may display Indexable Web Page 125, including Front End 126, and can be previewed in Preview Interface 3010. In some embodiments, Preview Interface 3010 may be a frame or other graphical representation within the Online Editor Interface 243. Preview Interface 3010 may allow Virtual Web Page 3110 to be previewed as it would appear on different mobile and desktop devices, using different languages, adapted for accessibility requirements or otherwise modified for specific audiences.

Figure 32:
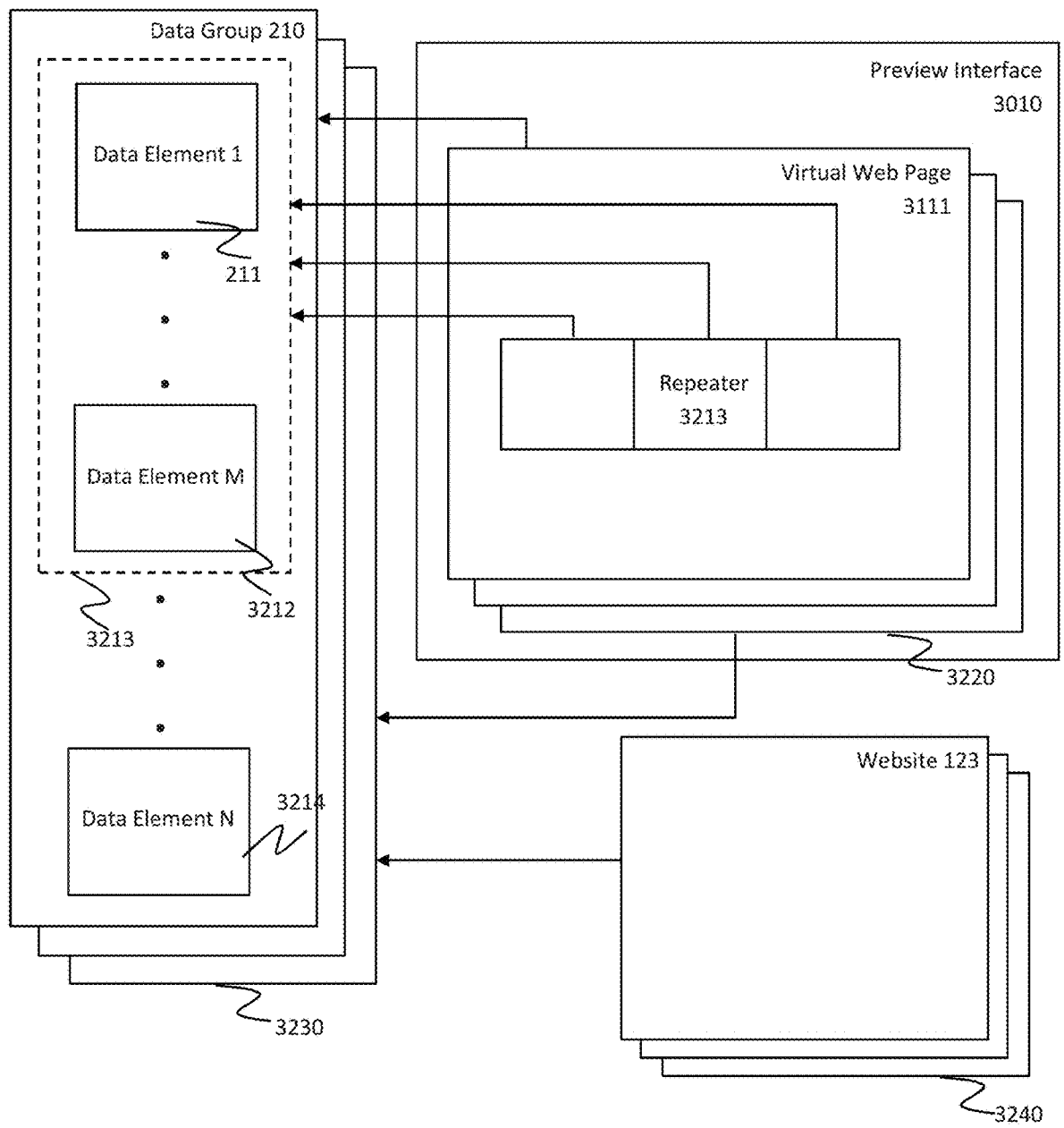
FIG. 32 is a schematic diagram depicting a relation between data groups and websites, according to some embodiments of the present disclosure.

FIG. 32 is a schematic diagram depicting relations between data groups and websites, according to some embodiments of the present disclosure. As shown in FIG. 32, a group of Virtual Web Pages 3220 of a website may be associated with a same Data Group 210. In some embodiments, group of Virtual Web Pages 3220 may be associated with a set of Data Groups 3230. In some embodiments, a group of Websites 3240 may share the same set of Data Groups 3230. A group of Websites 3240 sharing set of Data Groups 3230 may have a same owner or operator, or may have otherwise been granted appropriate permissions (though an access control mechanism) to access specific Data Groups 210. In some embodiments, a group of Websites 3240 sharing a set of Data Groups 3230 may have been built by same Developer/Designer 1540, as discussed above.

As illustrated in FIG. 32, a Repeater 3213 is a building tool visible on front end of a web page displaying different content items or groupings in different sections with a repeated design or layout. In some embodiments, Repeater 3213 may be part of a Virtual Web Page 3111 generated using a software-based router, as discussed further herein or a part of a regular (static) Indexable Web Page 125. Repeater 3213 displays different content based on Data Element 1 211 and Data Element M 3212 of Data Group 210. Repeater may be associated directly with a Data Group subset 3213 of Data Group 210. For example, a repeater may be used to create five different groupings of text and images. Each grouping may automatically position the text and images with the same proportions and layout. Nevertheless, in some embodiments, the actual content of the text and images may be different in each grouping.

Figure 33:
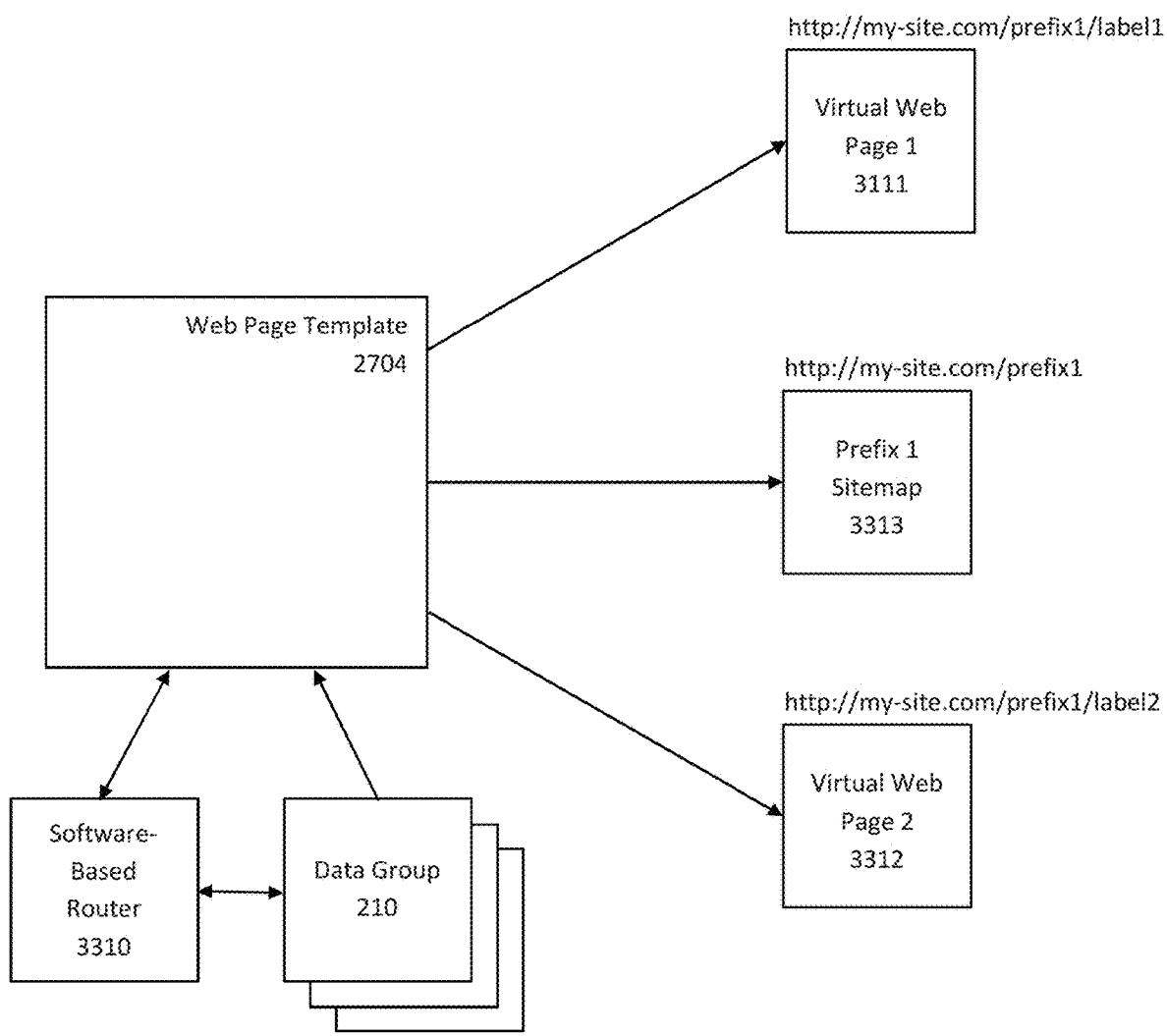
FIG. 33 is a schematic diagram depicting components involved in the generation of virtual webpages, according to some embodiments of the current disclosure.

FIG. 33 is a schematic diagram depicting components involved in the generation of virtual web pages, according to some embodiments of the current disclosure. As shown in FIG. 33, Web Page Template 2704, similar to indexable web pages, may be associated with Data Group 210 and other data groups. As discussed above, Software-Based Router 3310 may be used to bind data elements in a Data Group 210 and may be applied to Web Page Template 2704 to generate Virtual Web Pages 3111, 3313, and 3312. Software-Based Router 3310 may select/filter/sort data elements in Data Group 210 to apply to Web Page Template 2704 and to virtual web page groups based on the URL sent by a user. Software-Based Router 3310 identifies Web Page Template 2704 based on a URL prefix. Software-Based Router 3310 may identify data elements in Data Group 210 to be applied to Web Page Template 2704 to generate virtual web pages based on URL elements (e.g., suffix components, text segments or parameter values) following the URL prefix. In some embodiments, the URL prefix "prefix1" identifies Software-Based Router 3310 for Web Page Template 2704. Software-Based Router 3310 may generate Virtual Web Page 3111 and 3312 based on suffix value "label1" and "label2" respectively. Software-Based Router 3310 may generate a sitemap Prefix 1 Sitemap 3313 listing possible URLs of all the virtual web pages that can be generated using Web Page Template 2704 and associated Data Group 210, as well as other data groups. Prefix 1 Sitemap 3313 may aid in indexing Virtual Web Pages 3111 and 3312 by Search Engine 170.

Figure 34:
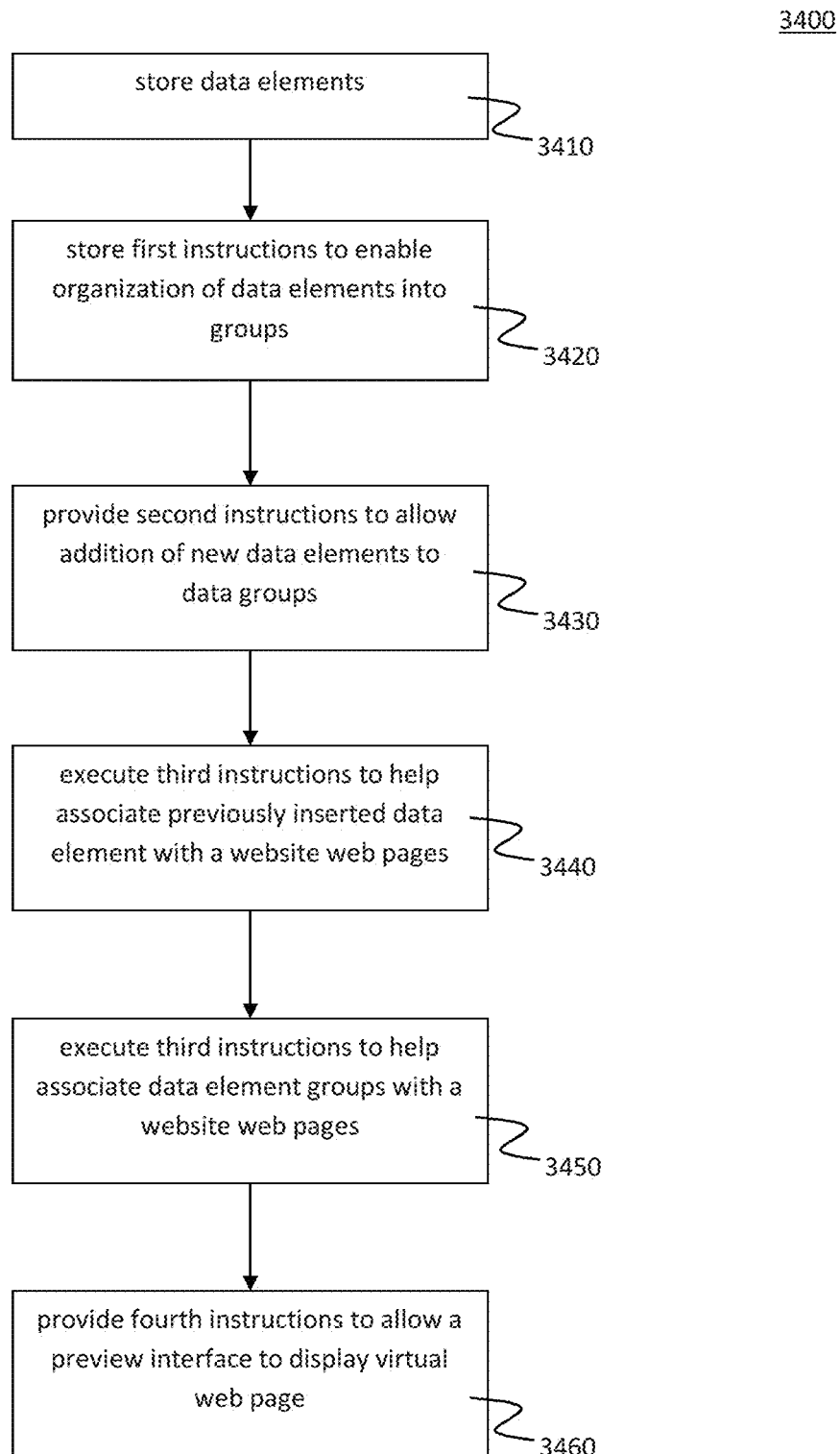
FIG. 34 is flowchart showing Steps involved in a preview of virtual webpages, according to some embodiments of the present disclosure.

FIG. 34 is flowchart 3400 showing steps involved in the generation and preview of virtual web pages, according to some embodiments of the present disclosure. The flowchart 3400 represents steps that may be performed in the system embodiments described above.

As shown in FIG. 34, in Step 3410, a Dynamic Preview System 3000 may store data elements in Site Area Database 124. As discussed above, data elements may take a variety of different forms, such as text, images, videos, backgrounds, as well as records consisting of a combination of any of these object types.

In Step 3420, Dynamic Preview System 3000 may store instructions enabling organization of the stored data elements into data groups. For example, groups may be defined in databases. Further, groups may be defined by the relationships between elements in the group, or by fields in data elements whose values rely on other fields. Consistent with above embodiments, data groups may be defined before any visual elements, fields, or specific webpages are defined.

In Step 3430, Dynamic Preview System 3000 may provide further instructions to the web browser displaying the Online Editor Interface 243 to allow addition of additional data elements to previously created data groups in Site Area Database 124. In this manner, existing groups may be supplemented or edited to contain different or additional elements. A user can repeat Step 3420 and can come back at anytime to further add data elements. Similarly, this step may include instructions for performing additional operations on data elements, such as deletion and update. For example, a user can cycle between Steps 3410, 3420, and 3430, or proceed to Step 3430.

In Step 3440, Dynamic Preview System 3000 may execute instructions to aid in associating previously inserted data elements of data groups stored in Site Area Database 124 to the website being edited in Online Editor Interface 243. A user can repeat Step 3420 and can come back at anytime to further create associations between web pages of the website being built and data elements organized as data groups stored in Site Area Database 124.

In Step 3450, Dynamic Preview System 3000 provides instructions to help associate data element groups with a website's web pages. This may involve, as discussed above, linking fields in a form with each other to both activate/deactivate and filter potential values allowed for a field (e.g., a form to fill address may list in city field values depending on selection in the state field).

In Step 3460, Dynamic Preview System 3000 provides instructions to Online Editor Interface 3000 to allow preview of web pages of a website being built in Online Editor Interface 243. The previews may allow for user editing in real-time, as discussed above.

A user can repeat Steps 3430, 3440, 3450, 3460 any number of times and repeat them in any order.

Figure 35:
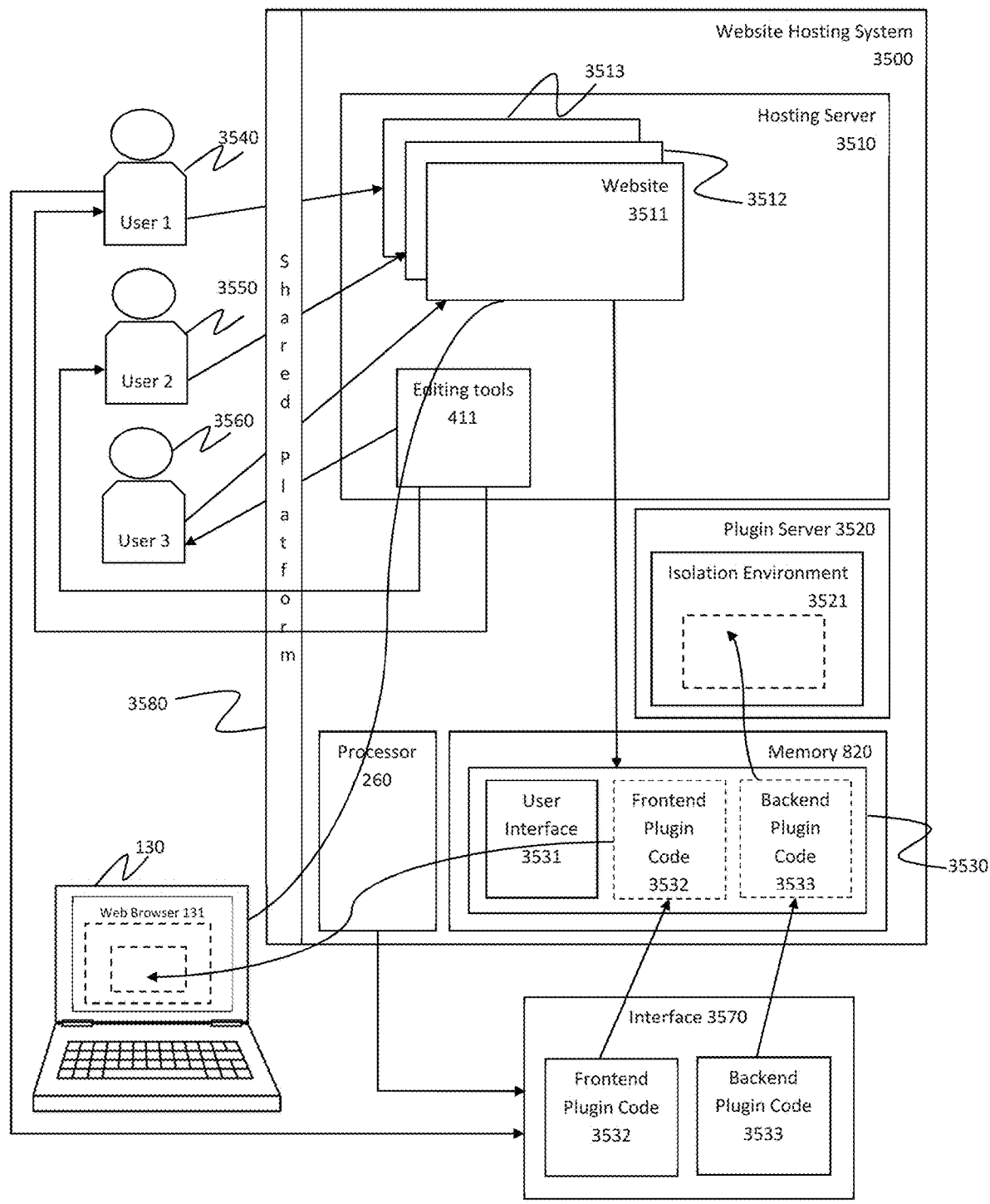
FIG. 35 is a schematic diagram of users interacting with website hosting system, according to some embodiments of the present disclosure.

FIG. 35 is a schematic diagram of users interacting with a Website Hosting System 3500, according to some embodiments of the present disclosure. As shown in FIG. 35, Website Hosting System 3500 includes Hosting Server 3510, which includes one or more systems to build and view websites, Plugin Server 3520 executing plugin code, Processor 260, Memory 820 storing plugin components and code, an Interface 3570 to develop, and upload plugin code and other components.

Hosting Server 3510 may be one or more servers hosting co-hosted websites 3511, 3512, and 3513. Hosting Server 3510 may be a webserver execution instance in On-Demand System 800, for example, or in another type of website hosting system. In some embodiments, Hosting Server 3510 may be multiple web server execution instances in On-Demand System 800. Hosting Server 3510 may also be WBS 100 which is storing websites edited and accessed by Developer/Designer 1540 and End User 1530, as discussed above.

Editing Tools 411, as discussed above, are common tools to edit a website shared by websites hosted by Hosting Server 3510. In some embodiments, Editing Tools 411 may be shared across multiple Hosting Servers 3510 hosting co-hosted Websites 3511-3513.

Plugin Server 3520 may be one or more servers executing plugin code in an Isolation Environment 3521. In some embodiments Plugin Server 3520 uses the same infrastructure as hosting server 3510 (which may be physical servers or webserver execution instance as noted above). Plugin 3530 is present in memory 820 and is viewable or accessible through a User Interface 3531, Frontend Plugin Code 3532, and Backend Plugin Code 3533.

Users 3540-3560 may access Editing Tools 411 from Hosting Server 3510 to edit the Websites 3511-3513 respectively. In some embodiments, for example, Website 3511 being edited by User 3540 may include a Plugin 3530. For example, Website 3511 may play video through a video player Plugin 3530 when Website 3511 is accessed using Web Browser 131 on Web Viewing Device 130. User 3540 altering Website 3511 may include editing and uploading plugin code via Interface 3570. In some embodiments, Interface 3570 may be part of Editing Tools 411.

Users 3540-3560 interact with Websites 3511-13 on Hosting Server 3510 via shared platform 3580. Shared Platform 3580 allows groups of users edit groups of websites. Shared Platform 3580 may be software configured for determining which groups of Users 3540-3560 have access to edit which Websites 3511-13. In some embodiments, Hosting Server 3510 hosting multiple Websites 3511-13 might itself act as a Shared Platform 3580.

End User 1530 viewing Website 3511 using Web Browser 131 on Web Viewing Device 130 may include User Interface 3531 of Plugin 3530. For example, Plugin 3530 may be a video player and User Interface 3531 may include play back control buttons stylized for video player Plugin 3530. Frontend Plugin Code 3532 may also be passed along through User Interface 3531 when End User 3540 accesses a website. End User 1530 interacting with User Interface 3531 of Plugin 3530 may result in Frontend Plugin Code 3532 of Plugin 3530 executing in Web Browser 131. In some embodiments, End User 1530's interaction with Website 3511 may also result in Backend Plugin Code 3533 executing in Plugin Server 3520. For Example, End User 3540 clicking on play back controls of a video player plugin may result in Frontend Plugin Code 3532 executing and making a request to stream the video, and further Backend Plugin Code 3533 may compress the video based on network bandwidth availability.

Figure 36:
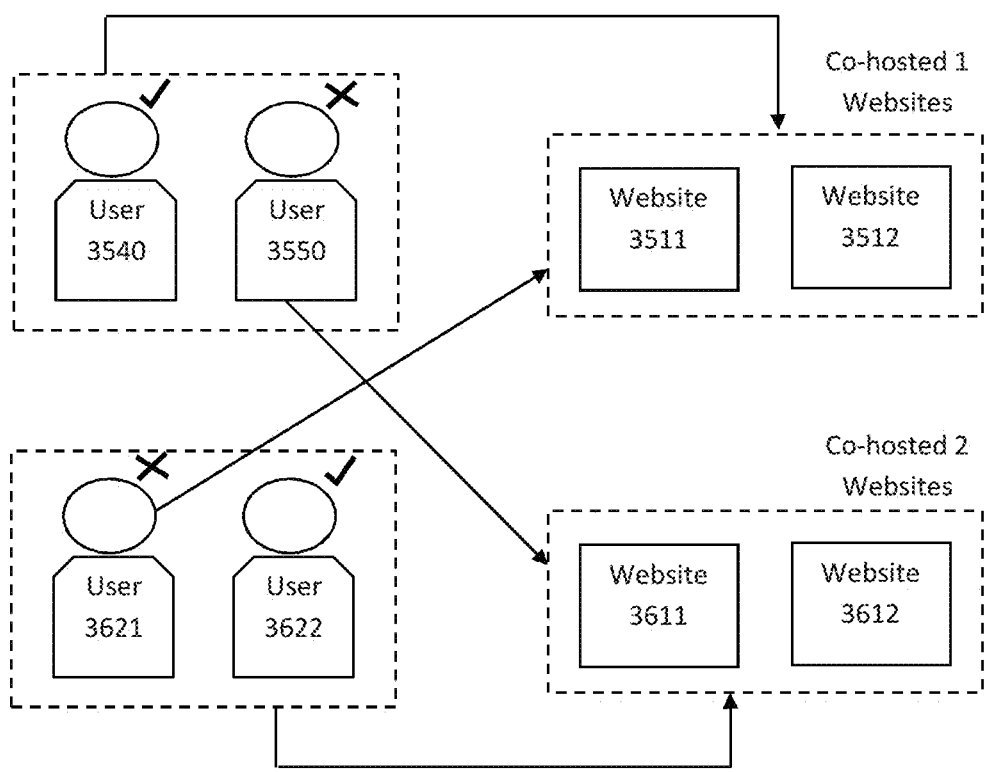
FIG. 36 depicts a controlled access to co-hosted websites, according to some embodiments of the present disclosure.

FIG. 36 depicts a technique of controlled access to co-hosted websites, according to some embodiments of the present disclosure. As shown in FIG. 36, Users 3540, 3550 are grouped together and are allowed access to Co-Hosted 1 Websites 3511 and 3512. User 3621 and 3622 may have access to Co-Hosted 2 Websites 3611 and 3612. Users may access one or more Co-Hosted websites but are not allowed to access websites they are not part of the allowed group. Users may have their access rights defined, for example, based on whether they are the owner of particular websites, are registered users, have been authenticated, etc.

Figure 37:
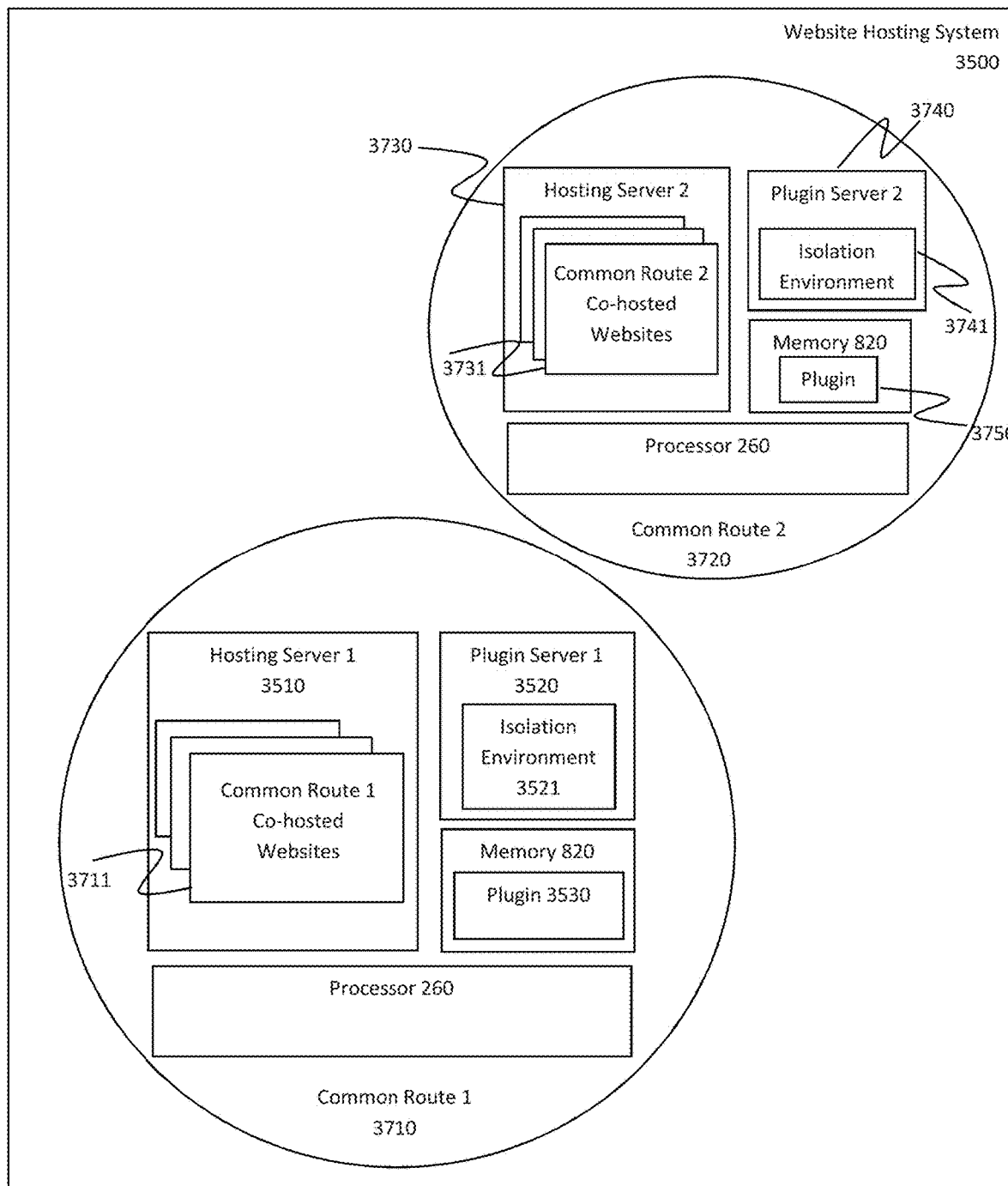
FIG. 37 depicts co-hosted website groups sharing plugin code under common routes, according to some embodiments of the present disclosure.
Figure 38:
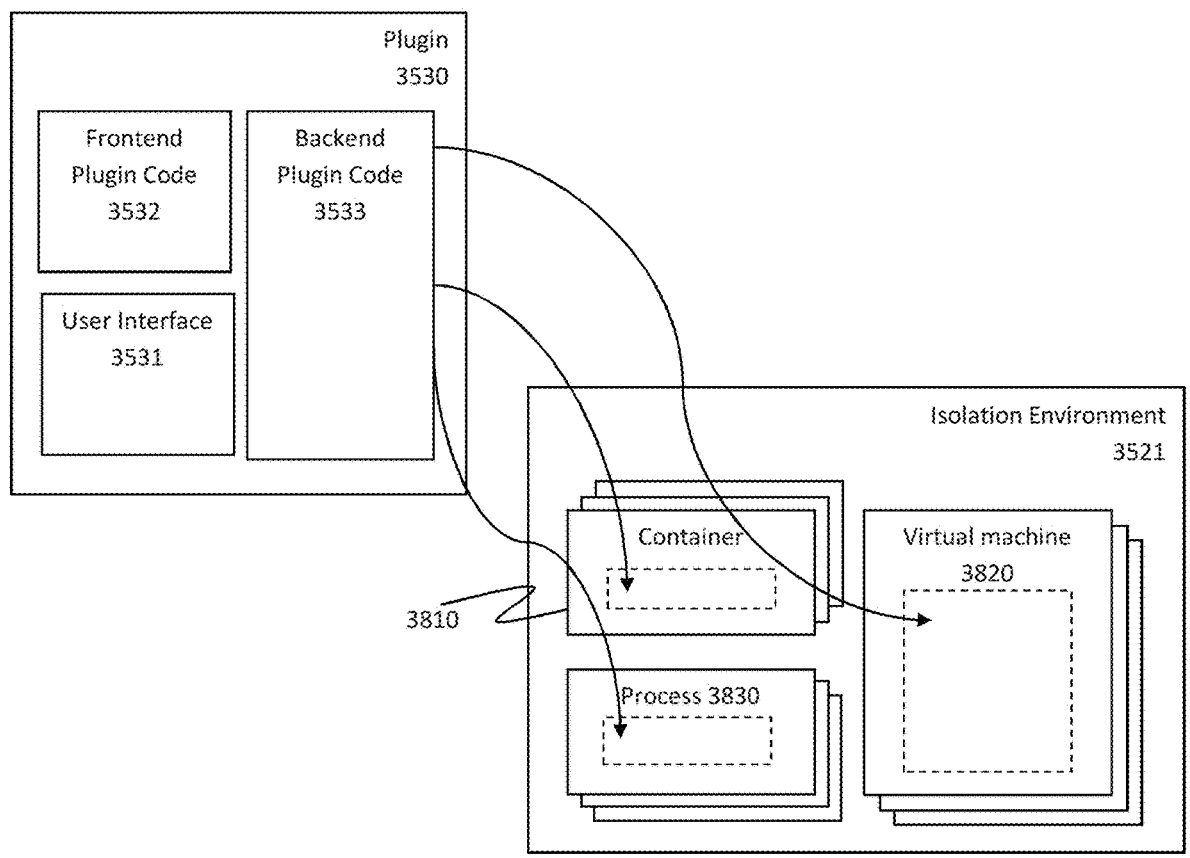
FIG. 38 depicts isolated execution environments of Backend plugin code, according to some embodiments of the present disclosure.

FIG. 37 depicts co-hosted website groups sharing plugin code under common routes, according to some embodiments of the present disclosure. As shown in FIG. 37, Web Hosting System 3500 has two sets of co-hosted websites, each set differing from the other by a URL route. For example, Common Route 1 Co-Hosted Websites 3711 may share domain www.a.com and Common Route 2 Co-hosted Websites 3731 may share domain www.b.com. Alternatively, Common Route 1 Co-Hosted Websites 3711 may have a common subdomain a.wixsite.com and Common Route 2 Co-Hosted Websites 3731 may have a common subdomain b.wixsite.com. Websites with common routes may be co-hosted on a hosting server or environment to create an isolation environment and eliminate interaction with other sets of co-hosted websites. Co-hosted websites may also have different plugin servers to create isolated environments for the plugin code to execute. Common Route 1 Co-Hosted Websites 3711 and Common Route 2 Co-Hosted Websites 3731 may still share the same Processor 260 and Memory 820 or have different processors and memory. FIG. 38 depicts isolated execution environments of Backend Plugin Code 3533, according to some embodiments of the present disclosure. As shown in FIG. 38, Backend Plugin Code 3533 of Plugin 3530 Isolation Environment may be based on a Container (e.g., Docker) 3810 or Virtual Machine 3820 or Operating System Process 3830. In some embodiments, Isolation Environment 3521 may include one or more Container 3810, Virtual Machine 3820, and Operating System Process 3830 (e.g., serverless code), each running separate Plugin Backend Code 3533. In some embodiments a plugin server hosting Plugin 3530 may include multiple isolation environments.

Figure 39:
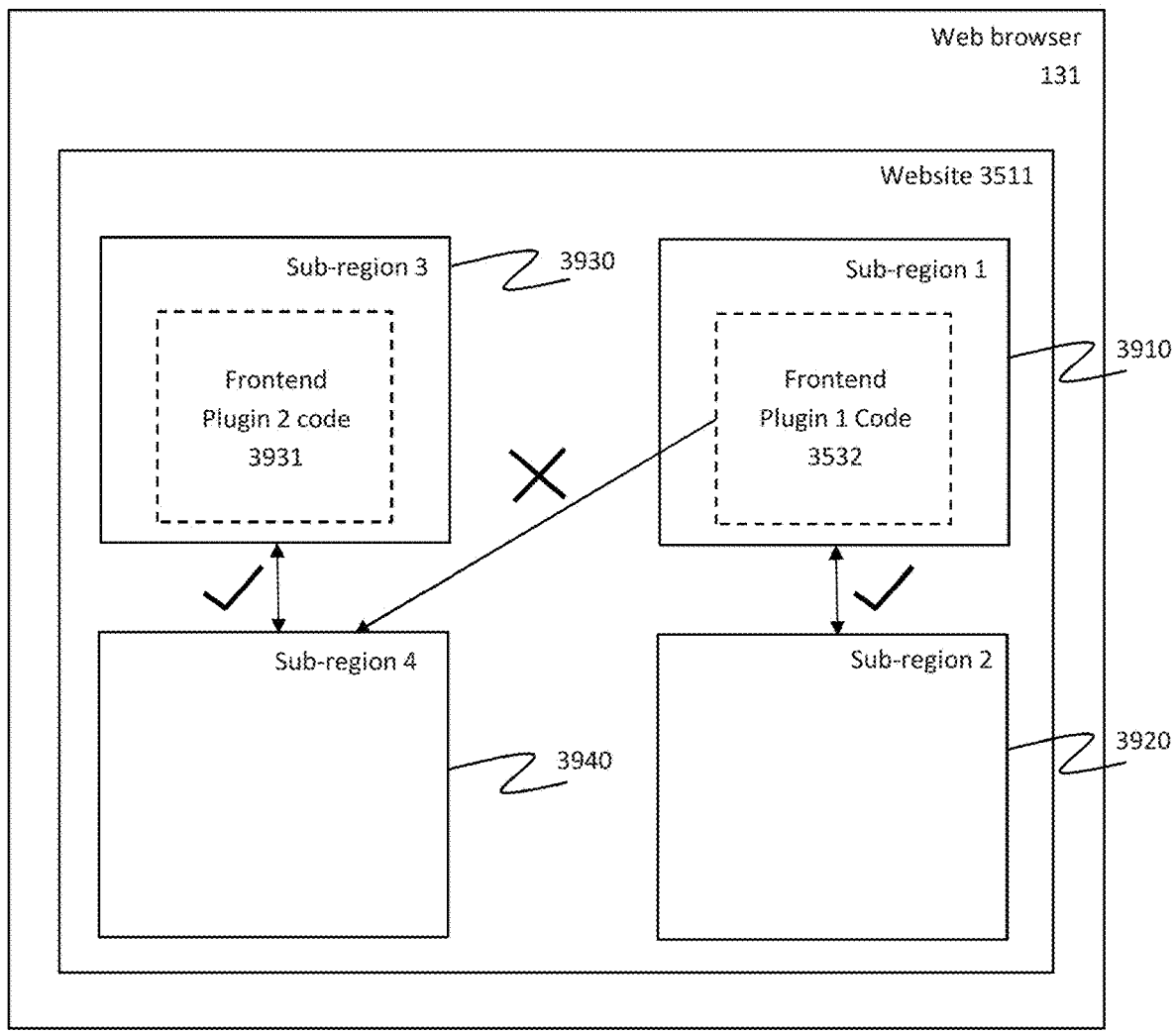
FIG. 39 depicts a controlled access and execution of Frontend plugin code, according to some embodiments of the present disclosure.

FIG. 39 depicts a controlled access and execution of Frontend Plugin Code 3532, according to some embodiments of the present disclosure. As shown in FIG. 39, accessing Website 3511 may result in access to Frontend Plugin 1 Code 3532 of Plugin 3530 and Frontend Plugin 2 Code 3931 of another plugin. Website 3511 may make sure to run each of the plugins in separate Sub-Regions 3910 and 3930 respectively. Website Hosting System 3500 may also create a secure communication channel (e.g., SSL, secure tunnel, etc.) to allow only certain other sub-regions of the website to be accessible. The secure communication channel may restrict access of a Frontend plugin to other sub regions of the website. For example, Frontend Plugin 1 code 3532 executing in Sub-Region 3910 may communicate with another Sub-Region 3920 but may be denied access to Sub-Region 3940. The accessible sub-regions of a plugin may be listed in a tabular form, in a trusted registry, in a configuration file, or in a secure database. For example, in a cloud-computing based arrangement, a cloud orchestrator platform may maintain a list or mapping of virtual computing resources (e.g., Sub-Region 3910, Sub-Region 3920, Sub-Region 3940, etc.) and may define their connection permissions. Such a list or mapping may permit specific connections or actions by Sub-Region 3910, Sub-Region 3920, and Sub-Region 3940 and deny other connections or actions. In some embodiments, secure communication channel is provided by allowing all communications to pass through one or more hubs (e.g., a hub that performs authentication or authorization verifications). Such hubs may be, for example, resident on a system client, a system server or both. Secure communication can also be established by verifying the communication originating sub-region unique identifier. For example, a getId( ) method call may be used to identify the origin sub-region id of a communication message and determine if it is in the allowed list or mapping.

Figure 40:
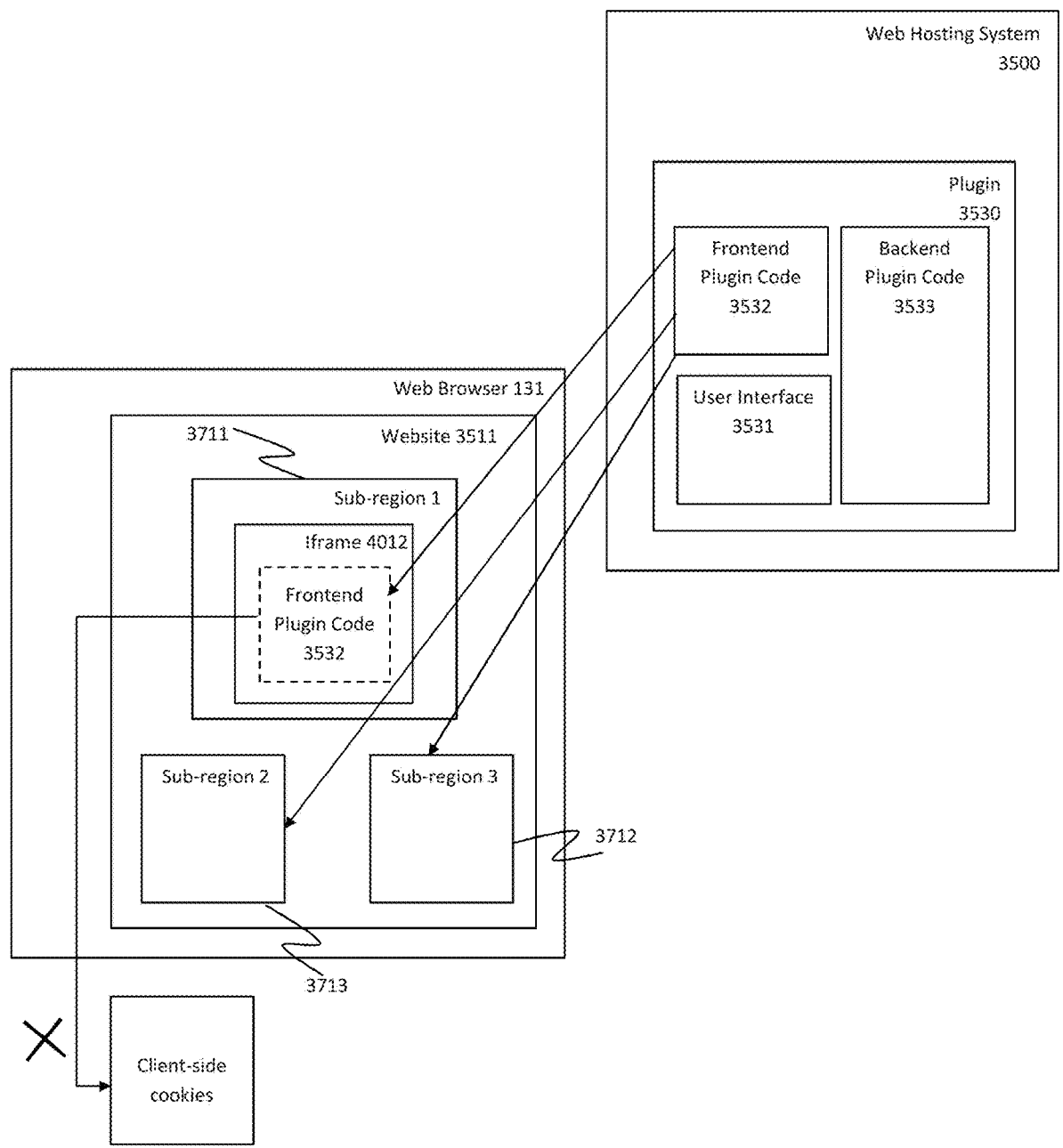
FIG. 40 depicts client-side isolated execution of plugin code, according to some embodiments of the present disclosure.

FIG. 40 depicts client-side isolated execution of plugin code, according to some embodiments of the present disclosure. As shown in FIG. 40, Website 3511 accessed using Web Browser 131 by an End User 1530 may result in access to Frontend Plugin Code 3532 of Plugin 3530. End User 1530 access may result in creation of an iframe for executing the Frontend Plugin Code 3532 in isolation. In some embodiments Frontend Plugin Code 3532 may be copied to different Sub-regions 3712-3713 of the Website 3511 for execution in isolation. For example, Website 3511 may show multiple Video Players each streaming different video streams but using the same plugin code. In some embodiments, Plugin Code 3532-3533 executing in an Iframe may not have access to client side cookies (e.g., HTTP cookies).

Figure 41:
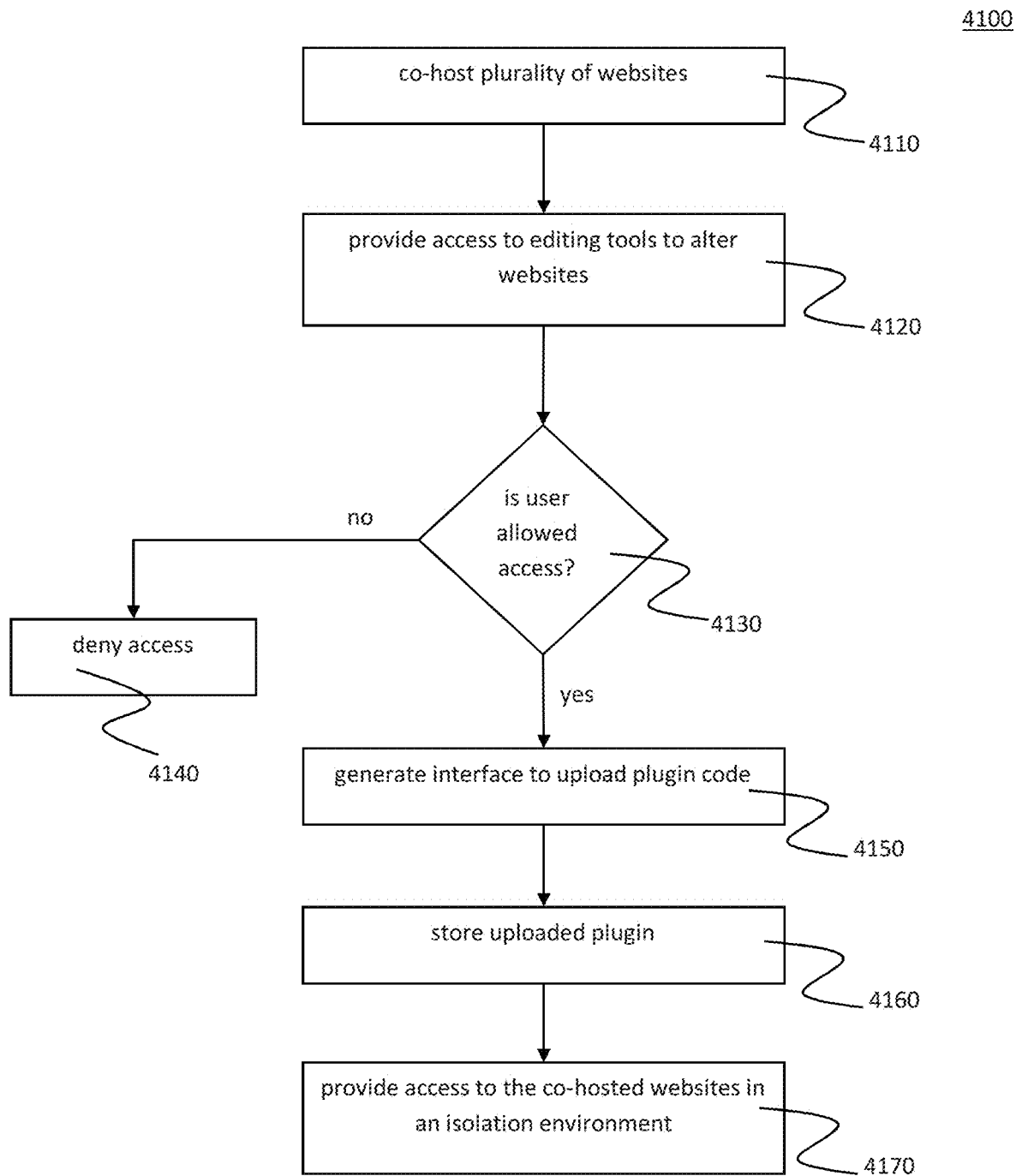
FIG. 41 is a flowchart showing Steps involved in accessing and execution of website and plugin code, according to some embodiments of the present disclosure.

FIG. 41 is a flowchart showing steps involved in accessing and execution of website and plugin code, according to some embodiments of the present disclosure. As shown in FIG. 41, in step 4110, Website Hosting System 3500 hosts websites sharing one or more common data elements, templates, portions of code, routes, or other functionality in a common hosted server or set of servers. Servers may also be co-hosted on the basis of ownership or administrative and editing privileges for the plurality of users. For example, Website Hosting System 3500 may host websites created and managed by several independent and unaffiliated entities or individuals.

In Step 4120, Website Hosting System 3500 provides access to Editing Tools 411 to further edit the websites co-hosted by the system. As discussed above, Editing Tools 411 may allow the user to edit numerous aspects of the websites.

In step 4130, an effort by a user to access a website for editing purposes results in Web Hosting System 3500 evaluating if the user making the request has access or privileges to edit the website. The evaluation may depend on ownership of a certain website. In some embodiments, owner or administrator of a website may provide admin and/or edit access to other users using Editing Tools 411. Further, in some embodiments, editing rights may depend on whether the user is a registered user or has been authenticated to access Web Hosting System 3500.

If the answer to Step 4130 is no, the requested access to website is denied and the user may need to request editing privileges from the administrator of the website. The process 4100 is regarded complete on failure to gain access to edit the website. Alternatively, the process 4100 may cycle back to Step 4120 or 4130.

If the answer to Step 4130 is yes, the process 4110 proceeds to Step 4150. In Step 4150, an interface to upload plugin is presented to user requesting access to edit a website. The interface may be similar to those discussed above for users to edit frontend or backend code.

In Step 4160 Website Hosting System 3500 receives the plugin changes and stores them. A user-uploaded plugin may, for example, include edits to Backend Plugin Code 3533 of Plugin 3530. In some embodiments, user edits may include edits to Frontend Plugin Code 3532 of Plugin 3530. Alternatively, a user may also edit the User Interface 3531 of Plugin 3530. In some embodiments, a user may edit all of User Interface 3531, Frontend Plugin Code 3532, and Backend Plugin Code 3533.

A user editing plugin code (e.g., Frontend Plugin Code 3532 or Backend Plugin Code 3533) may edit plugin code over multiple sessions resulting repetition of Steps 4120 to 4160, as well as fewer or additional steps.

In Step 4170, Web Hosting System 3500 executes Plugin 3530 when Website 3511 is accessed by a user (e.g., End User 1530, 3540, 3550, 3560). Plugin code execution includes creation of an Isolation Environment 3521 to execute the code. Isolation Environment 3521 may include isolation on client side on a web browser and on the server side to execute Frontend 3532 and Backend 3533 Plugin Code 3530 respectively.

Figure 42:
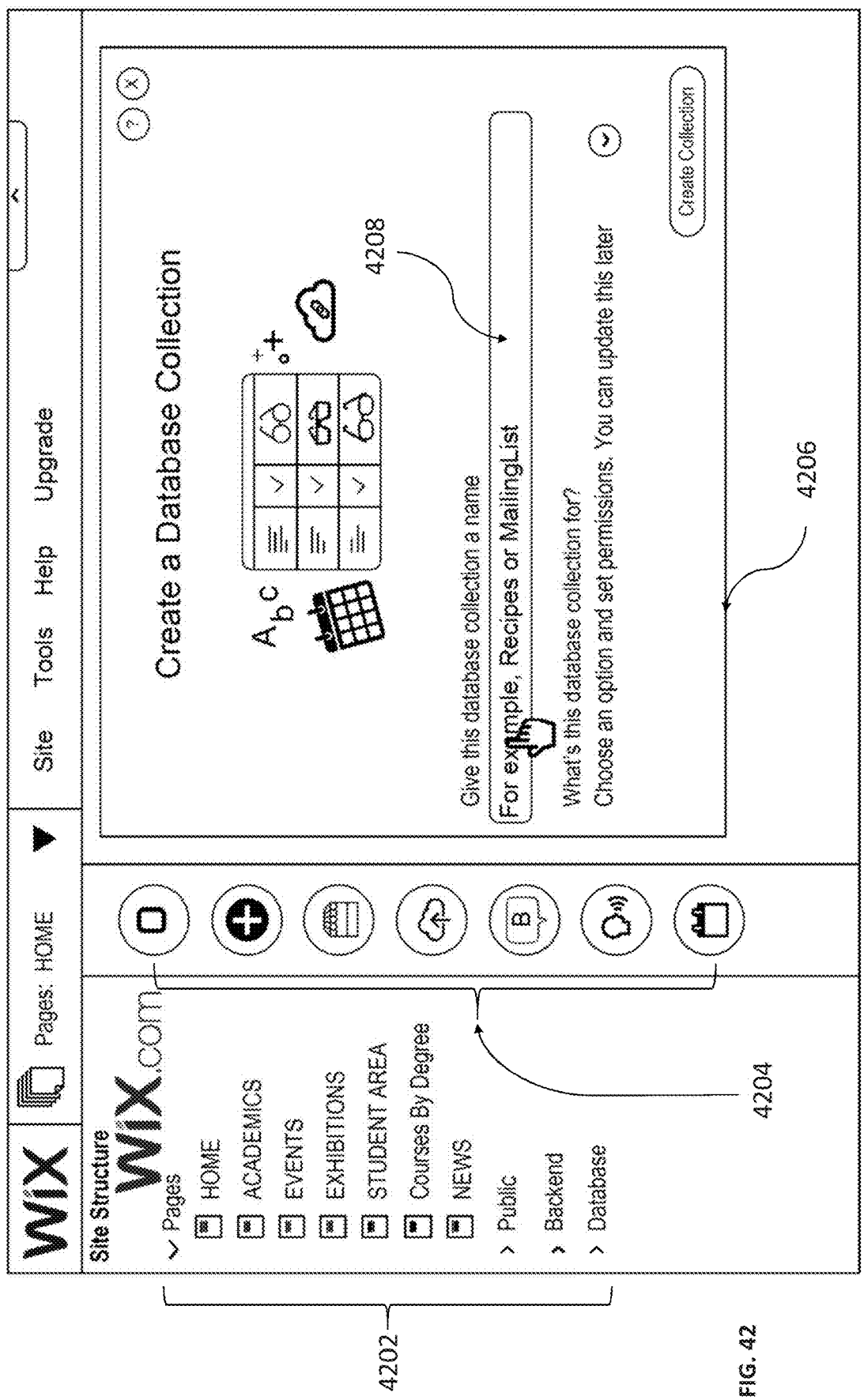
FIG. 42 is an example user interface for editing a webpage and creating a database collection, according to some embodiments of the present disclosure.

FIG. 42 is an example user interface for editing a webpage and creating a database collection, according to some embodiments of the present disclosure. For example, the webpage may be generated through a website development system, such as that provided by WIX.COM. As illustrated, a database may be created that supports one or more dynamic webpages.

A Site Structure sidebar 4202 may include various options for editing and configuring the website, such as a listing of different pages (e.g., HOME, ACADEMICS, EVENTS, EXHIBITIONS, STUDENT AREA, Courses by Degree, and NEWS), as well as options for Public features. Backend functionality, and Database functionality. Further, a toolbar 4204 may include various options for adding and editing content on the webpages.

As illustrated, interface 4206 allows a user to configure a database. The interface 4206 may be generated, for example, if a user selects the "Database" option from Site Structure sidebar 4202. The user may customize the database by giving it a unique name in field 4208. In this example, the database may be called the "courses" database.

Figure 43:
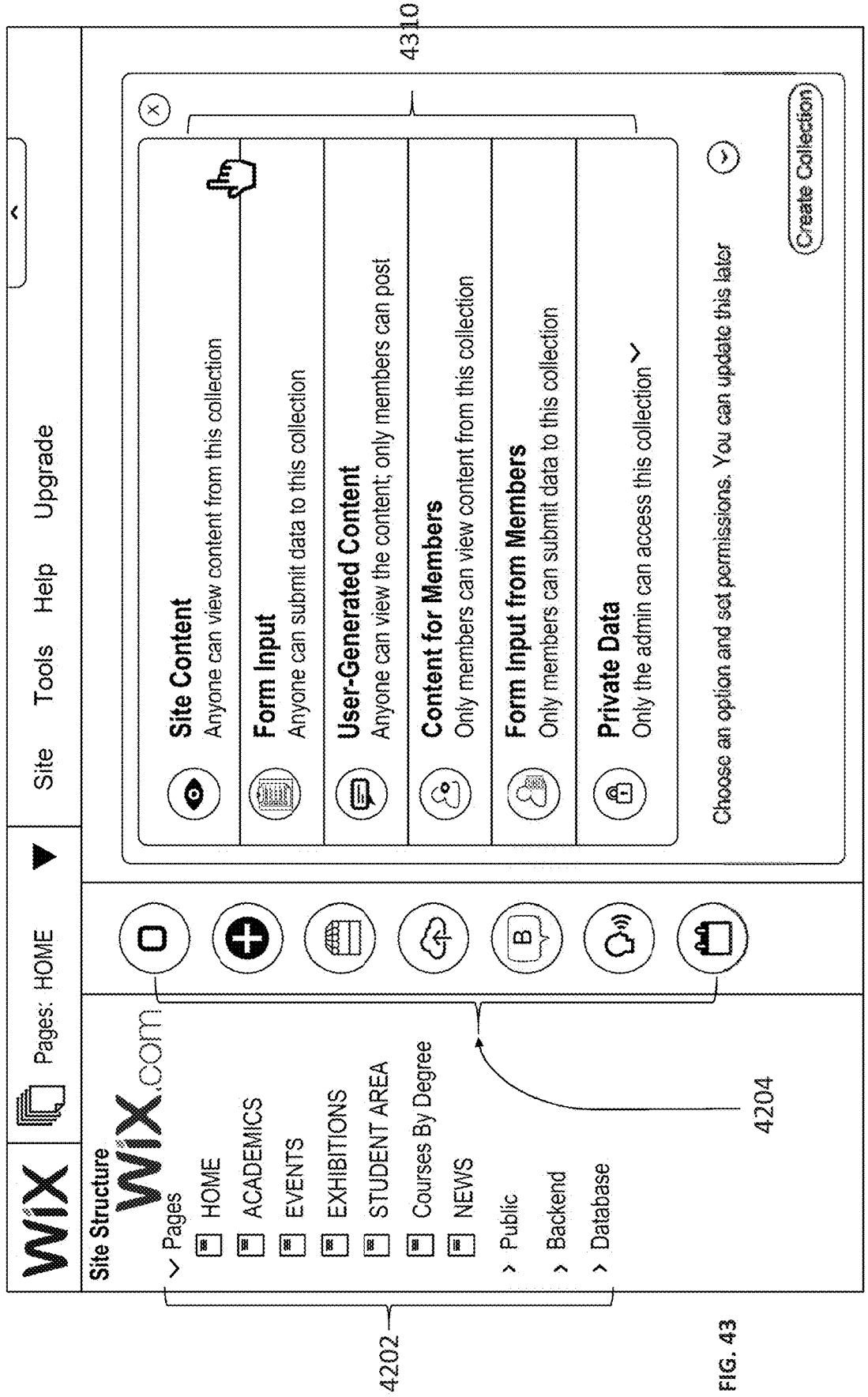
FIG. 43 is an example user interface for editing a webpage and configuring permissions for a database collection, according to some embodiments of the present disclosure.

FIG. 43 is an example user interface for editing a webpage and configuring permissions for a database collection, according to some embodiments of the present disclosure. For example, continuing with the above example, a user creating a "courses" database may access various different permissions 4310 options for the database and the corresponding dynamic pages that may be based on it. Permissions 4310 may address the content of webpages, data input on forms, content generated by users of the page, content restricted to registered members, forms that only registered members may complete, and certain private data that only certain users (e.g., administrators) may access.

Figure 44:
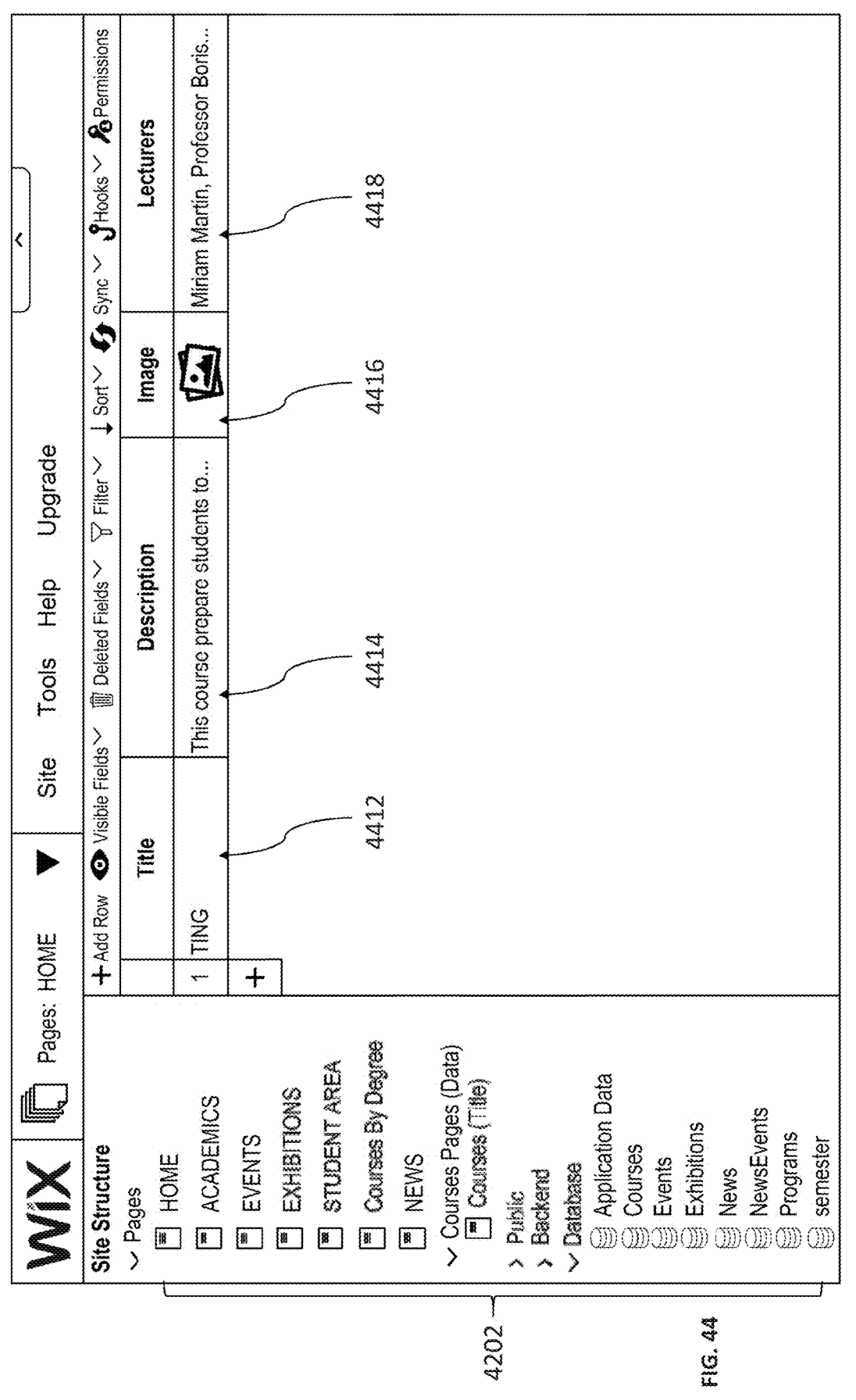

FIG. 44 is an example user interface for editing a webpage and entries in a database collection, according to some embodiments of the present disclosure. For example, the "courses" database may be comprised of fields 4412 (Title), 4414 (Description), 4416 (Image), 4418 (Lecturers), and others. These fields may include information on courses that can be extracted from the database and included in specific dynamic webpages. Notably, the fields may contain textual content (e.g., fields 4412, 4414, and 4418) as well as other content, such as images or videos (e.g., field 4316). As illustrated, field 4416 includes an image corresponding to the course tiled TING. In some embodiments, a user may further define the type or layout of each dynamic webpage and specify a URL for each dynamic page. For example, suffixes of the URL may correspond to columns in the database (e.g., Title).

FIG. 45 is an example user interface for editing a webpage and displaying output from a database collection, according to some embodiments of the present disclosure. For example, in a dynamic webpage that has been created, content from the database may be included. As illustrated, content 4520 includes a description of a course from the database. The content 4520 is automatically extracted from the database without the user having to manually copy it into the webpage. Using this technique, numerous dynamic pages may be created, each linking to a different portion of the database and having a unique arrangement of content based on its linking to the database.

Figure 46:
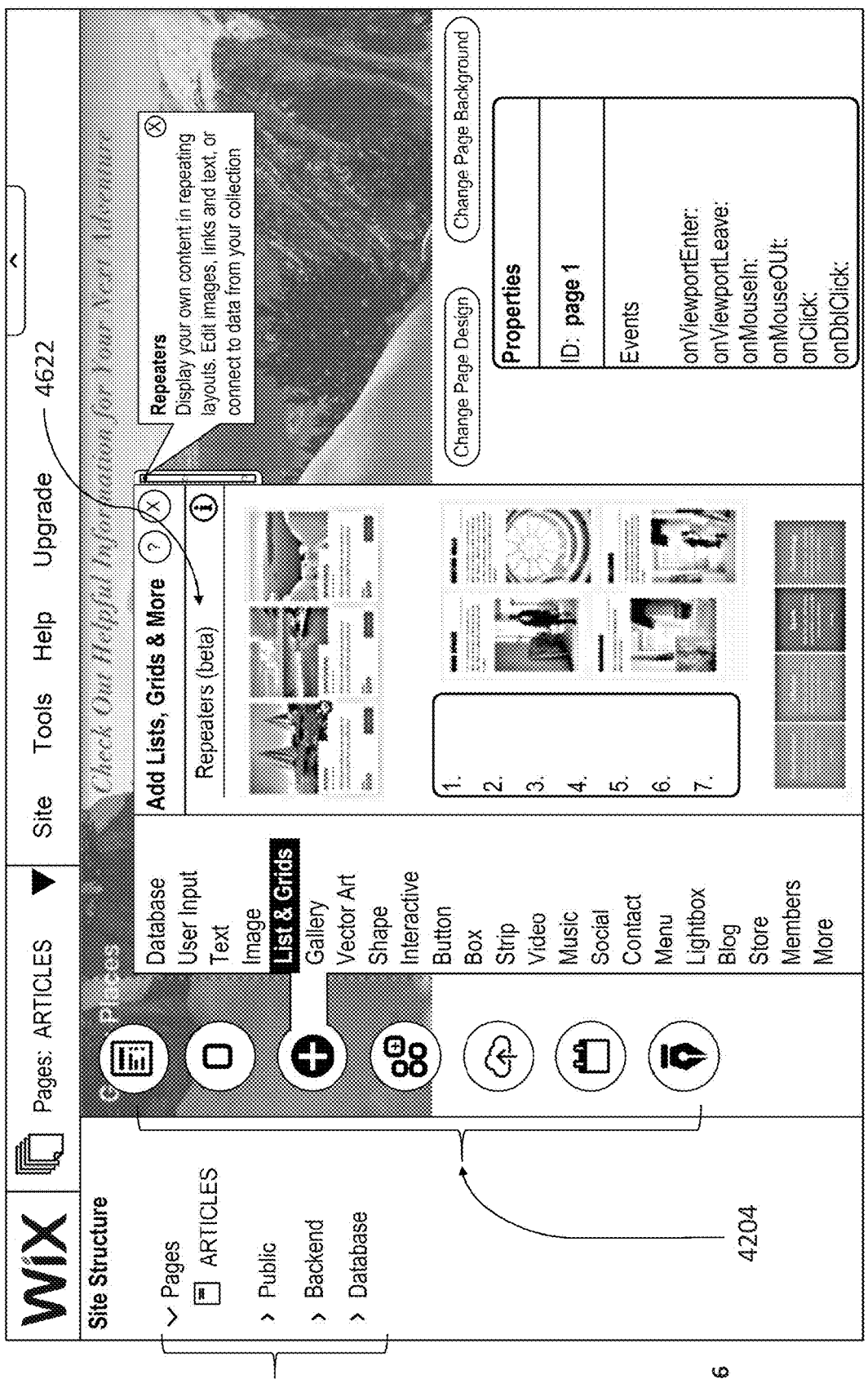
FIG. 46 is an example user interface for editing a webpage and creating a repeater function, according to some embodiments of the present disclosure.

FIG. 46 is an example user interface for editing a webpage and creating a repeater function, according to some embodiments of the present disclosure. As described above, a repeater function may be added to a website or page to create two or more instances of elements (e.g., combinations of text and images) that are similar in structure or layout. Using a repeater, two or more instances of elements may be created that differ in at least one respect (e.g., having different text, images, etc.).

As shown, a user may access a Repeaters menu 4622 to configure a repeater. For example, using toolbar 4204, a user may select the Lists & Grids option, which allows for the creation of repeaters and various other elements which display multiple objects. In order to populate repeater instances with content, a user may link the repeater or individual instances to datasets, such as data stored in a database. In some embodiments, a user may decide to add one element to each of the instances identically. By adding the element to one instance, it may automatically be added to each instance. Alternatively, a user may wish to specify (e.g., through backend or frontend code) that each instance created by a repeater should have different content.

Figure 47:
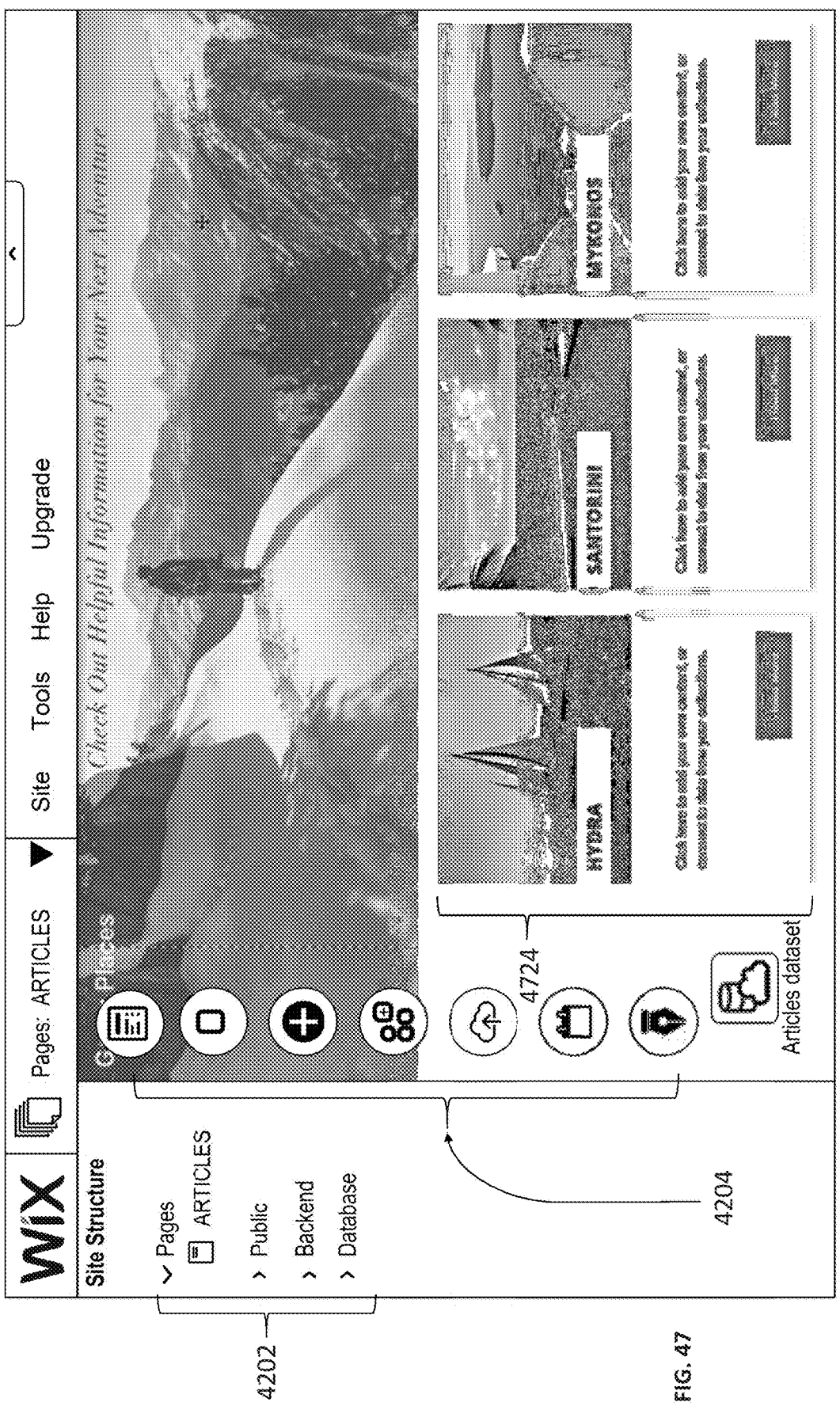
FIG. 47 is an example user interface for editing a webpage and showing the result of a repeater function, according to some embodiments of the present disclosure.

FIG. 47 is an example user interface for editing a webpage and showing the result of a repeater function, according to some embodiments of the present disclosure. As illustrated, a user has created three combinations of elements 4724 through a repeater. Each combination 4247 has a similar structure of an image, text (place name), text (description) and a "Read More" hyperlink icon. In the editing mode, the user may further edit the layout and appearance of these instances, for example by repositioning the image relative to the text elements, changing the hyperlink, resizing the fields, etc. Further, as discussed above, each element of the instances may connect to a different part of a database. For example, the three combinations of elements 4724 may each link to a different column in a database corresponding to the content they should each extract from the database. In this manner, while the three combinations of elements 4724 have a common layout, each has different textual or graphical content.

Various operations or functions are described herein, which may be implemented or defined as software code or instructions. Such content may be directly executable ("object" or "executable" form), source code, or difference code ("delta" or "patch" code). Software implementations of the embodiments described herein may be provided via an article of manufacture with the code or instructions stored thereon, or via a method of operating a communication interface to send data via the communication interface. A machine or computer readable storage medium may cause a machine to perform the functions or operations described and includes any mechanism that stores information in a form accessible by a machine (e.g., computing device, electronic system, and the like), such as recordable/non-recordable media (e.g., read only memory (ROM), random access memory (RAM), magnetic disk storage media, optical storage media, flash memory devices, and the like). A communication interface includes any mechanism that interfaces to any of a hardwired, wireless, optical, and the like, medium to communicate to another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present disclosure also relates to a system for performing the operations herein. This system may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Embodiments of the present disclosure may be implemented with computer executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

Computer programs based on the written description and methods of this specification are within the skill of a software developer. The various programs or program modules can be created using a variety of programming techniques. For example, program sections or program modules can be designed by means of JavaScript, Scala, python, Java, C, C++, assembly language, or any such programming languages, as well as data encoding languages (such as XML, JSON, etc.), query languages (such as SQL), presentation-related languages (such as HTML, CSS etc.) and data transformation language (such as XSL). One or more of such software sections or modules can be integrated into a computer system, non-transitory computer readable media, or existing communications software.

The words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items. In addition, the singular forms "a," "an," and "the" are intended to include plural references, unless the context clearly dictates otherwise.

Having described aspects of the embodiments in detail, it will be apparent that modifications and variations are possible without departing from the scope of aspects of the invention as defined in the appended claims. As various changes could be made in the above constructions, products, and methods without departing from the scope of aspects of the invention, it is indented that all matter contained in the above description and shown in the accompanying drawings shall be interpreted as illustrative and not in a limiting sense.

What is claimed is:

1. A non-transitory computer readable medium for updating a back-end database containing data sets that populate a plurality of web pages of a website, the computer readable medium containing instructions that when executed by at least one processor cause the at least one processor to perform the steps of:
   receive via a user interface, a plurality of data elements, the data elements organized into one or more groups of at least one data element, each group for display on a separate web page of a website;
   store the groups of at least one data element in a database;
   generate a plurality of virtual web pages, wherein each of the plurality of virtual web pages is generated by associating a unique URL with each of the plurality of virtual web pages and using a sitemap referencing the unique URL of each of the plurality of virtual web pages, wherein the sitemap enables navigation between the plurality of virtual webpages, wherein each virtual web page is a preview of a corresponding actual web page before the corresponding actual web page goes live, wherein each of the corresponding actual web pages is not designed with functionality for updating the database;
   display each group of at least one data element in a separate one of the plurality of virtual web pages;
   display an editing tool to permit a user to edit a virtual web page from the plurality of virtual web pages;
   translate the edits to the virtual web page into updates for the database;
   store the updates in the database; and
   enable, during a live view of a corresponding actual web page associated with the virtual web page, a display on the corresponding actual web page with the updates made to the virtual web page during the preview.

2. The non-transitory computer readable medium of claim 1, wherein each of the plurality of virtual web pages is displayable within a frame associated with an editor interface of the user interface.

3. The non-transitory computer readable medium of claim 1, wherein the steps further comprise display of a user-selectable feature enabling the user to navigate through the plurality of virtual web pages to individually and dynamically display each of the plurality of virtual web pages.

4. The non-transitory computer readable medium of claim 1, wherein the steps further comprise display of a user-selectable feature enabling the user to select a particular virtual web page from the plurality of virtual web pages based on an identifier of the particular virtual web page.

5. The non-transitory computer readable medium of claim 4, wherein the identifier of the particular virtual web page is based on a data element associated with the particular virtual web page.

6. The non-transitory computer readable medium of claim 1, wherein the editing tool is configured to receive edits to the stored groups of at least one data element in the database.

7. The non-transitory computer readable medium of claim 1, wherein the editing tool is configured to receive edits to attributes of the plurality of virtual web pages.

8. The non-transitory computer readable medium of claim 1, wherein the editing tool is configured to receive edits to code that is used to generate the plurality of virtual web pages.

9. The non-transitory computer readable medium of claim 1, wherein the editing tool is configured to display a plurality of segments of skeleton code representing actual code used to generate the plurality of virtual web pages, and receive edits to the skeleton code that are translated into edits to the actual code.

10. The non-transitory computer readable medium of claim 1, wherein the data elements are received via the user interface from an external source.

11. The non-transitory computer readable medium of claim 1, wherein the operations further comprise:
   access a software-based router associated with the plurality of virtual web pages; and
   configure the software-based router to generate a different version of each of the plurality of virtual web pages based on one or more segments of a received URL.

12. The non-transitory computer readable medium of claim 1, wherein a subset of each group of at least one data element are organized by a repeater function, the repeater function generating one or more displayed instances of the subset of each group of at least one data element.

13. The non-transitory computer readable medium of claim 12, wherein the live view of the corresponding actual web page includes the one or more instances.

14. A computer-implemented method for updating a back-end database containing data sets that populate a plurality of web pages of a website, the method comprising:
   receiving via a user interface, a plurality of data elements, the data elements organized into one or more groups of at least one data element, each group for display on a separate web page of a website;
   storing the groups of at least one data element in a database;
   generating a plurality of virtual web pages, wherein each of the plurality of virtual web pages is generated by associating a unique URL with each of the plurality of virtual web pages and using a sitemap referencing the unique URL of each of the plurality of virtual web pages, wherein the sitemap enables navigation between the plurality of virtual webpages, wherein each virtual web page is a preview of a corresponding actual web page before the corresponding actual web page goes live, wherein each of the corresponding actual web pages is not designed with functionality for updating the database;
   displaying each group of at least one data element in a separate one of the plurality of virtual web pages;
   displaying an editing tool to permit a user to edit a virtual web page from the plurality of virtual web pages;
   translating the edits to the virtual web page into updates for the database;
   storing the updates in the database; and
   enabling, during a live view of a corresponding actual web page associated with the virtual web page, a display on the corresponding actual web page with the updates made to the virtual web page during the preview.

15. The computer-implemented method of claim 14, wherein each of the plurality of virtual web pages is displayable within a frame associated with an editor interface of the user interface.

16. The computer-implemented method of claim 14, further comprising displaying a user-selectable feature enabling the user to navigate through the plurality of virtual web pages to individually and dynamically display each of the plurality of virtual web pages.

17. The computer-implemented method of claim 14, further comprising displaying a user-selectable feature enabling the user to select a particular virtual web page from the plurality of virtual web pages based on an identifier of the particular virtual web page.

18. The computer-implemented method of claim 14, wherein the identifier of the particular virtual web page is based on a data element associated with the particular virtual web page.

19. The computer-implemented method of claim 14, wherein the editing tool is configured to receive edits to the stored groups of at least one data element in the database.

20. The computer-implemented method of claim 14, wherein the editing tool is configured to receive edits to attributes of the plurality of virtual web pages.

21. The computer-implemented method of claim 14, wherein the editing tool is configured to receive edits to code that is used to generate the plurality of virtual web pages.

22. The computer-implemented method of claim 14, wherein the editing tool is configured to display a plurality of segments of skeleton code representing actual code used to generate the plurality of virtual web pages, and receive edits to the skeleton code that are translated into edits to the actual code.

23. The computer implemented method of claim 14, wherein the data elements are received via the user interface from an external source.

24. A system for enabling dynamic edits to web pages to update a back-end database containing data sets that populate the web pages, the system comprising:
   a database configured to store a plurality of data elements for display on a plurality of web pages, the data elements organized into one or more groups of at least one data element, each group for display on a separate web page of a website, each separate web page lacking functionality for updating the database; and
   at least one processor configured to:
      provide instructions remotely to a browser to provide an interface displaying an editable version of a first web page generated based on a group of at least one data element, the interface permitting a user to edit the at least one data element, wherein the editable version of the first web page is generated by associating a unique URL and using a sitemap referencing the unique URL, wherein the sitemap enables navigation between the editable version of the first web page and an editable version of a second webpage;

translate edits received via the interface on the editable version of the first web page into updates for the database;

store the updates in the database; and enable, during a live view of the first web page, a display on the first web page with the updates made to the editable version to the first web page.

25. The system of claim 24, wherein the at least one processor is further configured to generate a plurality of separate editable versions of web pages, wherein each separate editable version of a web page is displayable within a frame associated with an editor interface of the interface.

* * * * *